United States Patent
Agiwal et al.

(10) Patent No.: US 12,232,181 B2
(45) Date of Patent: Feb. 18, 2025

(54) METHOD OF RANDOM ACCESS PROCEDURE FOR SUPPORTING LARGE RANDOM ACCESS RESPONSE (RAR) WINDOW SIZE

(71) Applicant: Samsung Electronics Co., Ltd., Suwon-si (KR)

(72) Inventors: Anil Agiwal, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/150,483

(22) Filed: Jan. 5, 2023

(65) Prior Publication Data
US 2023/0164849 A1    May 25, 2023

Related U.S. Application Data

(63) Continuation of application No. 16/919,530, filed on Jul. 2, 2020, now Pat. No. 11,553,530.
(Continued)

(51) Int. Cl.
*H04W 74/08* (2024.01)
*H04L 5/00* (2006.01)
(Continued)

(52) U.S. Cl.
CPC ....... *H04W 74/0833* (2013.01); *H04L 5/0092* (2013.01); *H04W 74/0808* (2013.01);
(Continued)

(58) Field of Classification Search
None
See application file for complete search history.

(56) References Cited

U.S. PATENT DOCUMENTS

| 10,356,657 B2 | 7/2019 | Kim et al. |
| 11,122,619 B2 | 9/2021 | Bergström |

(Continued)

FOREIGN PATENT DOCUMENTS

| CN | 108353317 A | 7/2018 |
| CN | 108781465 A | 11/2018 |

(Continued)

OTHER PUBLICATIONS

Huawei et al., 'Discussion on handling of consistent UL LBT failure', R2-1907737, 3GPP TSG-RAN WG2 Meeting #106, Reno, Nevada, USA, sections 1-3, May 3, 2019.
(Continued)

*Primary Examiner* — Pamit Kaur
(74) *Attorney, Agent, or Firm* — Jefferson IP Law, LLP

(57) ABSTRACT

A method performed by a terminal for handling listen before talk (LBT) failure in a wireless communication system is provided. The method comprises identifying consistent LBT failure for active uplink (UL) bandwidth part (BWP) in a serving cell, identifying at least one UL BWP for which consistent LBT failure has not been triggered on same carrier in the serving cell, wherein the at least one UL BWP is configured with physical random access channel (PRACH) occasion, and switching the active UL BWP to an UL BWP among the at least one UL BWP.

10 Claims, 32 Drawing Sheets

Related U.S. Application Data

(60) Provisional application No. 62/869,742, filed on Jul. 2, 2019, provisional application No. 62/870,941, filed on Jul. 5, 2019, provisional application No. 62/931,623, filed on Nov. 6, 2019.

(51) Int. Cl.
| | |
|---|---|
| *H04W 74/0808* | (2024.01) |
| *H04W 74/0833* | (2024.01) |
| *H04W 76/11* | (2018.01) |
| *H04W 76/18* | (2018.01) |
| *H04W 76/27* | (2018.01) |

(52) U.S. Cl.
CPC ............ *H04W 76/11* (2018.02); *H04W 76/18* (2018.02); *H04W 76/27* (2018.02)

(56) References Cited

U.S. PATENT DOCUMENTS

| | | | |
|---|---|---|---|
| 2014/0140335 A1* | 5/2014 | Wang | H04W 84/12 370/338 |
| 2017/0238342 A1 | 8/2017 | Yang et al. | |
| 2017/0257852 A1* | 9/2017 | Wu | H04L 1/1854 |
| 2018/0007716 A1 | 1/2018 | Wu | |
| 2019/0052339 A1 | 2/2019 | Zhou et al. | |
| 2019/0159143 A1 | 5/2019 | Li et al. | |
| 2019/0182865 A1 | 6/2019 | Falahati et al. | |
| 2020/0053799 A1 | 2/2020 | Jeon et al. | |
| 2020/0267761 A1* | 8/2020 | Lee | H04W 74/0808 |
| 2021/0274377 A1 | 9/2021 | Lee et al. | |
| 2021/0274555 A1 | 9/2021 | Alfarhan et al. | |

FOREIGN PATENT DOCUMENTS

| | | |
|---|---|---|
| JP | 2001-128205 A | 5/2001 |
| WO | 2019/235897 A1 | 12/2019 |

OTHER PUBLICATIONS

OPPO, 'BWP operation impacts for NR-U', R2-1905611, 3GPP TSG-RAN WG2 Meeting 106, Reno, USA, section 3, May 2, 2019.

VIVO, 'RACH Resource Selection for Msg1 in NR-U', R2-1905620, 3GPP TSG-RAN WG2 Meeting #106, Reno, USA, sections 2.1-3, May 3, 2019.

OPPO, 'UL BWP switching upon RACH for NR-U', R2-1811066, 3GPP TSG-RAN WG2 Meeting #103, Gothenberg, Sweden, section 2, Aug. 10, 2018.

International Search Report dated Oct. 6, 2020, issued in International Application No. PCT/KR2020/008697.

Media Tek Inc.; On Consistent LBT failures; 3GPP TSG-RAN WG2 Meeting #107bis, R2-1913260; Oct. 2019, China.

"3rd Generation Partnership Project; Technical Specification Group Radio Access Network; Study on NR-based access to unlicensed spectrum (Release 16)", 3GPP Draft, 3GPP TR 38.889 V16.0.0, Dec. 27, 2018, XP051575597.

Extended European Search Report dated Jun. 6, 2023, issued in European Patent Application No. 20835498.5.

MediaTek Inc., CAPC for SRBs in NR-U, 3GPP TSG-RAN WG2 Meeting #105-Bis, R2-1903059, Mar. 28, 2019, pp. 1-4.

Japanese Office Action dated Jun. 10, 2024, issued in Japanese Patent Application No. 2022-500109.

ZTE Corporation, Sanechips, "UL data multiplexing and channel access priority for NR-U", R2-1906311, 3GPP TSG RAN WG2 NR #10 Meeting, May 3, 2019.

Chinese Notice of Allowance dated Nov. 15, 2024, issued in Chinese Patent Application No. 202080048058.7.

* cited by examiner

FIG. 17

| MAC subPDU 1<br>(LCH X, CAPC 2, 300bytes) | MAC subPDU 2<br>(LCH A, CAPC 3, 300bytes) | MAC subPDU 3<br>(LCH B, CAPC 3, 100bytes) | MAC subPDU 4<br>(LCH Z, CAPC 4, 300bytes) |
|---|---|---|---|

FIG. 20

| MAC subPDU 1 (LCH X, CAPC 2, 200bytes) | MAC subPDU 2 (LCH A, CAPC 4, 300bytes) | MAC subPDU 3 (LCH B, CAPC 4, 200bytes) | MAC subPDU 4 (LCH Z, CAPC 3, 300bytes) |

METHOD OF RANDOM ACCESS PROCEDURE FOR SUPPORTING LARGE RANDOM ACCESS RESPONSE (RAR) WINDOW SIZE

CROSS-REFERENCE TO RELATED APPLICATION(S)

This application is a continuation application of prior application Ser. No. 16/919,530 filed on Jul. 2, 2020, which issued as U.S. Pat. No. 11,553,530 on Jan. 10, 2023; and which is based on and claimed priority under 35 U.S.C. § 119 (e) of a U.S. Provisional application Ser. No. 62/869,742, filed on Jul. 2, 2019, in the U.S. Patent and Trademark Office, of a U.S. Provisional application Ser. No. 62/870,941, filed on Jul. 5, 2019, in the U.S. Patent and Trademark Office, and of a U.S. Provisional application Ser. No. 62/931,623, filed on Nov. 6, 2019, in the U.S. Patent and Trademark Office, of the disclosure of each of which is incorporated by reference herein in its entirety.

BACKGROUND

1. Field

The disclosure relates to a method of transmitting and receiving frame information in random access response (RAR), a method of handling configured grant transmission in unlicensed carrier, a method of random access (RA) procedure for supporting large RAR window size, and a method of listen before talk (LBT) handling.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also referred to as a 'beyond 4G network' or a 'post long term evolution (LTE) System.' The 5G wireless communication system is considered to support not only lower frequency bands but also higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system (also referred as next generation radio or NR) is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipment (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable low-latency communication (URLL), etc. The eMBB requirements (e.g., tens of Gbps data rate, low-latency, high-mobility and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability variable mobility and so on) address the market segment representing the Industrial automation application and vehicle-to-vehicle/vehicle-to-infrastructure communication that is foreseen as one of the enablers for autonomous cars.

The current design of 5G wireless communication system is for operation on licensed carrier(s). A study has been initiated recently to study enhancements to 5G wireless communication system for operation on unlicensed carrier(s). The main motivation of using unlicensed carrier is capital expenditures (CAPEX) reduction for cellular operators by utilizing free spectrum access for intelligent data offloading; improved and intelligent spectrum access and management, to address increasing wireless traffic demand under limited available spectrum and allowing network operators without licensed spectrum to utilize the radio efficient 3rd generation partnership project (3GPP) radio access technology. Various deployment scenarios are being considered for operation on unlicensed carrier(s) such as:

New radio-unlicensed (NR-U) licensed assisted access (LAA): Carrier aggregation between licensed band NR (primary cell (PCell)) and unlicensed band NR-U (secondary cell (SCell))

NR-U stand-alone (SA): Stand-alone NR-U

LTE NR unlicensed-dual connectivity (ENU-DC): Dual connectivity between licensed band LTE (PCell) and unlicensed band NR-U (primary SCell (PSCell))

NR unlicensed-dual connectivity (NNU-DC): Dual connectivity between licensed band NR (PCell) and unlicensed band NR-U (PSCell)

Note that the scenarios above include an NR cell with downlink (DL) in unlicensed band and uplink (UL) in licensed band.

One of the goals of the above study is to identify enhancements needed to support random access (RA) procedure in unlicensed band. In the 5G (also referred as NR or New Radio) wireless communication system, RA procedure is used to achieve UL time synchronization. RA procedure is used during initial access, handover, radio resource control (RRC) connection re-establishment procedure, scheduling request transmission, secondary cell group (SCG) addition/modification and data or control information transmission in UL by non-synchronized user equipment (UE) in RRC CONNECTED state. During the RA procedure, UE first transmits RA Preamble (also referred as message 1 (Msg1)) and then waits for RA Response (RAR) or message 2 (Msg2) in the RAR window corresponding to its RA Preamble transmission. Next generation node B (gNB) transmits the RAR on physical DL shared channel (PDSCH) addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA Preamble was detected by gNB. The maximum size of RAR-window is one radio frame, i.e. 10 ms. The RA-RNTI is calculated as follows: RA-RNTI=1+ s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; 0≤s_id<14, t_id is the index of the first slot of the PRACH occasion (0≤t_id<80).

f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

Several RARs for various RA Preambles detected by gNB can be multiplexed in the same RAR media access control (MAC) protocol data unit (PDU) by gNB. An RAR in MAC PDU corresponds to UE's RA Preamble transmission if the RAR includes an RA preamble identifier (RAPID) of RA Preamble transmitted by the UE. If the RAR corresponding to its RA Preamble transmission is not received during the RAR window and UE has not yet transmitted the RA Preamble for a configurable (configured by gNB in RACH configuration) number of times, the UE retransmits the RA Preamble.

If the RAR corresponding to its RA Preamble transmission is received and UE has transmitted a dedicated RA Preamble, RA procedure is considered successful. If the UE has transmitted a non-dedicated (i.e. contention based) RA Preamble then upon successful reception of RAR, the UE transmits message 3 (Msg3) in UL grant received in RAR. Msg3 includes message such as RRC Connection Request, RRC Connection Re-establishment request, RRC handover confirm, scheduling request, etc. It also includes the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC CE including the UE's Contention Resolution Identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA Preamble for a configurable number of times, UE retransmits the RA Preamble.

The cell on which UE transmits RA Preamble can be a licensed carrier or unlicensed carrier. In case carrier used for UL transmission is unlicensed carrier, UE needs to perform channel sensing (i.e. listen-before-talk (LBT)) to determine whether channel is free or not before transmitting Msg1 and Msg3 in the UL. Similarly, if the carrier used for DL transmission is unlicensed carrier, gNB needs to perform channel sensing (i.e. LBT) to determine whether the channel is free or not before transmitting Msg2 and Msg4 in the DL. It is possible that gNB has received RA preamble but is not able to transmit RAR in RAR window as channel is not free. UE will retransmit PRACH upon RAR window expiry. The retransmitted RA preamble may not be received by gNB because of collision or UE may fail to retransmit RA preamble or retransmission may be delayed due to channel being not free in the UL. This problem can be avoided by having larger RAR window size. However large RAR window of size greater than 10 ms leads to RA-RNTI ambiguity.

FIG. 1 is an example illustration of RA-RNTI ambiguity due to large RAR window size according to related art.

If PRACH is transmitted using same RA preamble in PRACH Occasion X and PRACH Occasion Y by UE 1 and UE 2 respectively, RAR received in common slots between RAR window X and RAR window Y cannot be distinguished as RA-RNTI is same for PRACH Occasion X and PRACH Occasion Y.

The abovementioned problem of RA-RNTI ambiguity can be resolved by including in the information about the radio frame in which PRACH occasion starts. RAR MAC PDU includes one or more RAR MAC subPDUs where each MAC subPDU consists of RAPID MAC subheader and RAR MAC payload. RAR belongs to UE if RAPID in MAC subheader matches the RA preamble transmitted by UE and frame information in RAR MAC payload corresponds to the radio frame of PRACH Occasion in which UE has transmitted RA Preamble. However this is not an efficient approach as UE would need to process the RAR MAC payload even if RAR is not meant for it. This process needs to be performed for each and every RAR in received RAR MAC PDU until UE finds a RAR for itself or until no more RARs are left to be processed. This approach may also lead to overhead issue as frame information needs to be included for each RAR MAC payload in RAR MAC PDU. This approach cannot provide frame information for MAC subPDU which includes RAPID MAC subheader but does not include RAR MAC payload. This type of MAC subPDU without RAR MAC payload is included to indicate SI request acknowledgment when transmitted RA preamble is for SI request.

So an enhanced method for transmitting and receiving frame information in RAR is needed.

The above information is presented as background information only to assist with an understanding of the disclosure. No determination has been made, and no assertion is made, as to whether any of the above might be applicable as prior art with regard to the disclosure.

SUMMARY

An enhanced method for transmitting and receiving frame information in RAR is needed.

For uplink (UL) transmission on unlicensed carrier, user equipment (UE) selects the highest channel access priority class (CAPC) index (i.e. lowest priority CAPC) of the logical channel(s) (LCH(s)) multiplexed in a media access control (MAC) protocol data unit (PDU). The listen before talk (LBT) parameters corresponding to selected CAPC index are used to perform channel access (i.e. LBT procedure) for UL transmission. The SRB data (i.e. MAC SDU(s) of signaling radio bearer) corresponding to lowest CAPC (i.e. highest priority) index is deprioritized if multiplexed with MAC SDUs of data radio bearer(s) and MAC CEs in MAC PDU. So some methods to enhance the current design are needed.

For extended RAR window, one or more least significant bits (LSBs) of system frame number (SFN) can be included in downlink control information (DCI) transmitted on physical downlink common control channel (PDCCH). So during reconfiguration with synchronization procedure, UE needs to first acquire SFN of target SpCell and then initiates the RA towards the target SpCell. Since the 6 most significant bits (MSBs) of SFN are included in MIB and 4 bits are included in PBCH payload, UE needs to decode PBCH of target SpCell which may delay reconfiguration with synchronization procedure. So method is needed to reduce this delay.

Aspects of the disclosure are to address at least the above-mentioned problems and/or disadvantages and to provide at least the advantages described below. Accordingly, an aspect of the disclosure is to provide a communication method and system for converging a $5^{th}$ generation (5G) communication system for supporting higher data rates beyond a $4^{th}$ generation (4G) system.

Additional aspects will be set forth in part in the description which follows and, in part, will be apparent from the description, or may be learned by practice of the presented embodiments.

In accordance with an aspect of the disclosure, a method performed by a terminal for handling listen before talk (LBT) failure in a wireless communication system is provided. The method comprises identifying consistent LBT failure for active UL bandwidth part (BWP) in a serving cell, identifying at least one UL BWP for which consistent LBT failure has not been triggered on same carrier in the serving cell, wherein the at least one UL BWP is configured with physical random access channel (PRACH) occasion, and switching the active UL BWP to an UL BWP among the at least one UL BWP.

In accordance with another aspect of the disclosure, a terminal in a wireless communication system is provided. The terminal includes a transceiver and at least one processor operatively coupled with the transceiver. The at least one processor is configured to identify consistent LBT failure for active UL BWP in a serving cell, identify at least one UL BWP for which consistent LBT failure has not been triggered on same carrier in the serving cell, wherein the at least one UL BWP is configured with PRACH occasion, and switch the active UL BWP to an UL BWP among the at least one UL BWP.

A frame identifier can be applied to both MAC subPDU including RAR and MAC subPDU including SI request acknowledgment. The frame identifier can also be applied to MAC subPDU including BI. The overhead is less as the frame identifier is added only once per RAR MAC PDU.

The advantage of a method of the disclosure is that CAPC which occupies the maximum portion of UL grant dominates the channel access which is better than a legacy scheme wherein the lowest priority CAPC was always selected. The advantage of another method of the disclosure is that among the CAPCs which occupies portion of UL grant beyond a threshold, highest priority CAPC dominates the channel access even if it does not occupy the maximum portion of UL grant.

The design of selecting CAPC for UL configured grants is enhanced.

The delay of reconfiguration with synchronization procedure can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 is an example illustration of MAC PDU to be transmitted in UL grant using listen before talk (LBT) Type 1 channel access according to an embodiment of the disclosure;

FIG. 20 is an example illustration of MAC PDU to be transmitted in UL grant using LBT Type 1 channel access according to an embodiment of the disclosure;

Throughout the drawings, like reference numerals will be understood to refer to like parts, components, and structures.

DETAILED DESCRIPTION

Figure 1:
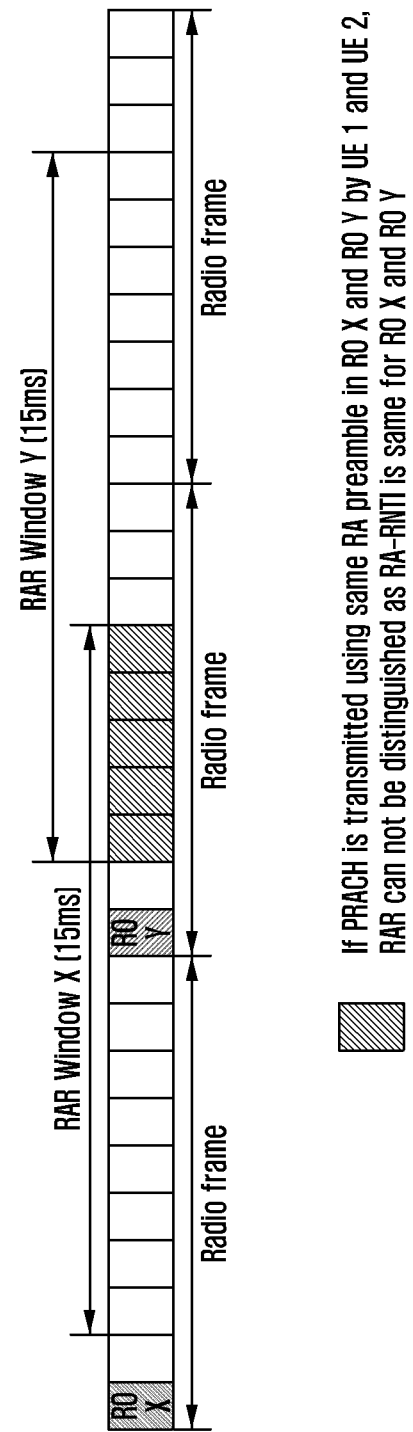
FIG. 1 is an example illustration of random access (RA) radio network temporary identifier (RA-RNTI) ambiguity due to large RAR window size according to related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Method of Transmitting and Receiving Frame Information in Random Access Response (RAR)

Method 1

In one method of this disclosure for transmitting and receiving frame information in RAR, UE/gNB transmits/receives RAR media access control (MAC) protocol data unit (PDU) wherein the RAR MAC PDU is one of a first RAR MAC PDU format and a second RAR MAC PDU Format.

Figure 2:
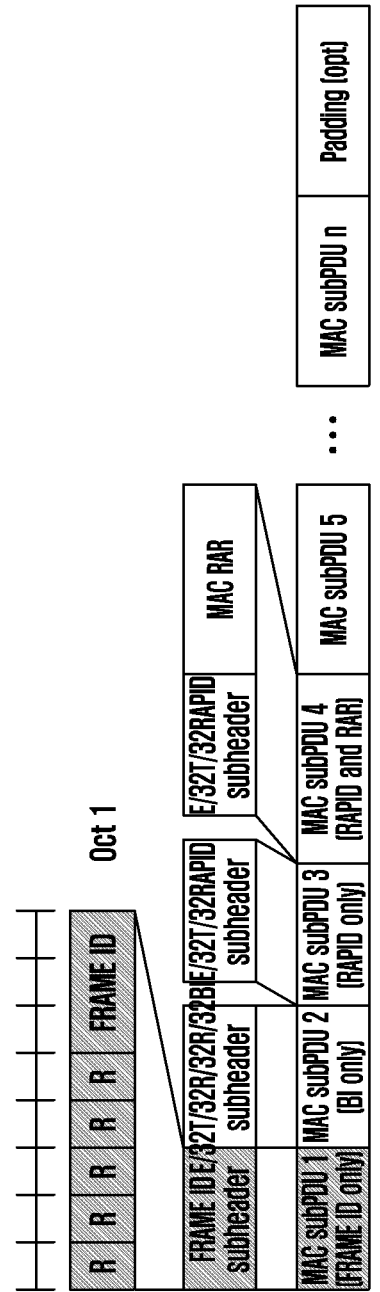
FIG. 2 shows an example of an random access response (RAR) media access control (MAC) protocol data unit (PDU) based on first RAR MAC PDU format according to an embodiment of the disclosure.

First RAR MAC PDU Format:

FIG. 2 shows an example of an RAR MAC PDU based on first RAR MAC PDU format according to an embodiment of the disclosure. For illustration, FRAME ID is assumed to be 3 bits corresponding to max RAR window size of 80 ms (i.e. 8 radio frames) in FIG. 2. The other sizes of FRAME ID are not precluded.

Referring to FIG. 2, RAR MAC PDU according to first (i.e. enhanced) RAR MAC PDU format consists of one or more MAC subPDUs and optionally padding. Each MAC subPDU consists one of the following:
- a MAC subheader with Frame Identifier only;
- a MAC subheader with Backoff Indicator only;
- a MAC subheader with random access (RA) preamble identifier (RAPID) only (i.e. acknowledgment for system information (SI) request);
- a MAC subheader with RAPID and MAC RAR.

The Frame Identifier MAC subheader includes Frame Identifier (FRAME ID). The size of Frame Identifier is 'X' bits and remaining bits (if any) in the Frame Identifier MAC subheader are reserved (R) bits. The Frame Identifier is one of the following:

Frame Identifier=system subframe number (SFN)

Frame Identifier=SFN modulo (Maximum supported RAR window size in radio frames)

Frame Identifier=SFN modulo (Configured RAR window size in radio frames)

Frame Identifier='p' least significant bits of SFN, where 'p' can be pre-defined or equal to $\log_2$(Maximum RAR window size in radio frames) or $\log_2$(Configured RAR window size in radio frames)

SFN is the system frame number of radio frame of physical RA channel (PRACH) occasion or system frame number of radio frame in which PRACH occasion starts.

Configured RAR window size is the size of RAR window signaled by gNB wherein gNB selects a size of RAR window from a set of configurable RAR window sizes. The set of configurable RAR window sizes is predefined. Maximum supported RAR window size refers to maximum value of RAR window size in set of configurable RAR window sizes.

A MAC subPDU with Frame Identifier only is placed at the beginning of the MAC PDU. Frame Identifier MAC subheader is included in the first MAC subPDU of RAR MAC PDU.

A MAC subheader with Backoff Indicator consists of five header fields extension (E)/type (T)/reserve (R)/R/backoff indicator (BI). A MAC subPDU with Backoff Indicator only, if included, is placed after the MAC subPDU with Frame Identifier. The backoff indication, if needed, is included immediately after the MAC subPDU carrying the Frame Identifier MAC subheader, i.e. the backoff indication is included in second MAC subPDU.

A MAC subheader with RAPID consists of three header fields E/T/RAPID. Padding is placed at the end of the MAC PDU if present. Presence and length of padding is implicit based on transport block (TB) size and size of MAC subPDU(s). The type (T) field is set to distinct value in BI MAC subheader and RAPID subheader. The extension (E) field set to '0' in MAC subheader of a MAC subPDU indicates that the MAC subPDU is the last MAC subPDU in the MAC PDU. The E field set to '1' in MAC subheader of a MAC subPDU indicates at least another MAC subPDU follows.

'MAC subPDU(s) with RAPID only' and 'MAC subPDU(s) with RAPID and MAC RAR' can be placed anywhere between second MAC subPDU and padding (if any), if backoff indication is included in MAC PDU. 'MAC subPDU(s) with RAPID only' and 'MAC subPDU(s) with RAPID and MAC RAR' can be placed anywhere between first MAC subPDU and padding (if any), if backoff indication is not included in MAC PDU.

Figure 3:
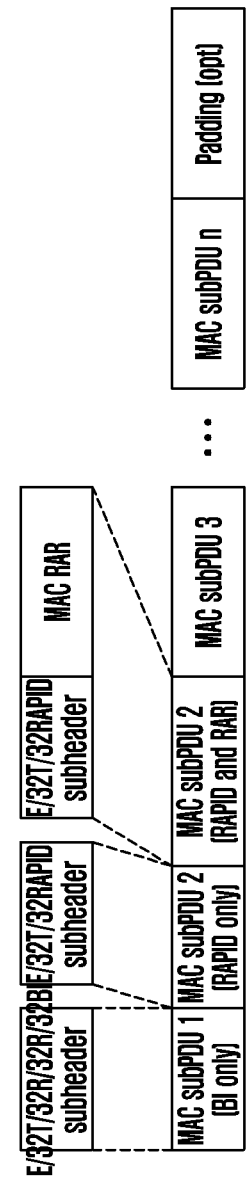
FIG. 3 shows an example of an RAR MAC PDU based on second RAR MAC PDU format according to an embodiment of the disclosure.

Second RAR MAC PDU Format:

FIG. 3 shows an example of an RAR MAC PDU based on second RAR MAC PDU format according to an embodiment of the disclosure.

Referring to FIG. 3, RAR MAC PDU according to second (i.e. regular) RAR MAC PDU format consists of one or more MAC subPDUs and optionally padding. Each MAC subPDU consists one of the following:
- a MAC subheader with Backoff Indicator only;
- a MAC subheader with RAPID only (i.e. acknowledgment for SI request);
- a MAC subheader with RAPID and MAC RAR.

A MAC subheader with Backoff Indicator consists of five header fields E/T/R/R/BI. A MAC subPDU with Backoff Indicator only is placed at the beginning of MAC PDU, if included.

A MAC subheader with RAPID consists of three header fields E/T/RAPID. Padding is placed at the end of the MAC PDU if present. Presence and length of padding is implicit based on TB size and size of MAC subPDU(s). The type (T) field is set to distinct value in BI MAC subheader and RAPID subheader. E field set to '0' in MAC subheader of a MAC subPDU indicates that the MAC subPDU is the last MAC subPDU in the MAC PDU. The E field set to '1' in MAC subheader of a MAC subPDU indicates at least another MAC subPDU follows.

'MAC subPDU(s) with RAPID only' and 'MAC subPDU(s) with RAPID and MAC RAR' can be placed anywhere between first MAC subPDU and padding (if any), if backoff indication is included in MAC PDU. 'MAC subPDU(s) with RAPID only' and 'MAC subPDU(s) with RAPID and MAC RAR' can be placed anywhere between beginning of MAC PDU and padding (if any), if backoff indication is not included in MAC PDU.

UE Operation:

Embodiment 1

Figure 4:
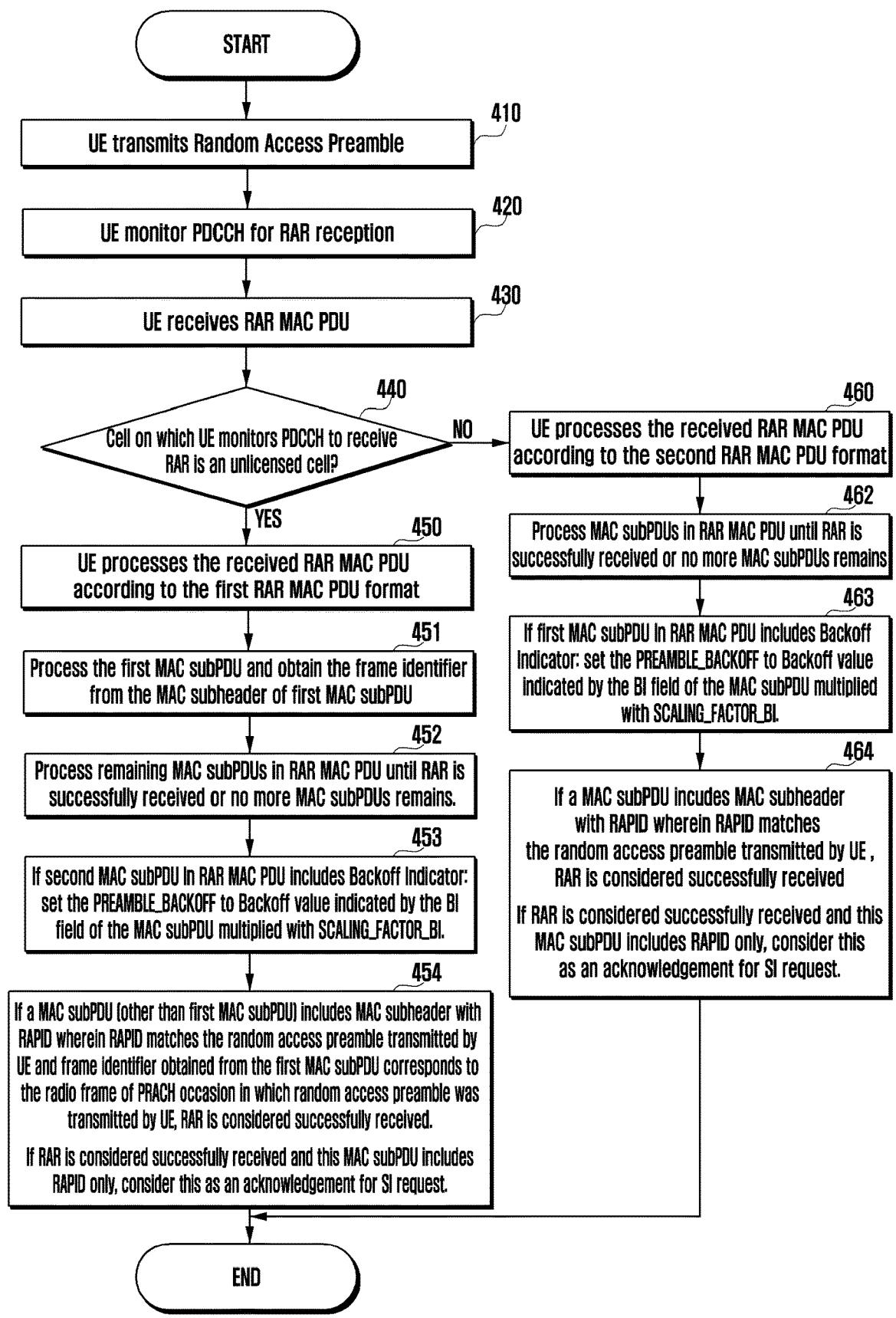
FIG. 4 shows the user equipment (UE) operation according to an embodiment of the disclosure.

FIG. 4 shows the UE operation according to an embodiment of the disclosure.

Referring to FIG. 4, UE transmits RA preamble at operation 410, UE monitors physical downlink control channel (PDCCH) for RAR reception at operation 420, and UE receives RAR MAC PDU at operation 430. UE determines whether the cell on which UE monitors PDCCH to receive RAR is an unlicensed cell or not at operation 440. If the cell is an unlicensed cell, UE processes the received RAR MAC PDU according to the first RAR MAC PDU format at operation 450. If the cell is a licensed cell, UE processes the received RAR MAC PDU according to the second RAR MAC PDU format at operation 460. A cell is an unlicensed cell if the DL carrier frequency of cell corresponds to unlicensed band or unlicensed carrier. Otherwise the cell is licensed cell.

UE Processing According to First MAC PDU Format:

UE processes the first MAC subPDU and obtains the frame identifier from the MAC subheader of first MAC subPDU at operation 451, and processes the remaining MAC subPDUs in RAR MAC PDU until RAR is successfully received or no more MAC subPDUs remains at operation 452.

If second MAC subPDU in RAR MAC PDU includes Backoff Indicator, UE sets the PREAMBLE_BACKOFF to Backoff value indicated by the BI field of the MAC subPDU multiplied with SCALING_FACTOR_BI at operation 453. SCALING_FACTOR_BI can be 1 or can be signaled by gNB in RRC signaling. Frame identifier is not checked for processing the MAC subPDU with BI. Backoff value is randomly selected between 0 to PREAMBLE_BACKOFF when backoff is applied during the RA procedure. Alternately, if second MAC subPDU in RAR MAC PDU includes Backoff Indicator and frame identifier obtained from the first MAC subPDU corresponds to the radio frame of PRACH occasion in which RA preamble was transmitted by UE (i.e. corresponds to radio frame in which PRACH occasion in which RA preamble was transmitted by UE starts), UE sets the PREAMBLE_BACKOFF to Backoff value indicated by the BI field of the MAC subPDU multiplied with SCAL-ING_FACTOR_BI. Backoff value is randomly selected between 0 to PREAMBLE_BACKOFF when backoff is applied during the RA procedure.

To determine whether frame identifier obtained from the first MAC subPDU corresponds to the radio frame of PRACH occasion in which RA preamble was transmitted by UE, UE calculates frame identifier corresponding to radio frame of PRACH occasion as explained earlier and compares it with the value of frame identifier received in RAR MAC PDU. If they match, frame identifier obtained from the first MAC subPDU corresponds to the radio frame of PRACH occasion in which RA preamble was transmitted by UE.

If a MAC subPDU (other than first MAC subPDU) includes MAC subheader with RAPID wherein RAPID matches the RA preamble transmitted by UE and frame identifier obtained from the first MAC subPDU corresponds to the radio frame of PRACH occasion in which RA preamble was transmitted by UE (i.e. corresponds to radio frame in which PRACH occasion in which RA preamble was transmitted by UE starts), UE considers that RAR is successfully received at operation 454.

If RAR is considered successfully received and this MAC subPDU includes RAPID only, UE considers this as an acknowledgement for SI request.

UE Processing According to Second MAC PDU Format:

UE processes MAC subPDUs in RAR MAC PDU until RAR is successfully received or no more MAC subPDUs remains at operation 462.

If first MAC subPDU in RAR MAC PDU includes backoff indicator, UE sets the PREAMBLE_BACKOFF to backoff value indicated by the BI field of the MAC subPDU multiplied with SCALING_FACTOR_BI at operation 463.

If a MAC subPDU includes MAC subheader with RAPID wherein RAPID matches the RA preamble transmitted by UE, UE considers that RAR is successfully received at operation 464. If RAR is considered successfully received and this MAC subPDU includes RAPID only, UE considers this as an acknowledgement for SI request.

Embodiment 2

In another embodiment, UE transmits RA preamble, UE monitors PDCCH for RAR reception, and UE receives RAR MAC PDU. UE determines whether the configured RAR window size is greater than 10 ms or not. If the configured RAR window size is greater than 10 ms, UE processes the received RAR MAC PDU according to the first RAR MAC PDU format. If the configured RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 4.

Embodiment 3

Figure 5:
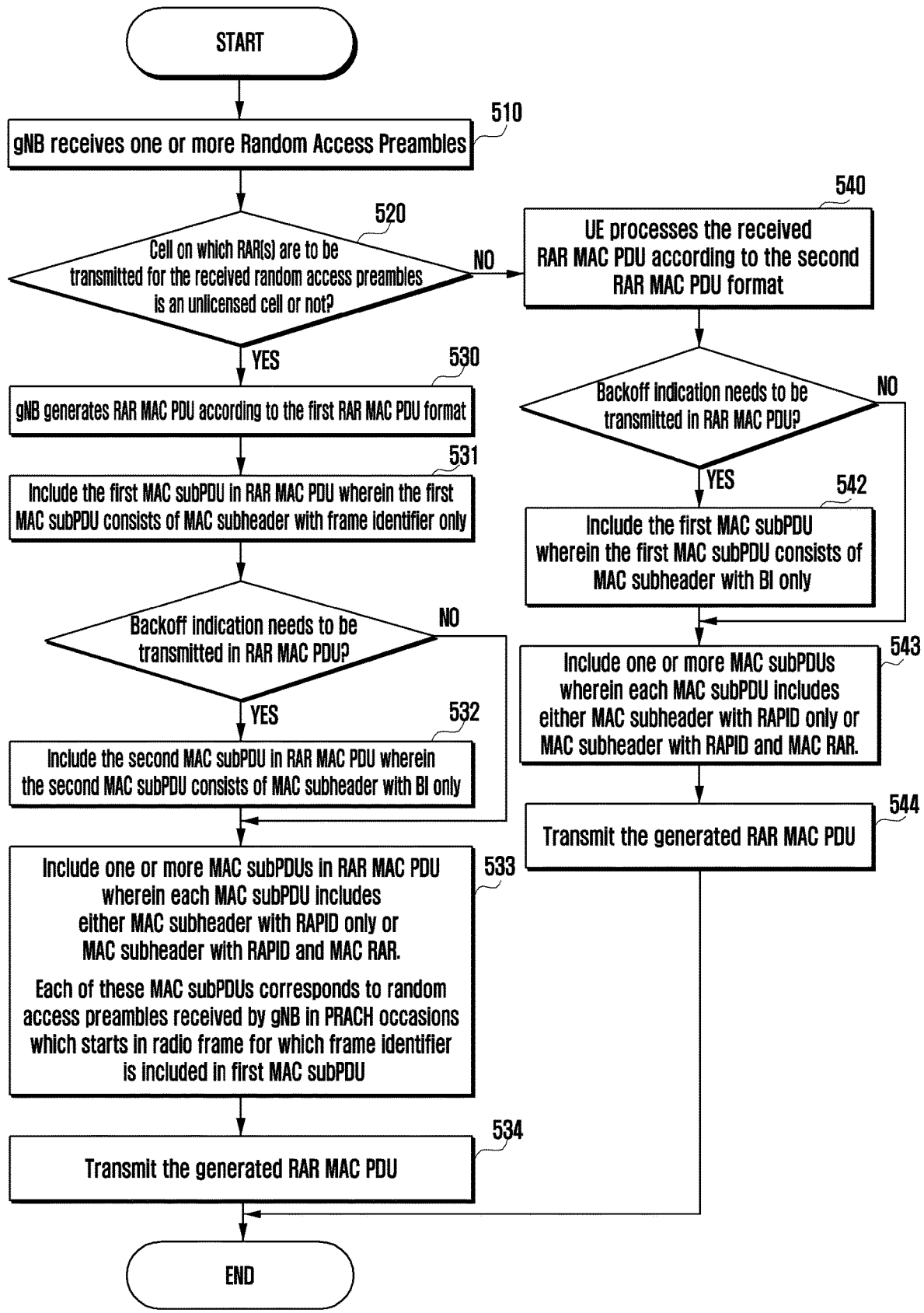
FIG. 5 shows the next generation node B (gNB) operation according to an embodiment of the disclosure.

In another embodiment, UE transmits RA preamble, UE monitors PDCCH for RAR reception, and UE receives RAR MAC PDU. UE determines whether the maximum supported RAR window size is greater than 10 ms or not. If the maximum supported RAR window size is greater than 10 ms, UE processes the received RAR MAC PDU according to the first RAR MAC PDU format. If the maximum supported RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 4.

gNB Operation:

FIG. 5 shows the gNB operation according to an embodiment of the disclosure.

Referring to FIG. 5, gNB receives one or more RA preambles at operation 510, and determines whether the cell on which RAR(s) are to be transmitted is an unlicensed cell or not at operation 520. If the cell is an unlicensed cell, gNB generates the RAR MAC PDU for transmission according to the first RAR MAC PDU format at operation 530. If the cell is a licensed cell, gNB generates the RAR MAC PDU for transmission according to the second RAR MAC PDU format at operation 540. A cell is an unlicensed cell if the downlink (DL) carrier frequency of cell corresponds to unlicensed band. Otherwise the cell is a licensed cell.

To generate the RAR MAC PDU for transmission according to the first RAR MAC PDU format, the gNB includes the first MAC subPDU in RAR MAC PDU wherein the first MAC subPDU consists of MAC subheader with frame identifier only at operation 531. If backoff indication needs to be transmitted in RAR MAC PDU, gNB includes the second MAC subPDU in RAR MAC PDU wherein the second MAC subPDU consists of MAC subheader with BI only at operation 532. gNB includes one or more MAC subPDUs in RAR MAC PDU wherein each MAC subPDU includes either MAC subheader with RAPID only or MAC subheader with RAPID and MAC RAR at operation 533. Each of these MAC subPDUs corresponds to RA preambles received by gNB in PRACH occasions which starts in radio frame for which frame identifier is included in first MAC subPDU.

To generate the RAR MAC PDU according to the second RAR MAC PDU format, if backoff indication needs to be transmitted in RAR MAC PDU, gNB includes the first MAC subPDU wherein the first MAC subPDU consists of MAC subheader with BI only at operation 542. gNB includes one or more MAC subPDUs wherein each MAC subPDU includes either MAC subheader with RAPID only or MAC subheader with RAPID and MAC RAR at operation 543.

gNB transmits the generated RAR MAC PDU at operation 534 or 544.

In another embodiment, gNB receives one or more RA preambles, and determines whether the cell on which RAR(s) are to be transmitted is configured with an RAR window size greater than 10 ms or not. If the configured RAR window size is greater than 10 ms, gNB generates the RAR MAC PDU for transmission according to the first RAR MAC PDU format. If the configured RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 5.

In another embodiment, gNB receives one or more RA preambles, and determines whether for the cell on which RAR(s) are to be transmitted, the maximum supported RAR window size is greater than 10 ms or not. If the maximum supported RAR window size is greater than 10 ms, gNB generates the RAR MAC PDU for transmission according to the first RAR MAC PDU format. If the maximum supported RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 5.

The advantage of first RAR MAC PDU format as disclosed in this method is that Frame identifier can be applied to both MAC subPDU including RAR and MAC subPDU including SI request acknowledgment. Frame identifier can also be applied to MAC subPDU including BI. The overhead is less as frame identifier is added only once per RAR MAC PDU. The disadvantage is that Frame Identifier needs to be always included in RAR MAC PDU.

Method 2

In second method of this disclosure for transmitting and receiving frame information in RAR, UE/gNB transmits/receives RAR MAC PDU wherein the RAR MAC PDU is one of a first RAR MAC PDU format and a second RAR MAC PDU Format.

Figure 6:
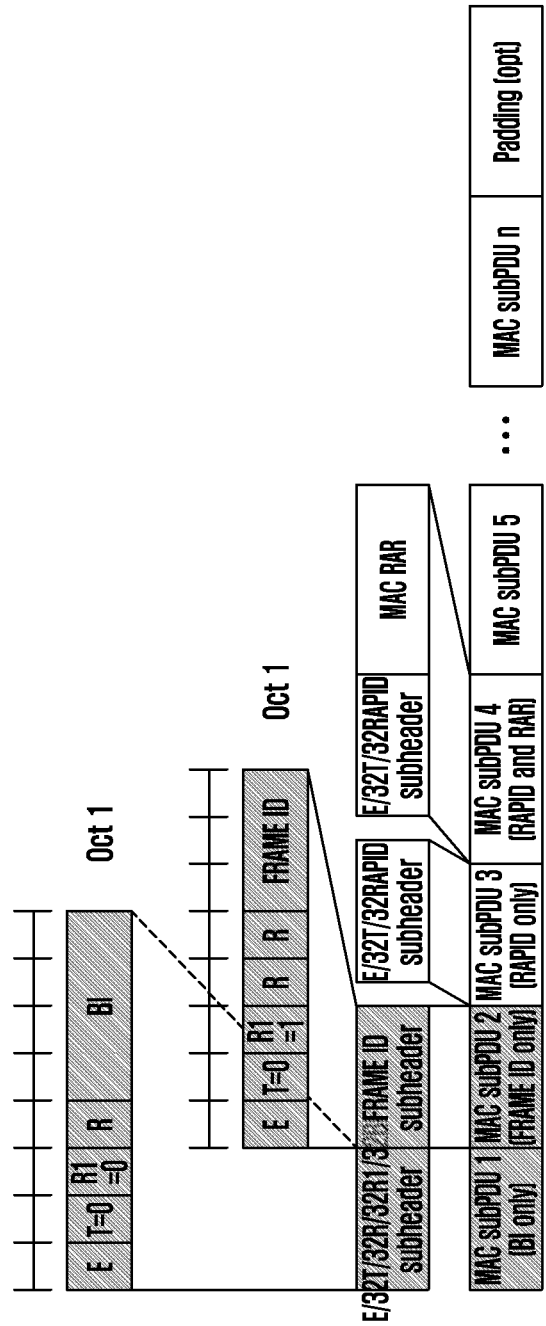
FIG. 6 shows an example of an RAR MAC PDU based on first RAR MAC PDU format according to an embodiment of the disclosure.

First RAR MAC PDU Format:

FIG. 6 shows an example of an RAR MAC PDU based on first RAR MAC PDU format according to another embodiment of the disclosure. For illustration, FRAME ID is assumed to be 3 bits corresponding to max RAR window size of 80 ms in FIG. 6.

Referring to FIG. 6, RAR MAC PDU according to first (i.e. enhanced) RAR MAC PDU format consists of one or more MAC subPDUs and optionally padding. Each MAC subPDU consists one of the following:

a MAC subheader with Frame Identifier only;
 a MAC subheader with Backoff Indicator only;
 a MAC subheader with RAPID only (i.e. acknowledgment for SI request);
 a MAC subheader with RAPID and MAC RAR.

The Frame Identifier MAC subheader includes E, T, R1 and Frame Identifier (FRAME ID). It may also include one or more R bits, depending on number of bits defined for Frame Identifier. For example, if Frame Identifier is 5 bits long, there are no R bits; and if Frame Identifier is 3 bits long, there are two R bits. The Frame Identifier is one of the following:

Frame Identifier=SFN
 Frame Identifier=SFN modulo (Maximum supported RAR window size in radio frames)
 Frame Identifier=SFN modulo (Configured RAR window size in radio frames)
 Frame Identifier='p' least significant bits of SFN, where 'p' can be pre-defined or equal to $\log_2$(Maximum RAR window size in radio frames) or $\log_2$(Configured RAR window size in radio frames)
 SFN is the system frame number of radio frame of PRACH occasion or system frame number of radio frame in which PRACH occasion starts.
 Configured RAR window size is the size of RAR window signaled by gNB wherein gNB selects a size of RAR window from a set of configurable RAR window sizes. The set of configurable RAR window sizes is pre-defined. Maximum supported RAR window size refers to maximum value of RAR window size in set of configurable RAR window sizes.

A MAC subheader with Backoff Indicator consists of five header fields E/T/R1/R/BI. A MAC subheader with Frame identifier consists of at least four header fields E/T/R1/FRAME ID. T bit is set to same value (e.g. T equal 0) for MAC subheader with Backoff Indicator and MAC subheader with Frame identifier. R1 bit is set to different value (e.g. R1 is set to zero in MAC subheader with Backoff Indicator and R1 is set to '1' in MAC subheader with frame identifier) to distinguish between MAC subheader with Backoff Indicator and MAC subheader with Frame identifier.

A MAC subheader with RAPID consists of three header fields E/T/RAPID. Padding is placed at the end of the MAC PDU if present. Presence and length of padding is implicit based on TB size and size of MAC subPDU(s). The value of T bit in RAPID subheader is different than the value of T bit in Frame identifier subheader and BI subheader.

E field set to '0' in MAC subheader of a MAC subPDU indicates that the MAC subPDU is the last MAC subPDU in the MAC PDU. The E field set to '1' in MAC subheader of a MAC subPDU indicates at least another MAC subPDU follows.

Embodiment 1

Referring to FIG. 6, a MAC subPDU with Backoff Indicator only, if included, is placed at the beginning of the MAC PDU. A MAC subPDU with Frame Identifier only is placed at the beginning of the MAC PDU after the MAC subPDU with Backoff indicator, if included. 'MAC subPDU(s) with RAPID only' and 'MAC subPDU(s) with RAPID and MAC RAR' can be placed anywhere between second MAC subPDU and padding (if any), if backoff indication is included in MAC PDU. 'MAC subPDU(s) with RAPID only' and 'MAC subPDU(s) with RAPID and MAC RAR' can be placed anywhere between first MAC subPDU and padding (if any), if backoff indication is not included in MAC PDU. This has advantage that UE can obtain the Frame identifier before processing the MAC subPDUs carrying RAPID; UE can also obtain the backoff indicator without processing frame identifier; and gNB can transmit RAR MAC PDU with backoff indicator only which is not possible with Method 1.

Embodiment 2

A MAC subPDU with Frame identifier only, is placed at the beginning of the MAC PDU. A MAC subPDU with backoff indication only, if included, is placed at the beginning of the MAC PDU after the MAC subPDU with frame identifier. 'MAC subPDU(s) with RAPID only' and 'MAC subPDU(s) with RAPID and MAC RAR' can be placed anywhere between second MAC subPDU and padding (if any), if backoff indication is included in MAC PDU. 'MAC subPDU(s) with RAPID only' and 'MAC subPDU(s) with RAPID and MAC RAR' can be placed anywhere between first MAC subPDU and padding (if any), if backoff indication is not included in MAC PDU. This has advantage that UE can obtain the Frame identifier before processing any MAC subPDUs and frame identifier can be applied to each MAC subPDU.

Embodiment 3

A MAC subPDU with Backoff Indicator only, if included, is placed at the beginning of the MAC PDU. A MAC subPDU with Frame Identifier only is placed before the first MAC subPDU which includes RAPID and MAC RAR. 'MAC subPDU(s) with RAPID only' can be placed anywhere between second MAC subPDU and padding (if any), if backoff indication is included in MAC PDU. 'MAC subPDU(s) with RAPID only' can be placed anywhere between first MAC subPDU and padding (if any), if backoff indication is not included in MAC PDU. 'MAC subPDU(s) with RAPID and MAC RAR' are placed after the MAC subPDU carrying frame identifier and before padding (if any). This has advantage that UE can obtain the Frame identifier before processing the MAC subPDUs carrying RAPID and MAC RAR; UE can also obtain the backoff indicator without processing frame identifier; and UE can also obtain MAC subPDU with RAPID only without processing the frame identifier. gNB can transmit RAR MAC PDU with backoff indicator only without including MAC subPDU with frame identifier; and gNB can transmit RAR MAC PDU with back off indication and/or MAC subPDU with RAPID only without including MAC subPDU with frame identifier.

The advantage of first RAR MAC PDU format as disclosed in this method is that Frame identifier can be applied to both MAC sub PDU including RAR and MAC subPDU including SI request acknowledgment. The overhead is less as frame identifier is added only once per RAR MAC PDU. Frame Identifier is not required to be always included in RAR MAC PDU. It can be skipped in RAR MAC PDU only includes BI. In an embodiment, it can be also skipped if RAR MAC PDU does not include any MAC RAR. Additionally, this approach is beneficial for UE implementation as MAC subheader structures for first and second RAR MAC PDU format are similar and thereby reduce implementation complexity.

Second RAR MAC PDU Format: In this method of the disclosure, RAR MAC PDU according to second (i.e. regular) RAR MAC PDU format is same as described in Method 1 for transmitting and receiving frame information in RAR.

UE Operation:

Embodiment 1

Figure 7:
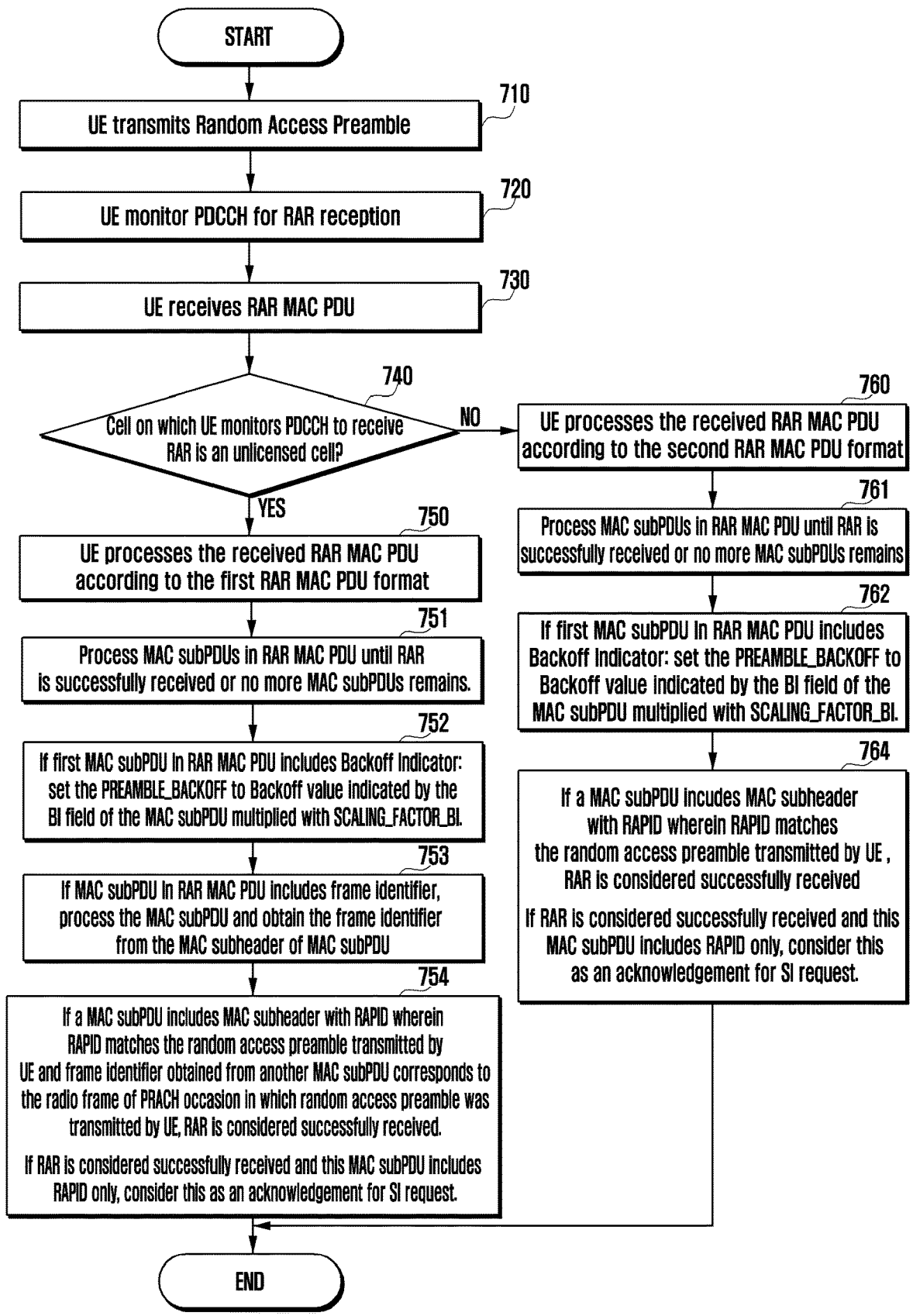
FIG. 7 shows the UE operation according to an embodiment of the disclosure.

FIG. 7 shows the UE operation according to another embodiment of the disclosure.

Referring to FIG. 7, UE transmits RA preamble at operation 710, UE monitors PDCCH for RAR reception at operation 720, and UE receives RAR MAC PDU at operation 730. UE determines whether the cell on which UE monitors PDCCH to receive RAR is an unlicensed cell or not at operation 740. If the cell is an unlicensed cell, UE processes the received RAR MAC PDU according to the first RAR MAC PDU format at operation 750. If the cell is a licensed cell, UE processes the received RAR MAC PDU according to the second RAR MAC PDU format at operation 760. A cell is an unlicensed cell if the DL carrier frequency of cell corresponds to unlicensed band. Otherwise the cell is licensed cell.

While processing the RAR MAC PDU according to first MAC PDU format, UE processes MAC subPDUs in RAR MAC PDU until RAR is successfully received or no more MAC subPDUs remains at operation 751. If first MAC subPDU in RAR MAC PDU includes backoff indicator, UE sets the PREAMBLE_BACKOFF to backoff value indicated by the BI field of the MAC subPDU multiplied with SCALING_FACTOR_BI at operation 752. If MAC subPDU in RAR MAC PDU includes frame identifier, UE process the MAC subPDU and obtains the frame identifier from the MAC subheader of MAC subPDU at operation 753. If a MAC subPDU includes MAC subheader with RAPID wherein RAPID matches the RA preamble transmitted by UE and frame identifier obtained from another MAC subPDU corresponds to the radio frame of PRACH occasion in which RA preamble was transmitted by UE, UE considers that RAR is successfully received at operation 754. If RAR is considered successfully received and this MAC subPDU includes RAPID only, UE considers this as an acknowledgement for SI request.

While processing RAR MAC PDU according to second RAR MAC PDU format, UE processes MAC subPDUs in RAR MAC PDU until RAR is successfully received or no more MAC subPDUs remains at operation 761. If first MAC subPDU in RAR MAC PDU includes backoff indicator, UE sets the PREAMBLE_BACKOFF to backoff value indicated by the BI field of the MAC subPDU multiplied with SCALING_FACTOR_BI at operation 762. If a MAC subPDU includes MAC subheader with RAPID wherein RAPID matches the RA preamble transmitted by UE, UE considers that RAR is successfully received at operation 764. If RAR is considered successfully received and this MAC subPDU includes RAPID only, UE considers this as an acknowledgement for SI request.

Embodiment 2

In another embodiment, UE transmits RA preamble, UE monitors PDCCH for RAR reception, and UE receives RAR MAC PDU. UE determines whether the configured RAR window size is greater than 10 ms or not. If the configured RAR window size is greater than 10 ms, UE processes the received RAR MAC PDU according to the first RAR MAC PDU format. If the configured RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 7.

Embodiment 3

In another embodiment, UE transmits RA preamble, UE monitors PDCCH for RAR reception, and UE receives RAR MAC PDU. UE determines whether the maximum supported RAR window size is greater than 10 ms or not. If the maximum supported RAR window size is greater than 10 ms, UE processes the received RAR MAC PDU according to the first RAR MAC PDU format. If the maximum supported RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 7.

Figure 8:
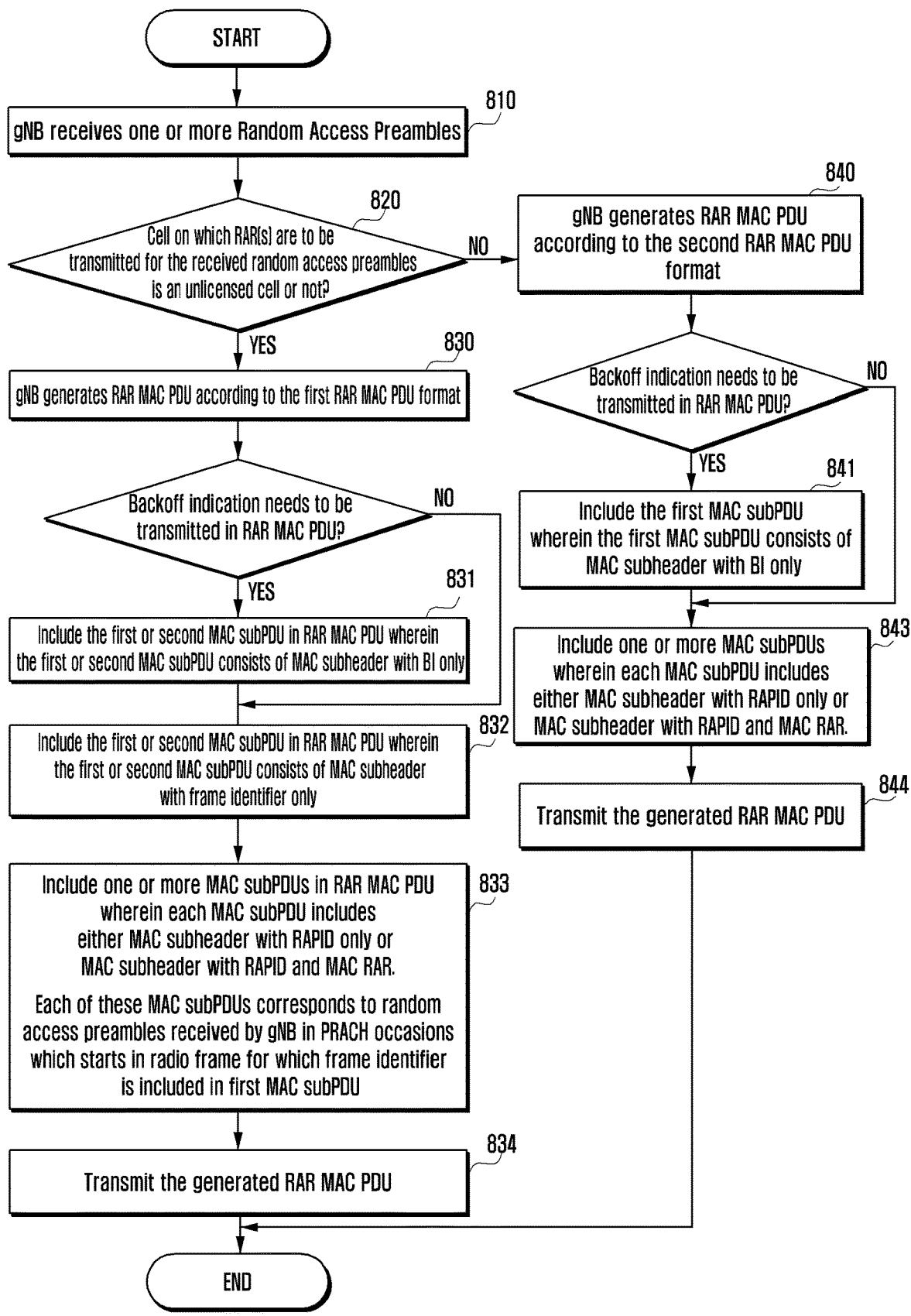
FIG. 8 shows the gNB operation according to an embodiment of the disclosure.

According to first RAR MAC PDU format, T bit is set to same value (e.g. T equal 0) for MAC subheader with Backoff Indicator and MAC subheader with Frame identifier. So while processing RAR MAC PDU according to first MAC PDU format, UE checks the R1 bit to determine whether MAC subheader includes BI or Frame Identifier. R1 bit is set to different value (e.g. R1 is set to zero in MAC subheader with Backoff Indicator and R1 is set to '1' in MAC subheader with frame identifier) to distinguish between MAC subheader with Backoff Indicator and MAC subheader with Frame identifier. In an embodiment, while processing RAR MAC PDU according to first RAR MAC PDU format, UE determines whether MAC subheader in a MAC subPDU is a BI subheader or frame identifier subheader or RAPID subheader, wherein UE determines that MAC subheader is a BI subheader if T=0 and R1=0; MAC subheader is a Frame Identifier subheader if T=0 and R1=1; and MAC subheader is a RAPID subheader if T=1. In an embodiment, while processing RAR MAC PDU according to second RAR MAC PDU format, UE determines whether MAC subheader in a MAC subPDU is a BI subheader or RAPID subheader. UE determines that MAC subheader is a BI subheader if T=0; and MAC subheader is a RAPID subheader if T=1.

gNB Operation:

FIG. 8 shows the gNB operation according to another embodiment of the disclosure.

Referring to FIG. 8, gNB receives one or more RA preambles at operation 810, and determines whether the cell on which RAR(s) are to be transmitted is an unlicensed cell or not at operation 820. If the cell is an unlicensed cell, gNB generates the RAR MAC PDU for transmission according to the first RAR MAC PDU format at operation 830. If the cell is a licensed cell, gNB generates the RAR MAC PDU for transmission according to the second RAR MAC PDU format at operation 840. A cell is an unlicensed cell if the DL carrier frequency of cell corresponds to unlicensed band. Otherwise the cell is a licensed cell.

While generating RAR MAC PDU according to first RAR MAC PDU format, if backoff indication needs to be transmitted in RAR MAC PDU, gNB includes the first or second MAC subPDU in RAR MAC PDU wherein the first or second MAC subPDU consists of MAC subheader with BI only at operation 831. gNB includes the first or second MAC subPDU in RAR MAC PDU wherein the first or second MAC subPDU consists of MAC subheader with frame identifier only at operation 832. gNB includes one or more MAC subPDUs in RAR MAC PDU wherein each MAC subPDU includes either MAC subheader with RAPID only or MAC subheader with RAPID and MAC RAR at operation 833. Each of these MAC subPDUs corresponds to RA preambles received by gNB in PRACH occasions which starts in radio frame for which frame identifier is included in first MAC subPDU.

While generating RAR MAC PDU according to second RAR MAC PDU format, if backoff indication needs to be transmitted in RAR MAC PDU, gNB includes the first MAC subPDU wherein the first MAC subPDU consists of MAC subheader with BI only at operation 841. gNB includes one or more MAC subPDUs wherein each MAC subPDU includes either MAC subheader with RAPID only or MAC subheader with RAPID and MAC RAR at operation 843.

gNB transmits the generated RAR MAC PDU at operation 834 or 844.

Alternately, the detailed operation in this embodiment follows the operation as shown in FIG. 5. While generating RAR MAC PDU according to first MAC PDU format, T bit is set to same value (e.g. T equal 0) for MAC subheader with Backoff Indicator and MAC subheader with Frame identifier. R1 bit is set to different value (e.g. R1 is set to zero in MAC subheader with Backoff Indicator and R1 is set to '1' in MAC subheader with frame identifier) to distinguish between MAC subheader with Backoff Indicator and MAC subheader with Frame identifier. In an embodiment, while generating RAR MAC PDU according to first RAR MAC PDU format, gNB sets T=0 and R1=0 in BI MAC subheader; T=0 and R1=1 in Frame Identifier MAC subheader; and T=1 in RAPID MAC subheader. In an embodiment, while generating RAR MAC PDU according to second RAR MAC PDU format, gNB sets T=0 in BI MAC subheader; and T=1 in RAPID MAC subheader.

In another embodiment, gNB receives one or more RA preambles, and determines whether the cell on which RAR(s) are to be transmitted is configured with an RAR window size greater than 10 ms or not. If the configured RAR window size is greater than 10 ms, gNB generates the RAR MAC PDU for transmission according to the first RAR MAC PDU format. If the configured RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 8. Alternately, the detailed gNB operation in this embodiment with regards to generating the RAR MAC PDU after determining the first or second RAR MAC PDU format is same as described in FIG. 5. While generating RAR MAC PDU according to first MAC PDU format, T bit is set to same value (e.g. T equal 0) for MAC subheader with Backoff Indicator and MAC subheader with Frame identifier. R1 bit is set to different value (e.g. R1 is set to zero in MAC subheader with Backoff Indicator and R1 is set to '1' in MAC subheader with frame identifier) to distinguish between MAC subheader with Backoff Indicator and MAC subheader with Frame identifier. In an embodiment, while generating RAR MAC PDU according to first RAR MAC PDU format, gNB sets T=0 and R1=0 in BI MAC subheader; T=0 and R1=1 in Frame Identifier MAC subheader; and T=1 in RAPID MAC subheader. In an embodiment, while generating RAR MAC PDU according to second RAR MAC PDU format, gNB sets T=0 in BI MAC subheader; and T=1 in RAPID MAC subheader.

In another embodiment, gNB receives one or more RA preambles, and determines whether for the cell on which RAR(s) are to be transmitted, the maximum supported RAR window size is greater than 10 ms or not. If the maximum supported RAR window size is greater than 10 ms, gNB generates the RAR MAC PDU for transmission according to the first RAR MAC PDU format. If the maximum supported RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 8. Alternately, the detailed gNB operation in this embodiment with regards to generating the RAR MAC PDU after determining the first or second RAR MAC PDU format is same as described in FIG. 5. While generating RAR MAC PDU according to first MAC PDU format, T bit is set to same value (e.g. T equal 0) for MAC subheader with Backoff Indicator and MAC subheader with Frame identifier. R1 bit is set to different value (e.g. R1 is set to zero in MAC subheader with Backoff Indicator and R1 is set to '1' in MAC subheader with frame identifier) to distinguish between MAC subheader with Backoff Indicator and MAC subheader with Frame identifier. In an embodiment, while generating RAR MAC PDU according to first RAR MAC PDU format, gNB sets T=0 and R1=0 in BI MAC subheader; T=0 and R1=1 in Frame Identifier MAC subheader; and T=1 in RAPID MAC subheader. In an embodiment, while generating RAR MAC PDU according to second RAR MAC PDU format, gNB sets T=0 in BI MAC subheader; and T=1 in RAPID MAC subheader.

Method 3

In third method of this disclosure for transmitting and receiving frame information in RAR, UE/gNB transmits/receives RAR MAC PDU wherein the RAR MAC PDU is one of a first RAR MAC PDU format and a second RAR MAC PDU Format.

Figure 9:
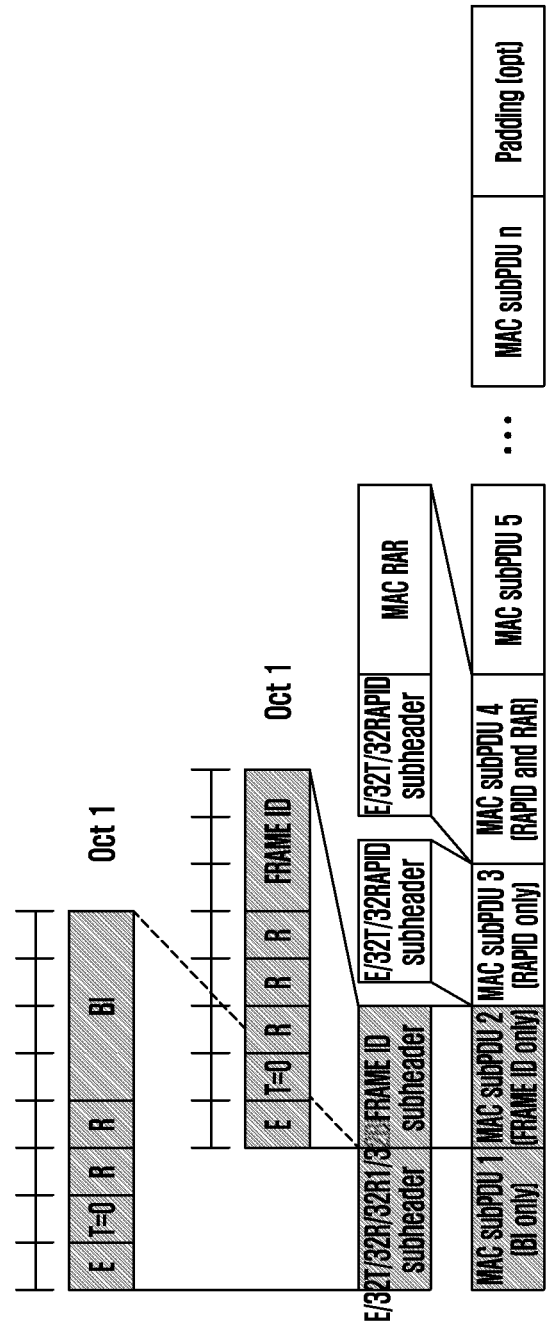
FIG. 9 shows an example of an RAR MAC PDU based on first RAR MAC PDU format according to an embodiment of the disclosure.

First RAR MAC PDU Format:

FIG. 9 shows an example of an RAR MAC PDU based on first RAR MAC PDU format according to another embodiment of the disclosure. For illustration, Frame ID is assumed to be 3 bits corresponding to max RAR window size of 80 ms in FIG. 9.

Referring to FIG. 9, RAR MAC PDU according to first (i.e. enhanced) RAR MAC PDU format consists of one or more MAC subPDUs and optionally padding. Each MAC subPDU consists one of the following:
- a MAC subheader with Frame Identifier only;
- a MAC subheader with Backoff Indicator only;
- a MAC subheader with RAPID only (i.e. acknowledgment for SI request);
- a MAC subheader with RAPID and MAC RAR.

The Frame Identifier MAC subheader includes E, T, and Frame Identifier (FRAME ID). It may also include one or more R bits, depending on number of bits defined for frame identifier. For example, if Frame Identifier is 6 bits long, there are no R bits. If Frame Identifier is 3 bits long, there are three R bits. The Frame Identifier is one of the following:
- Frame Identifier=SFN
- Frame Identifier=SFN modulo (Maximum supported RAR window size in radio frames)
- Frame Identifier=SFN modulo (Configured RAR window size in radio frames)
- Frame Identifier='p' least significant bits of SFN, where 'p' can be pre-defined or equal to $\log_2$(Maximum RAR window size in radio frames) or $\log_2$(Configured RAR window size in radio frames)
- SFN is the system frame number of radio frame of PRACH occasion or system frame number of radio frame in which PRACH occasion starts.
- Configured RAR window size is the size of RAR window signaled by gNB wherein gNB selects a size of RAR window from a set of configurable RAR window sizes. The set of configurable RAR window sizes is pre-defined. Maximum supported RAR window size refers to maximum value of RAR window size in set of configurable RAR window sizes.

A MAC subheader with Backoff Indicator consists of five header fields E/T/R/R/BI. A MAC subheader with Frame identifier consists of at least three header fields E/T/FRAME ID. T bit is set to same value (e.g. T equal 0) for MAC subheader with Backoff Indicator and MAC subheader with Frame identifier. In RAR MAC PDU, if there is only one MAC subPDU including subheader with T=0, subheader is frame identifier subheader. If there are two MAC subPDUs including subheader with T=0, the first MAC subPDU is for BI and second one is for frame identifier.

A MAC subheader with RAPID consists of three header fields E/T/RAPID. Padding is placed at the end of the MAC PDU if present. Presence and length of padding is implicit based on TB size and size of MAC subPDU(s). The value of T bit in RAPID subheader is different than the value of T bit in Frame identifier subheader and BI subheader.

E field set to '0' in MAC subheader of a MAC subPDU indicates that the MAC subPDU is the last MAC subPDU in the MAC PDU. The E field set to '1' in MAC subheader of a MAC subPDU indicates at least another MAC subPDU follows.

A MAC subPDU with Backoff Indicator only, if included, is placed at the beginning of the MAC PDU. A MAC subPDU with Frame Identifier only is placed at the beginning of the MAC PDU after the MAC subPDU with Backoff indicator, if included. 'MAC subPDU(s) with RAPID only' and 'MAC subPDU(s) with RAPID and MAC RAR' can be placed anywhere between second MAC subPDU and padding (if any), if backoff indication is included in MAC PDU. 'MAC subPDU(s) with RAPID only' and 'MAC subPDU(s) with RAPID and MAC RAR' can be placed anywhere between first MAC subPDU and padding (if any), if backoff indication is not included in MAC PDU.

The advantage of first RAR MAC PDU format as disclosed in this method is that Frame identifier can be applied to both MAC sub PDU including RAR and MAC subPDU including SI request acknowledgment. The overhead is less as frame identifier is added only once per RAR MAC PDU. Frame Identifier is not required to be always included in RAR MAC PDU. It can be skipped in RAR MAC PDU only includes BI. Additionally, this approach is beneficial for UE implementation as MAC subheader structures for first and second RAR MAC PDU format are similar and thereby reduce implementation complexity.

Second RAR MAC PDU Format: In this method of the disclosure, RAR MAC PDU according to second (i.e. regular) RAR MAC PDU format is same as described in Method 1.

UE Operation:

Embodiment 1

Figure 10:
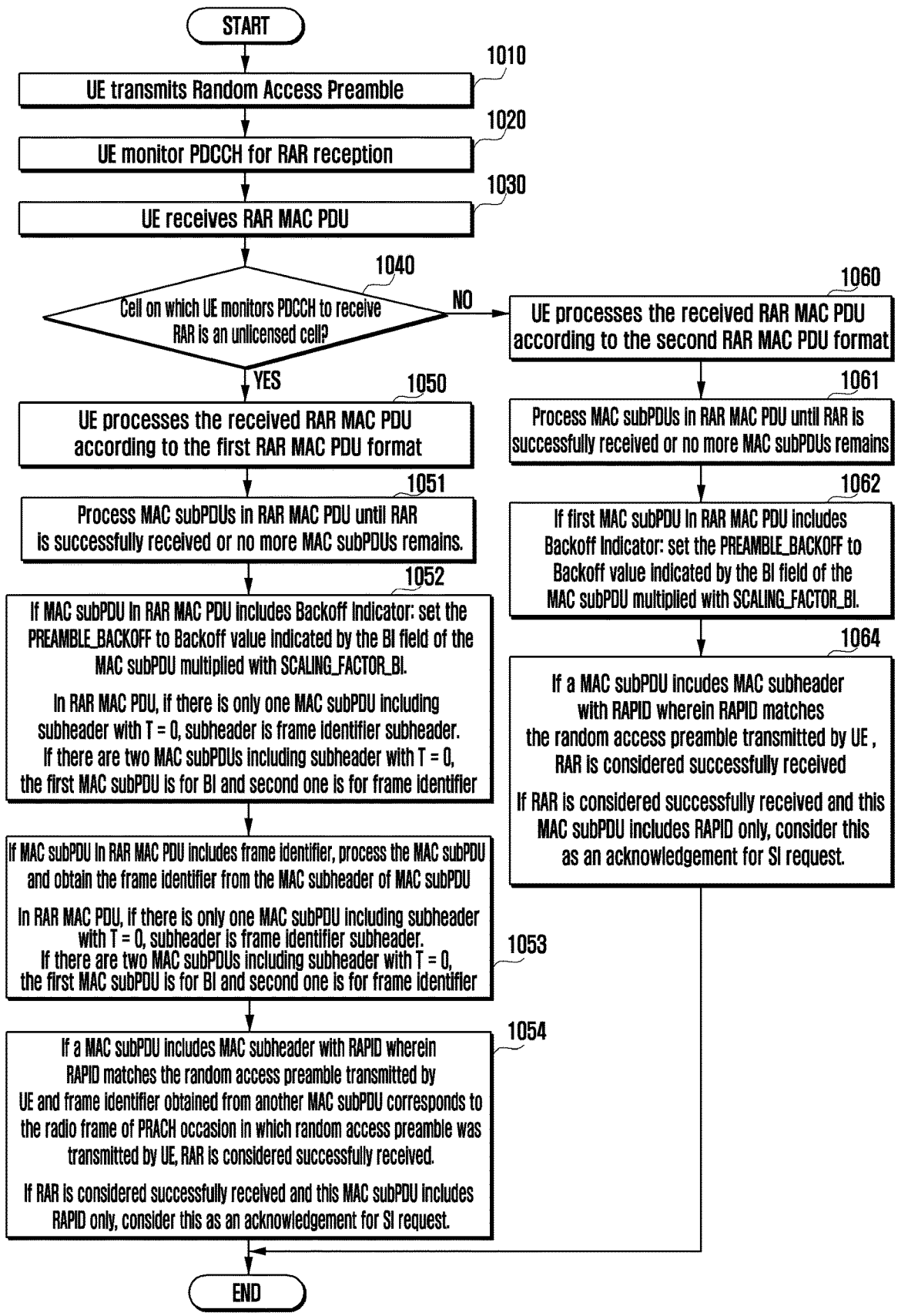
FIG. 10 shows the UE operation according to an embodiment of the disclosure.

FIG. 10 shows the UE operation according to another embodiment of the disclosure.

Referring to FIG. 10, UE transmits RA preamble at operation 1010, UE monitors PDCCH for RAR reception at operation 1020, and UE receives RAR MAC PDU at operation 1030. UE determines whether the cell on which UE monitors PDCCH to receive RAR is an unlicensed cell or not at operation 1040. If the cell is an unlicensed cell, UE processes the received RAR MAC PDU according to the first RAR MAC PDU format at operation 1050. If the cell is a licensed cell, UE processes the received RAR MAC PDU according to the second RAR MAC PDU format at operation 1060. A cell is an unlicensed cell if the DL carrier frequency of cell corresponds to unlicensed band. Otherwise the cell is licensed cell.

While processing the RAR MAC PDU according to first MAC PDU format, UE processes MAC subPDUs in RAR MAC PDU until RAR is successfully received or no more MAC subPDUs remains at operation 1051. If MAC subPDU in RAR MAC PDU includes backoff indicator, UE sets the PREAMBLE_BACKOFF to backoff value indicated by the BI field of the MAC subPDU multiplied with SCALING_FACTOR_BI at operation 1052. If MAC subPDU in RAR MAC PDU includes frame identifier, UE process the MAC subPDU and obtains the frame identifier from the MAC subheader of MAC subPDU at operation 1053. If a MAC subPDU includes MAC subheader with RAPID wherein RAPID matches the RA preamble transmitted by UE and frame identifier obtained from another MAC subPDU corresponds to the radio frame of PRACH occasion in which RA preamble was transmitted by UE, UE considers that RAR is successfully received at operation 1054. If RAR is considered successfully received and this MAC subPDU includes RAPID only, UE considers this as an acknowledgement for SI request. UE determines whether MAC subheader is a BI subheader or frame identifier as follows: In RAR MAC PDU, if there is only one MAC subPDU including subheader with T=0, subheader is frame identifier subheader and this MAC subPDU includes only frame identifier subheader. If there are two MAC subPDUs including subheader with T=0, the first MAC subPDU includes BI and second one includes frame identifier. UE determines that MAC subheader is a RAPID subheader if T=1.

While processing RAR MAC PDU according to second RAR MAC PDU format, UE processes MAC subPDUs in RAR MAC PDU until RAR is successfully received or no more MAC subPDUs remains at operation 1061. If first MAC subPDU in RAR MAC PDU includes backoff indicator, UE sets the PREAMBLE_BACKOFF to backoff value indicated by the BI field of the MAC subPDU multiplied with SCALING_FACTOR_BI at operation 1062. If a MAC subPDU includes MAC subheader with RAPID wherein RAPID matches the RA preamble transmitted by UE, UE considers that RAR is successfully received at operation 1064. If RAR is considered successfully received and this MAC subPDU includes RAPID only, UE considers this as an acknowledgement for SI request. UE determines whether MAC subheader in a MAC subPDU is a BI subheader or RAPID subheader. UE determines that MAC subheader is a BI subheader if T=0; and MAC subheader is a RAPID subheader if T=1.

Embodiment 2

In another embodiment, UE transmits RA preamble, UE monitors PDCCH for RAR reception, and UE receives RAR MAC PDU. UE determines whether the configured RAR window size is greater than 10 ms or not. If the configured RAR window size is greater than 10 ms, UE processes the received RAR MAC PDU according to the first RAR MAC PDU format. If the configured RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 10. While processing the RAR MAC PDU according to first MAC PDU format, UE determines whether MAC subheader is a BI subheader or frame identifier as follows: In RAR MAC PDU, if there is only one MAC subPDU including subheader with T=0, subheader is frame identifier subheader and this MAC subPDU includes only frame identifier subheader. If there are two MAC subPDUs including subheader with T=0, the first MAC subPDU includes BI and second one includes frame identifier. UE determines that MAC subheader is a RAPID subheader if T=1. While processing RAR MAC PDU according to second RAR MAC PDU format, UE determines whether MAC subheader in a MAC subPDU is a BI subheader or RAPID subheader. UE determines that MAC subheader is a BI subheader if T=0; and MAC subheader is a RAPID subheader if T=1.

Embodiment 3

Figure 11:
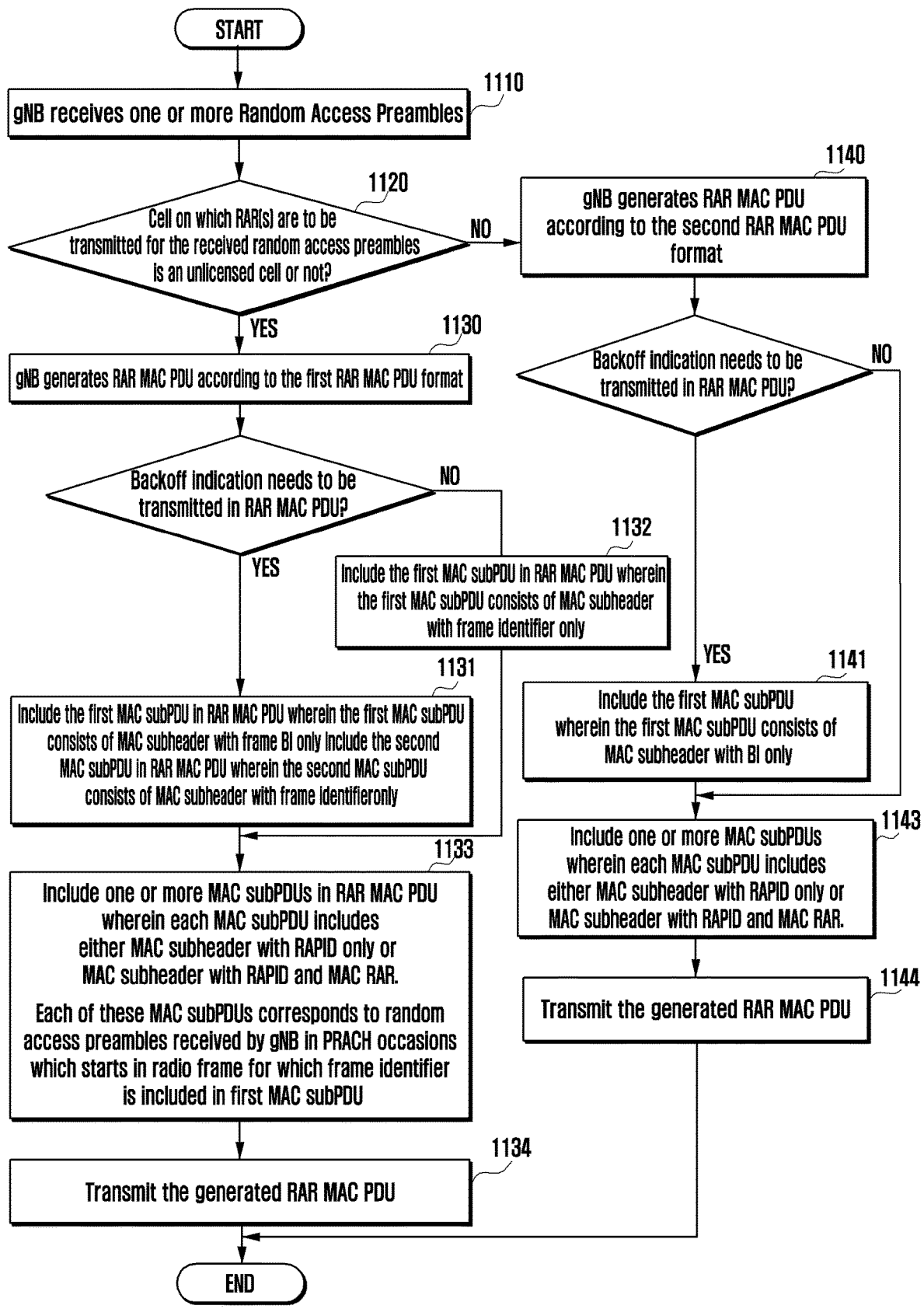
FIG. 11 shows the gNB operation according to an embodiment of the disclosure.

In another embodiment, UE transmits RA preamble, UE monitors PDCCH for RAR reception, and UE receives RAR MAC PDU. UE determines whether the maximum supported RAR window size is greater than 10 ms or not. If the maximum supported RAR window size is greater than 10 ms, UE processes the received RAR MAC PDU according to the first RAR MAC PDU format. If the maximum supported RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 10. While processing the RAR MAC PDU according to first MAC PDU format, UE determines whether MAC subheader is a BI subheader or frame identifier as follows: In RAR MAC PDU, if there is only one MAC subPDU including subheader with T=0, subheader is frame identifier subheader and this MAC subPDU includes only frame identifier subheader. If there are two MAC subPDUs including subheader with T=0, the first MAC subPDU includes BI and second one includes frame identifier. UE determines that MAC subheader is a RAPID subheader if T=1. While processing RAR MAC PDU according to second RAR MAC PDU format, UE determines whether MAC subheader in a MAC subPDU is a BI subheader or RAPID subheader. UE determines that MAC subheader is a BI subheader if T=0; and MAC subheader is a RAPID subheader if T=1.

gNB Operation:

FIG. 11 shows the gNB operation according to an embodiment of the disclosure.

Referring to FIG. 11, gNB receives one or more RA preambles at operation 1110, and determines whether the cell on which RAR(s) are to be transmitted is an unlicensed cell or not at operation 1120. If the cell is an unlicensed cell, gNB generates the RAR MAC PDU for transmission according to the first RAR MAC PDU format at operation 1130. If the cell is a licensed cell, gNB generates the RAR MAC PDU for transmission according to the second RAR MAC PDU format at operation 1140. A cell is an unlicensed cell if the DL carrier frequency of cell corresponds to unlicensed band. Otherwise the cell is a licensed cell.

While generating RAR MAC PDU according to first RAR MAC PDU format, a MAC subPDU with Backoff Indicator only, if included, is placed at the beginning of the MAC PDU, i.e. first MAC subPDU includes BI. A MAC subPDU with frame identifier is the second MAC subPDU if first MAC subPDU includes BI. If backoff indication needs to be transmitted in RAR MAC PDU, gNB includes the first MAC subPDU in RAR MAC PDU wherein the first MAC subPDU consists of MAC subheader with BI only at operation 1131. gNB also includes the second MAC subPDU in RAR MAC PDU wherein the second MAC subPDU consists of MAC subheader with frame identifier only. If backoff indication does not need to be transmitted in RAR MAC PDU, gNB includes the first MAC subPDU in RAR MAC PDU wherein the first MAC subPDU consists of MAC subheader with BI only at operation 1132. gNB includes one or more MAC subPDUs in RAR MAC PDU wherein each MAC subPDU includes either MAC subheader with RAPID only or MAC subheader with RAPID and MAC RAR at operation 1133. Each of these MAC subPDUs corresponds to RA preambles received by gNB in PRACH occasions which starts in radio frame for which frame identifier is included in first MAC subPDU.

While generating the RAR MAC PDU according to the second RAR MAC PDU format, if backoff indication needs to be transmitted in RAR MAC PDU, gNB includes the first MAC subPDU wherein the first MAC subPDU consists of MAC subheader with BI only at operation 1141. gNB includes one or more MAC subPDUs wherein each MAC subPDU includes either MAC subheader with RAPID only or MAC subheader with RAPID and MAC RAR at operation 1143.

gNB transmits the generated RAR MAC PDU at operation 1134 or 1144.

In another embodiment, gNB receives one or more RA preambles, and determines whether the cell on which RAR(s) are to be transmitted is configured with an RAR window size greater than 10 ms or not. If the configured RAR window size is greater than 10 ms, gNB generates the RAR MAC PDU for transmission according to the first RAR MAC PDU format. If the configured RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 11. While generating RAR MAC PDU according to first RAR MAC PDU format, a MAC subPDU with Backoff Indicator only, if included, is placed at the beginning of the MAC PDU, i.e. first MAC subPDU includes BI. A MAC subPDU with frame identifier is the second MAC subPDU if first MAC subPDU includes BI.

In another embodiment, gNB receives one or more RA preambles, and determines whether for the cell on which RAR(s) are to be transmitted, the maximum supported RAR window size is greater than 10 ms or not. If the maximum supported RAR window size is greater than 10 ms, gNB generates the RAR MAC PDU for transmission according to the first RAR MAC PDU format. If the maximum supported RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 11. While generating RAR MAC PDU according to first RAR MAC PDU format, a MAC subPDU with Backoff Indicator only, if included, is placed at the beginning of the MAC PDU, i.e. first MAC subPDU includes BI. A MAC subPDU with frame identifier is the second MAC subPDU if first MAC subPDU includes BI.

Method 4

In the fourth method of this disclosure for transmitting and receiving frame information in RAR, UE/gNB transmits/receives RAR MAC PDU wherein the RAR MAC PDU is one of a first RAR MAC PDU format and a second RAR MAC PDU format.

Figure 12:
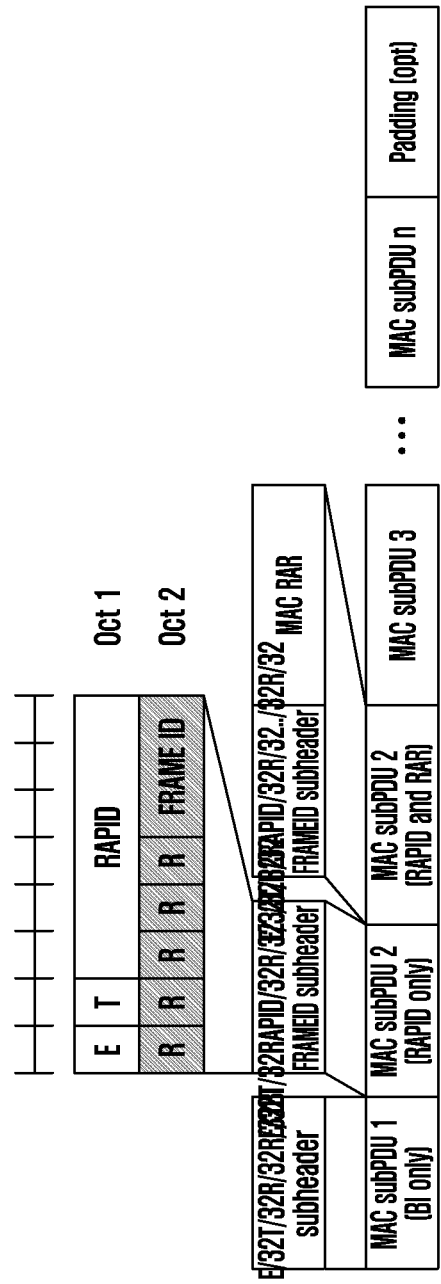
FIG. 12 shows an example of an RAR MAC PDU based on first RAR MAC PDU format according to an embodiment of the disclosure.

First RAR MAC PDU Format:

FIG. 12 shows an example of an RAR MAC PDU based on first RAR MAC PDU format according to an embodiment of the disclosure. For illustration, frame ID is assumed to be 3 bits corresponding to max RAR window size of 80 ms in FIG. 12.

Referring to FIG. 12, RAR MAC PDU according to first (i.e. enhanced) RAR MAC PDU format consists of one or more MAC subPDUs and optionally padding. Each MAC subPDU consists one of the following:
  a MAC subheader with Backoff Indicator only;
  a MAC subheader with RAPID and FRAME ID only (i.e. acknowledgment for SI request);
  a MAC subheader with RAPID, FRAME ID and MAC RAR.

The RAPID MAC subheader includes E, T, RAPID, and Frame Identifier (FRAME ID). It may also include one or more R bits, depending on number of bits defined for frame identifier. For example, if frame identifier is 8 bits long, there are no R bits. If frame identifier is 3 bits long, there are five R bits. The Frame Identifier is one of the following:

Frame Identifier=SFN

Frame Identifier=SFN modulo (Maximum supported RAR window size in radio frames)

Frame Identifier=SFN modulo (Configured RAR window size in radio frames)

Frame Identifier='p' least significant bits of SFN, where 'p' can be pre-defined or equal to $\log_2$(Maximum RAR window size in radio frames) or $\log_2$(Configured RAR window size in radio frames)

SFN is the system frame number of radio frame of PRACH occasion or system frame number of radio frame in which PRACH occasion starts Configured RAR window size is the size of RAR window signaled by gNB wherein gNB selects a size of RAR window from a set of configurable RAR window sizes. The set of configurable RAR window sizes is pre-defined. Maximum supported RAR window size refers to maximum value of RAR window size in set of configurable RAR window sizes.

A MAC subheader with Backoff Indicator consists of five header fields E/T/R/R/BI.

A MAC subheader with RAPID and FRAME ID consists of at least four header fields E/T/RAPID/FRAME ID. It may also include one or more R bits, depending on number of bits defined for FRAME ID. Padding is placed at the end of the MAC PDU if present. Presence and length of padding is implicit based on TB size and size of MAC subPDU(s).

A MAC subPDU with Backoff Indicator only, if included, is placed at the beginning of the MAC PDU. 'MAC subPDU(s) with RAPID only' and 'MAC subPDU(s) with RAPID and MAC RAR' can be placed anywhere between second MAC subPDU and padding (if any), if backoff indication is included in MAC PDU. 'MAC subPDU(s) with RAPID only' and 'MAC subPDU(s) with RAPID and MAC RAR' can be placed anywhere from first MAC subPDU and padding (if any), if backoff indication is not included in MAC PDU.

E field set to '0' in MAC subheader of a MAC subPDU indicates that the MAC subPDU is the last MAC subPDU in the MAC PDU. The E field set to '1' in MAC subheader of a MAC subPDU indicates at least another MAC subPDU follows.

This approach is beneficial for UE implementation as MAC subheader structures for first and second RAR MAC PDU format are similar and thereby reduce implementation complexity. The number of MAC subheader is also not increased in this approach.

Second RAR MAC PDU Format: In this method of the proposed disclosure, RAR MAC PDU according to second (i.e. regular) RAR MAC PDU format is same as described in Method 1.

UE Operation:

Embodiment 1

Figure 13:
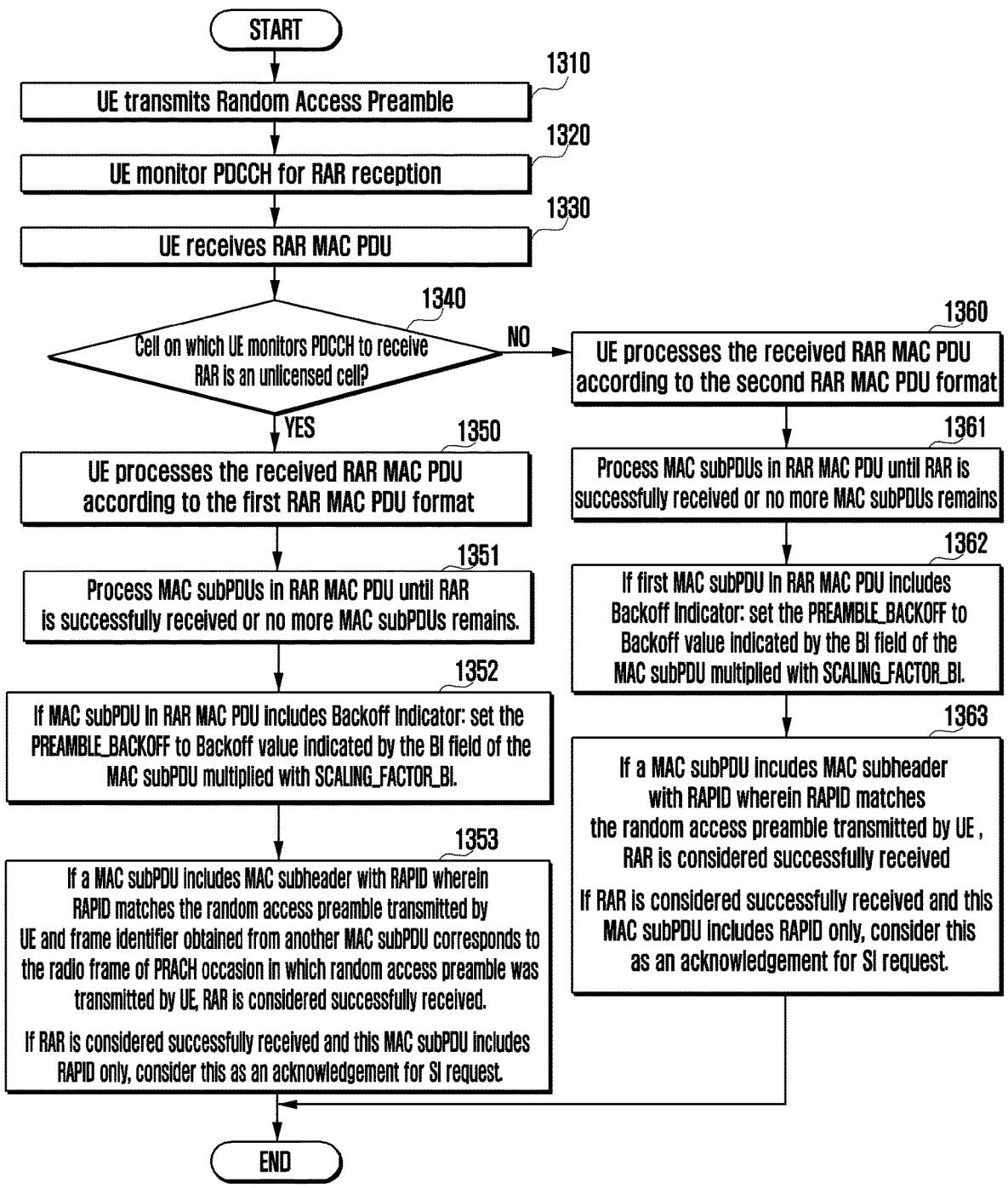
FIG. 13 shows the UE operation according to an embodiment of the disclosure.

FIG. 13 shows the detailed UE operation according to another embodiment of the disclosure.

Referring to FIG. 13, UE transmits RA preamble at operation 1310, UE monitors PDCCH for RAR reception at operation 1320, and UE receives RAR MAC PDU at operation 1330. UE determines whether the cell on which UE monitors PDCCH to receive RAR is an unlicensed cell or not at operation 1340. If the cell is an unlicensed cell, UE processes the received RAR MAC PDU according to the first RAR MAC PDU format at operation 1350. If the cell is a licensed cell, UE processes the received RAR MAC PDU according to the second RAR MAC PDU format at operation 1360. A cell is an unlicensed cell if the DL carrier frequency of cell corresponds to unlicensed band. Otherwise the cell is licensed cell.

While processing the RAR MAC PDU according to first MAC PDU format, UE processes MAC subPDUs in RAR MAC PDU until RAR is successfully received or no more MAC subPDUs remains at operation 1351. If MAC subPDU in RAR MAC PDU includes backoff indicator, UE sets the PREAMBLE_BACKOFF to backoff value indicated by the BI field of the MAC subPDU multiplied with SCALING_FACTOR_BI at operation 1352. If a MAC sub-PDU includes MAC subheader with RAPID and FRAME ID wherein RAPID matches the RA preamble transmitted by UE and FRAME ID corresponds to the radio frame of PRACH occasion in which RA preamble was transmitted by UE, UE considers that RAR is successfully received at operation 1353. If RAR is considered successfully received and this MAC subPDU includes RAPID only, UE considers this as an acknowledgement for SI request.

While processing RAR MAC PDU according to second RAR MAC PDU format, UE processes MAC subPDUs in RAR MAC PDU until RAR is successfully received or no more MAC subPDUs remains at operation 1361. If first MAC subPDU in RAR MAC PDU includes backoff indicator, UE sets the PREAMBLE_BACKOFF to backoff value indicated by the BI field of the MAC subPDU multiplied with SCALING_FACTOR_BI at operation 1362. If a MAC subPDU includes MAC subheader with RAPID wherein RAPID matches the RA preamble transmitted by UE, UE considers that RAR is successfully received at operation 1363. If RAR is considered successfully received and this MAC subPDU includes RAPID only, UE considers this as an acknowledgement for SI request.

Embodiment 2

In another embodiment, UE transmits RA preamble, UE monitors PDCCH for RAR reception, and UE receives RAR MAC PDU. UE determines whether the configured RAR window size is greater than 10 ms or not. If the configured RAR window size is greater than 10 ms, UE processes the received RAR MAC PDU according to the first RAR MAC PDU format. If the configured RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 13.

Embodiment 3

Figure 14:
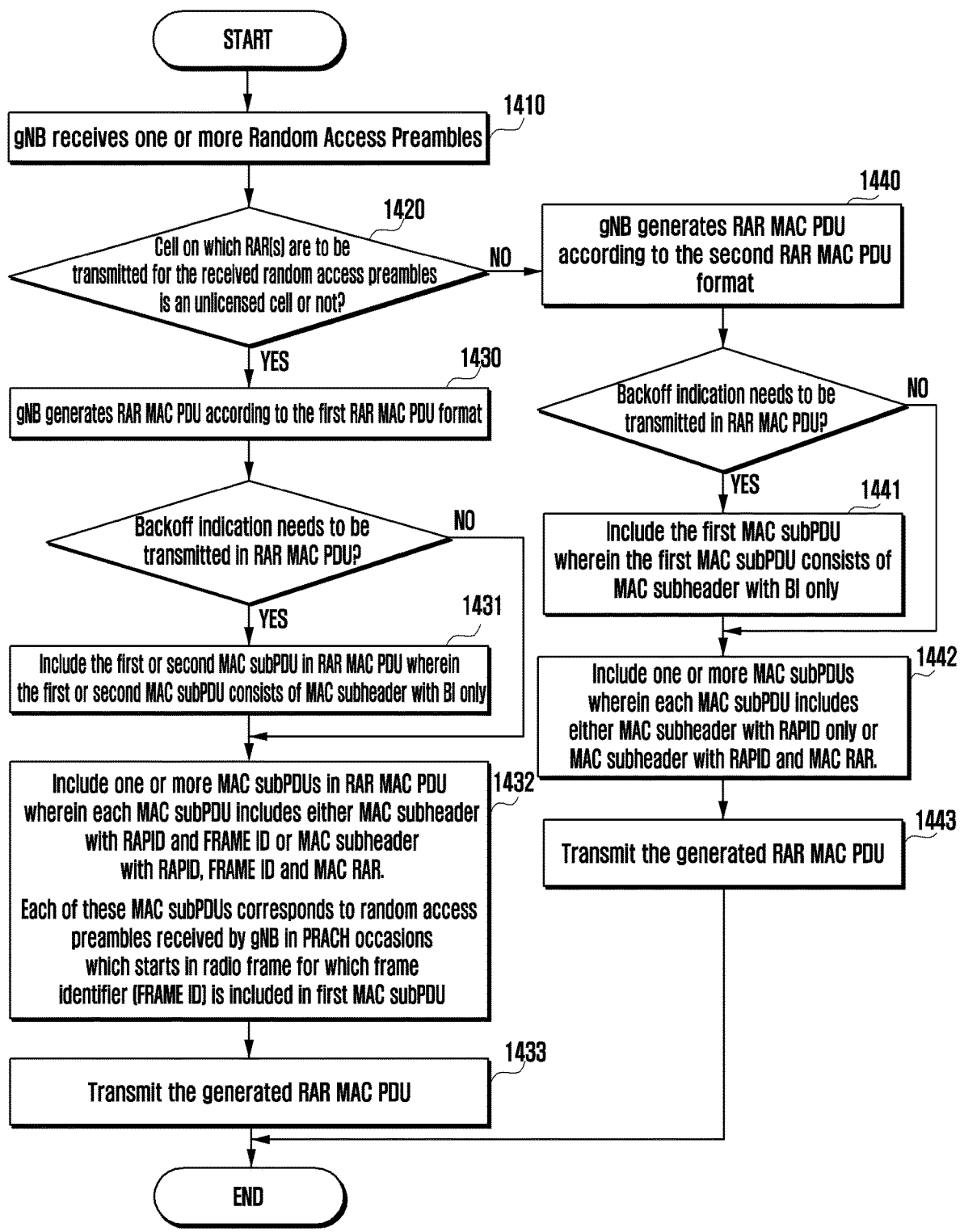
FIG. 14 shows the gNB operation according to an embodiment of the disclosure.

In another embodiment, UE transmits RA preamble, UE monitors PDCCH for RAR reception, and UE receives RAR MAC PDU. UE determines whether the maximum supported RAR window size is greater than 10 ms or not. If the maximum supported RAR window size is greater than 10 ms, UE processes the received RAR MAC PDU according to the first RAR MAC PDU format. If the maximum supported RAR window size is less than equal to 10 ms, UE processes the received RAR MAC PDU according to the second RAR MAC PDU format. The detailed UE operation in this embodiment with regards to processing the RAR MAC PDU after determining the first or second RAR MAC PDU format is same as described in FIG. 13.

gNB Operation:

FIG. 14 shows the gNB operation according to an embodiment of the disclosure.

Referring to FIG. 14, gNB receives one or more RA preambles at operation 1410, and determines whether the cell on which RAR(s) are to be transmitted is an unlicensed cell or not at operation 1420. If the cell is an unlicensed cell, gNB generates the RAR MAC PDU for transmission according to the first RAR MAC PDU format at operation 1430. If the cell is a licensed cell, gNB generates the RAR MAC PDU for transmission according to the second RAR MAC PDU format at operation 1440. A cell is an unlicensed cell if the DL carrier frequency of cell corresponds to unlicensed band. Otherwise the cell is a licensed cell.

While generating RAR MAC PDU according to first RAR MAC PDU format, if backoff indication needs to be transmitted in RAR MAC PDU, gNB includes the first MAC subPDU in RAR MAC PDU wherein the first MAC subPDU consists of MAC subheader with BI only at operation 1431. gNB includes one or more MAC subPDUs in RAR MAC PDU wherein each MAC subPDU includes either MAC subheader with RAPID and FRAME ID or MAC subheader with RAPID, FRAME ID and MAC RAR at operation 1432. Each of these MAC subPDUs corresponds to RA preambles received by gNB in PRACH occasions which starts in radio frame for which frame identifier (FRAME ID) is included in first MAC subPDU.

While generating the RAR MAC PDU according to the second RAR MAC PDU format, if backoff indication needs to be transmitted in RAR MAC PDU, gNB includes the first MAC subPDU wherein the first MAC subPDU consists of MAC subheader with BI only at operation 1441. gNB includes one or more MAC subPDUs wherein each MAC subPDU includes either MAC subheader with RAPID only or MAC subheader with RAPID and MAC RAR at operation 1442.

gNB transmits the generated RAR MAC PDU at operation 1433 or 1443.

In another embodiment, gNB receives one or more RA preambles, and determines whether the cell on which RAR(s) are to be transmitted is configured with an RAR window size greater than 10 ms or not. If the configured RAR window size is greater than 10 ms, gNB generates the RAR MAC PDU for transmission according to the first RAR MAC PDU format. If the configured RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 14.

In another embodiment, gNB receives one or more RA preambles, and determines whether for the cell on which RAR(s) are to be transmitted, the maximum supported RAR window size is greater than 10 ms or not. If the maximum supported RAR window size is greater than 10 ms, gNB generates the RAR MAC PDU for transmission according to the first RAR MAC PDU format. If the maximum supported RAR window size is less than equal to 10 ms, gNB generates the RAR MAC PDU for transmission according to the second RAR MAC PDU format. gNB then transmits the generated RAR MAC PDU. The detailed gNB operation in this embodiment with regards to generating the RAR MAC PDU after determining the first or second RAR MAC PDU format is same as described in FIG. 14.

Method 5

In this method of the disclosure for transmitting and receiving frame information in RAR, it is proposed to define a new MAC subheader (i.e. Frame Identifier MAC subheader). The Frame Identifier MAC subheader includes T, and Frame Identifier (FRAME ID). It may also include one or more R bits, depending on number of bits defined for frame identifier. For example, if frame identifier is 6 bits long, there are no R bits. If frame identifier is 3 bits long, there are three R bits. The Frame Identifier is one of the following:

Frame Identifier=SFN

Frame Identifier=SFN modulo (Maximum supported RAR window size in radio frames)

Frame Identifier=SFN modulo (Configured RAR window size in radio frames)

Frame Identifier='p' least significant bits of SFN, where 'p' can be pre-defined or equal to $\log_2$(Maximum RAR window size in radio frames) or $\log_2$(Configured RAR window size in radio frames)

SFN is the system frame number of radio frame of PRACH occasion or system frame number of radio frame in which PRACH occasion starts.

Configured RAR window size is the size of RAR window signaled by gNB wherein gNB selects a size of RAR window from a set of configurable RAR window sizes. The set of configurable RAR window sizes is pre-defined. Maximum supported RAR window size refers to maximum value of RAR window size in set of configurable RAR window sizes.

In the disclosure, UE/gNB transmits/receives RAR MAC PDU wherein the RAR MAC PDU is one of a first RAR MAC PDU format and a second RAR MAC PDU format.

First RAR MAC PDU Format:

In this method of the disclosure, RAR MAC PDU consists of one or more MAC subPDUs and optionally padding. Each MAC subPDU consists one of the following:

a MAC subheader with Frame Identifier only;
a MAC subheader with Backoff Indicator only;
a MAC subheader with RAPID only (i.e. acknowledgment for SI request);
a MAC subheader with RAPID and MAC RAR.
a MAC subheader indicating Padding A MAC subheader with Backoff Indicator consists of four header fields T/R/R/BI.

A MAC subheader with Frame identifier consists of at least two header fields T/FRAME ID.

A MAC subheader with RAPID consists of two header fields T/RAPID. Padding is placed at the end of the MAC PDU if present. Presence and length of padding is implicit based on TB size and size of MAC subPDU(s).

A MAC subheader for padding consists of T/R/R/R/R/R. 2 bit type field distinguishes BI, Frame identifier, RAPID and padding subheader.

A MAC subPDU with Backoff Indicator only, if included is placed at the beginning of the MAC PDU. A MAC subPDU with Frame Identifier only is placed at the beginning of the MAC PDU after the MAC subPDU with Backoff indicator, if included. 'MAC subPDU(s) with RAPID only' and 'MAC subPDU(s) with RAPID and MAC RAR' can be placed anywhere between second MAC subPDU and padding (if any), if backoff indication is included in MAC PDU. 'MAC subPDU(s) with RAPID only' and 'MAC subPDU(s)

with RAPID and MAC RAR' can be placed anywhere between first MAC subPDU and padding (if any), if backoff indication is not included in MAC PDU.

(Alternate) A MAC subPDU with Backoff Indicator only, if included, is placed at the beginning of the MAC PDU. A MAC subPDU with Frame Identifier only is placed before the first MAC subPDU which includes RAPID and MAC RAR. 'MAC subPDU(s) with RAPID only' can be placed anywhere between second MAC subPDU and padding (if any), if backoff indication is included in MAC PDU. 'MAC subPDU(s) with RAPID only' can be placed anywhere between first MAC subPDU and padding (if any), if backoff indication is not included in MAC PDU. 'MAC subPDU(s) with RAPID and MAC RAR' is placed after the MAC subPDU carrying frame identifier and before padding (if any).

Second RAR MAC PDU Format: In this method of the disclosure, RAR MAC PDU according to second (i.e. regular) RAR MAC PDU format is same as described in Method 1.

UE operation: In an embodiment, UE transmits RA preamble, UE monitors PDCCH for RAR reception, and UE receives RAR MAC PDU. UE determines whether the cell on which UE monitors PDCCH to receive RAR is an unlicensed cell or not. If the cell is an unlicensed cell, UE processes the received RAR MAC PDU according to the first RAR MAC PDU format. If the cell is a licensed cell, UE processes the received RAR MAC PDU according to the second RAR MAC PDU format. A cell is an unlicensed cell if the DL carrier frequency of cell corresponds to unlicensed band. Otherwise the cell is licensed cell. In an embodiment, UE operation is as illustrated in FIG. 7.

In another embodiment, UE transmits RA preamble, UE monitors PDCCH for RAR reception, and UE receives RAR MAC PDU. UE determines whether the configured RAR window size is greater than 10 ms or not. If the configured RAR window size is greater than 10 ms, UE processes the received RAR MAC PDU according to the first RAR MAC PDU format. If the configured RAR window size is less than equal to 10 ms, UE processes the received RAR MAC PDU according to the second RAR MAC PDU format.

In another embodiment, UE transmits RA preamble, UE monitors PDCCH for RAR reception, and UE receives RAR MAC PDU. UE determines whether the maximum supported RAR window size is greater than 10 ms or not. If the maximum supported RAR window size is greater than 10 ms, UE processes the received RAR MAC PDU according to the first RAR MAC PDU format. If the maximum supported RAR window size is less than equal to 10 ms, UE processes the received RAR MAC PDU according to the second RAR MAC PDU format.

gNB Operation: In an embodiment, gNB receives one or more RA access preambles, and determines whether the cell on which RAR(s) are to be transmitted is an unlicensed cell or not. If the cell is an unlicensed cell, gNB generates the RAR MAC PDU for transmission according to the first RAR MAC PDU format. If the cell is a licensed cell, gNB generates the RAR MAC PDU for transmission according to the second RAR MAC PDU format. A cell is an unlicensed cell if the DL carrier frequency of cell corresponds to unlicensed band. Otherwise the cell is a licensed cell. In an embodiment gNB operation is as illustrated in FIG. 8.

In another embodiment, gNB receives one or more RA preambles, and determines whether the cell on which RAR(s) are to be transmitted is configured with an RAR window size greater than 10 ms or not. If the configured RAR window size is greater than 10 ms, gNB generates the RAR MAC PDU for transmission according to the first RAR MAC PDU format. If the configured RAR window size is less than equal to 10 ms, gNB generates the RAR MAC PDU for transmission according to the second RAR MAC PDU format. gNB then transmits the generated RAR MAC PDU.

In another embodiment, gNB receives one or more RA preambles, and determines whether for the cell on which RAR(s) are to be transmitted, the maximum supported RAR window size is greater than 10 ms or not. If the maximum supported RAR window size is greater than 10 ms, gNB generates the RAR MAC PDU for transmission according to the first RAR MAC PDU format. If the maximum supported RAR window size is less than equal to 10 ms, gNB generates the RAR MAC PDU for transmission according to the second RAR MAC PDU format. gNB then transmits the generated RAR MAC PDU.

Method of Handling Configured Grant Transmission in Unlicensed Carrier

For uplink (UL) transmission on unlicensed carrier, UE needs to perform channel sensing (i.e. listen-before-talk (LBT)) to determine whether channel is free or not before transmission. There are two types of LBT procedures defined for UL transmission as explained below:

Category 1: No LBT

No LBT procedure is performed by the transmitting entity.

Category 2: LBT without Random Back-Off

The duration of time that the channel is sensed to be idle before the transmitting entity transmits is deterministic. In an example, sensing interval can be 25 us, i.e. UE can transmit, after sensing the channel to be idle for at least a sensing interval Td=25 us. For UL transmission, category 3 is also referred as Type 2 channel access procedure.

Category 3: LBT with Random Back-Off with a Contention Window of Fixed Size

UE transmits after sensing the channel to be idle during the slot durations of a defer duration (Td); and after the counter is zero in step 4. The detailed procedure is as follows:

Step 1: set $N=N_{init}$, where $N_{init}$ is a random number uniformly distributed between 0 and CWp. CWp is the contention window for a given channel access priority class 'p'. The various LBT parameters for different channel access priority class (CAPC) are listed in Table 1 below.

TABLE 1

| Channel Access Priority Class (P) | $m_p$ | $CW_{min,p}$ | $CW_{max,p}$ | $T_{mcot,p}$ | allowed $CW_P$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms* | {15, 31, 63} |
| 4 | 7 | 15 | 1023 | 8 or 10 ms* | {15, 31, 63, 127, 255, 511, 1023} |

If the absence of any other technology sharing the carrier can be guaranteed on a long term basis (e.g. by level of regulation), the maximum channel occupancy time for LBT priority classes 3 and 4 is for 10 msec. Otherwise, maximum channel occupancy time for LBT priority classes 3 and 4 is for 8 msec.

Step 2: if N>0, and the UE chooses to decrement the counter, set N=N−1.

Step 3: sense the channel for an additional slot duration. If the additional slot duration is idle, go to step 4; else, go to step 5.

Step 4: if N=0, perform transmission. Else, go to step 2.

Step 5: sense the channel during the slot durations of an additional defer duration Td. Defer duration (Td) is equal to $T_f+m_p \times Ts$, where $T_f$ is equal to 16 us and Ts is equal to 9 us.

Step 6: if the channel is sensed to be idle during Td, go to step 2. Else, go to step 5.

Category 4: LBT with Random Back-Off with a Contention Window of Variable Size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. The detailed procedure is same as category 3. Only difference is that in category 3 size of contention window is fixed whereas in category 4 the transmitting entity can vary the size of the contention window when drawing the random number N. For UL transmission category 4 is also referred as Type 1 channel access procedure.

In new radio (NR) system design, in the UL, the gNB can dynamically allocate resources to UEs via the cell-radio network temporary identifier (C-RNTI) on PDCCH(s). A UE always monitors the PDCCH(s) in order to find possible grants for UL transmission when its DL reception is enabled (activity governed by discontinuous reception (DRX) when configured). When carrier aggregation (CA) is configured, the same C-RNTI applies to all serving cells.

In addition, with Configured Grants, the gNB can allocate periodic UL resources for UL transmissions to UEs. Two types of configured UL grants are defined:

With Type 1, RRC directly provides the configured UL grant (including the periodicity).

With Type 2, RRC defines the periodicity of the configured UL grant while PDCCH addressed to configured scheduling-RNTI (CS-RNTI) can either signal and activate the configured UL grant, or deactivate it; i.e. a PDCCH addressed to CS-RNTI indicates that the UL grant can be implicitly reused according to the periodicity defined by RRC, until deactivated.

In case of dynamic grant, the LBT type/category to be used for channel access is signaled by gNB in PDCCH. The CAPC value to be used is also signaled by gNB in PDCCH.

For UL channel access for configured grants, gNB signals the CAPC for each logical channel (LCH). The MAC control elements (CEs) except padding buffer state report (BSR) MAC CE and recommended bit rate MAC CE use the highest priority CAPC (i.e. lowest CAPC index). Signaling radio bearer 0 (SRB0), signaling radio bearer 1 (SRB1), and signaling radio bearer 3 (SRB3) use the highest priority CAPC (i.e. lowest CAPC index) while the CAPC for SRB2 is configurable. UE selects the highest CAPC index (i.e. lowest priority CAPC) of the LCH(s) multiplexed in a MAC PDU.

One issue with this design of selecting CAPC for UL configured grants is that data corresponding to lowest CAPC (i.e. highest priority) is deprioritized.

Figure 15:
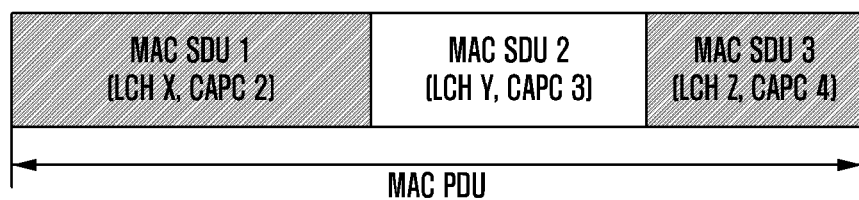
FIG. 15 is an example illustration of the design of selecting channel access priority class (CAPC) for UL configured grants of the related art.

FIG. 15 is an example illustration of the design of selecting CAPC for UL configured grants of the related art.

Referring to FIG. 15, according to the related art, CAPC 4 is selected for channel access, even though a very small amount of data corresponds to this CAPC in the MAC PDU. It may not always be good to select the lowest CAPC index (i.e. highest priority CAPC) of the LCH(s) multiplexed in a MAC PDU. It is possible that very small amount of data in MAC PDU belongs to lowest CAPC index. So some methods to enhance the current design are needed.

Method 1

In NR, MAC PDU consists of one or more MAC subPDUs. Each MAC subPDU consists of one of the following: a MAC subheader only (including padding); a MAC subheader and a MAC service data unit (SDU); a MAC subheader and a MAC CE; or a MAC subheader and padding. The MAC SDUs are of variable sizes. Each MAC subheader corresponds to either a MAC SDU, a MAC CE, or padding. A MAC subheader except for fixed sized MAC CE, padding, and a MAC SDU containing UL common control channel (CCCH) consists of the four header fields R/F/LCID/L. A MAC subheader for fixed sized MAC CE, padding, and a MAC SDU containing UL CCCH consists of the two header fields R/LCID.

Figure 16:
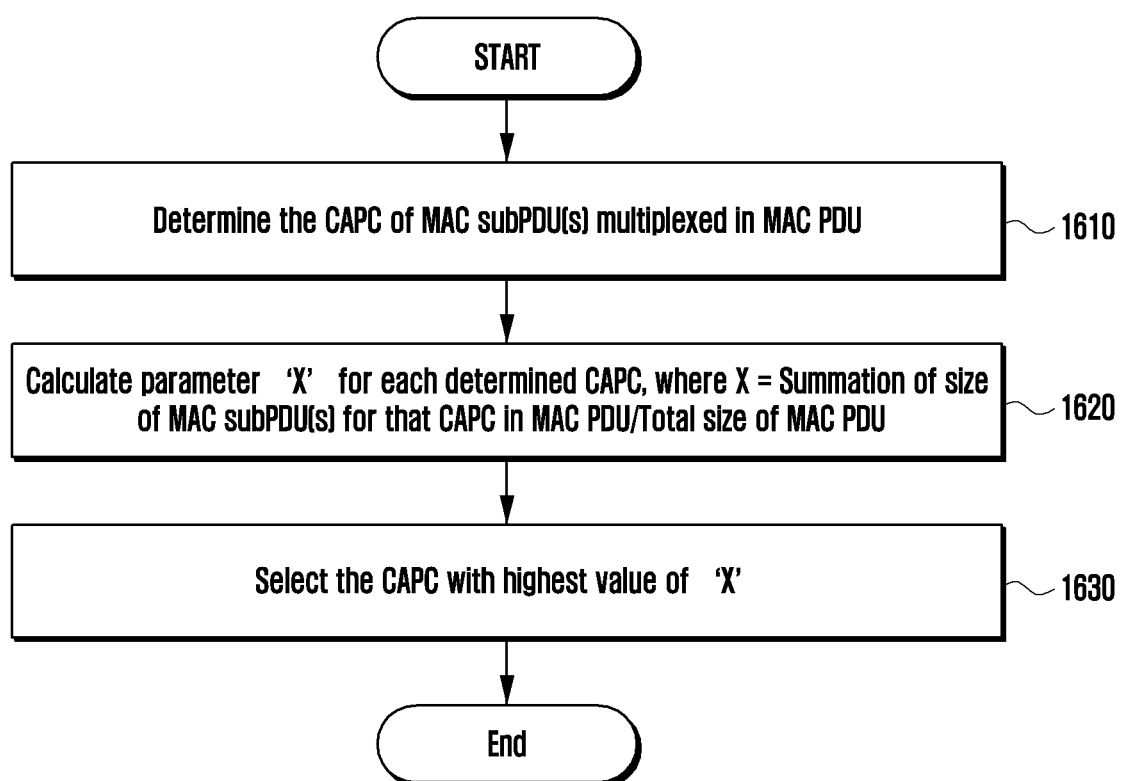
FIG. 16 shows selection of CAPC for uplink (UL) transmission according to an embodiment of the disclosure.

FIG. 16 shows selection of CAPC for UL transmission according to an embodiment of the disclosure. In an embodiment, this method is applied for UL transmission in configured grant.

Operation 1610: Referring to FIG. 16, in order to determine the CAPC to be used for UL transmission of a MAC PDU, UE first determines the CAPC of MAC subPDU(s) multiplexed in MAC PDU at operation 1610. Alternately in another embodiment, UE first determines the CAPC of MAC subPDU(s) multiplexed in MAC PDU except the MAC subPDU carrying padding. Alternately in another embodiment, UE first determines the CAPC of MAC subPDU(s) multiplexed in MAC PDU except the MAC subPDU carrying padding and MAC subPDU carrying padding BSR and MAC subPDU carrying recommended bit rate MAC CE.

For a MAC subPDU including MAC SDU, CAPC is the CAPC of LCH of MAC SDU included in the MAC subPDU. gNB signals the CAPC for each LCH of data radio bearers (DRBs). LCHs corresponding to signaling radio bearers SRB0, SRB1, and SRB3 use the highest priority CAPC (i.e. lowest CAPC index) while the CAPC for SRB2 is configured by gNB in RRC message. Padding uses the lowest priority CAPC (i.e. highest CAPC index).

For a MAC subPDU including MAC CE, CAPC is the CAPC of MAC CE included in that MAC subPDU. The MAC CEs except padding BSR and recommended bit rate use the highest priority CAPC (i.e. lowest CAPC index). Padding BSR and recommended bit rate MAC CEs uses the lowest priority CAPC (i.e. highest CAPC index).

Operation 1620: UE then calculates parameter 'X' for each determined CAPC where 'X' is equal to total size of MAC subPDUs for that CAPC/Total size of MAC PDU at operation 1620. The size can be in number of bytes or bits. In an embodiment, size of MAC subPDU may not include the size of MAC subheader.

Operation 1630: UE selects the CAPC with highest value of 'X' at operation 1630. UE applies the parameters corresponding to selected CAPC for accessing the channel for UL transmission.

FIG. 17 is an example illustration of MAC PDU to be transmitted in UL grant upon channel access (using LBT procedure which uses CAPC) according to an embodiment of the disclosure.

Referring to FIG. 17, the calculated value of 'X' according to the method explained above is 0.3, 0.4 and 0.3 for CAPC 2, 3 and CAPC 4 respectively. So UE selects CAPC 3 corresponding to the highest value of X, i.e. 0.4.

Figure 18:
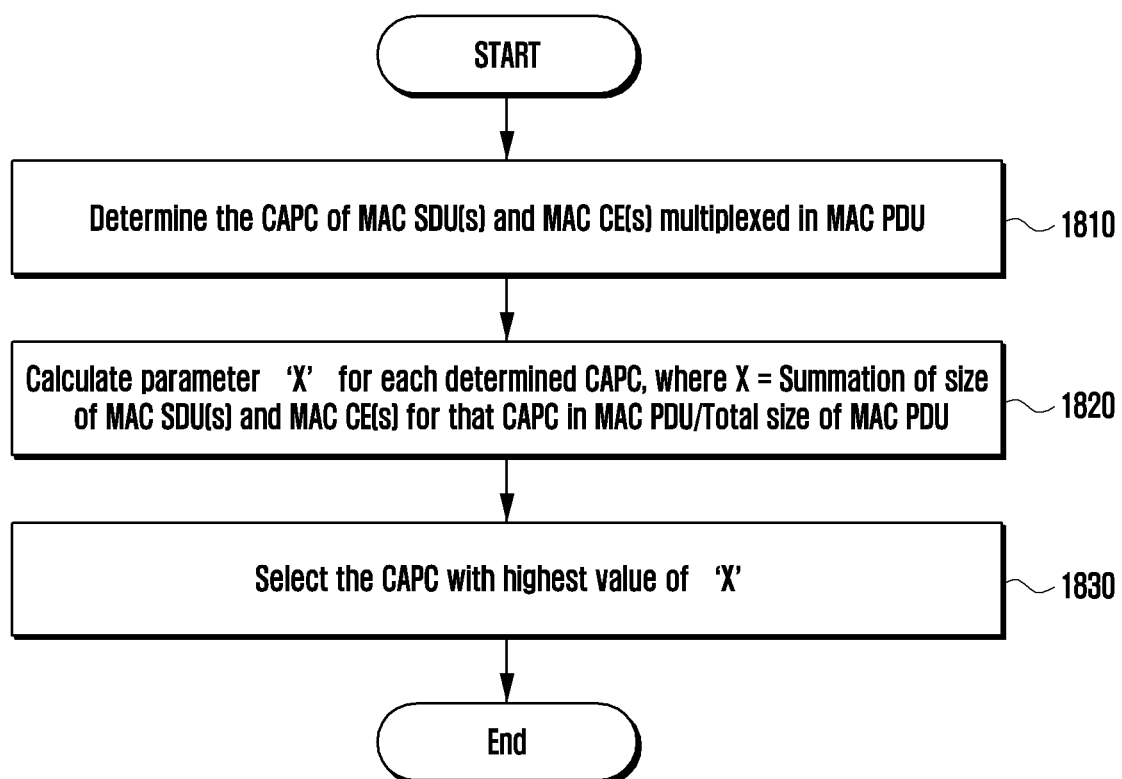
FIG. 18 shows selection of CAPC for UL transmission according to an embodiment of the disclosure.

FIG. 18 shows selection of CAPC for UL transmission according to another embodiment of the disclosure. In an embodiment, this method is applied for UL transmission in configured grant.

Operation 1810: Referring to FIG. 18, in order to determine the CAPC to be used for UL transmission of a MAC PDU, UE first determines the CAPC of MAC SDU(s) and MAC CE(s) multiplexed in MAC PDU at operation 1810. Alternately, in another embodiment, UE first determines the CAPC of MAC SDU(s) and MAC CE(s) multiplexed in MAC PDU, except padding BSR MAC CE and recommended bit rate MAC CE. Alternately, in another embodiment, UE first determines the CAPC of MAC SDU(s).

For a MAC SDU, CAPC is the CAPC of LCH of MAC SDU. gNB signals the CAPC for each LCH of DRBs. For LCHs corresponding to signaling radio bearers SRB0, SRB1, and SRB3 use the highest priority CAPC while the CAPC for SRB2 is configured by gNB in RRC message.

For a MAC CE, CAPC is the CAPC of MAC CE. The MAC CEs except padding BSR and recommended bit rate use the highest priority CAPC (i.e. lowest CAPC index). Padding BSR and recommended bit rate MAC CE uses the lowest priority CAPC (i.e. highest CAPC index).

Operation 1820: UE then calculates parameter 'X' for each determined CAPC where 'X' is equal to [total size of MAC SDU(s) and/or MAC CE(s) for that CAPC in MAC PDU]/Total size of MAC PDU. The size can be in number of bytes or bits at operation 1820.

Operation 1830: UE selects the CAPC with highest value of 'X'. UE applies the parameters corresponding to selected CAPC for accessing the channel for UL transmission at operation 1830.

The advantage of first method is that CAPC which occupies the maximum portion of UL grant dominates the channel access which is better than a legacy scheme wherein the lowest priority CAPC was always selected.

In another embodiment, methods explained above are applied if certain LCH(s) are not multiplexed in MAC PDU. If certain LCH(s) are multiplexed in MAC PDU, UE applies rule, i.e. UE selects the lowest CAPC index (i.e. highest priority) of LCHs/MAC CEs multiplexed in MAC PDU.

In an embodiment, the certain LCH(s) are the LCHs for the signaling radio bearers. If any of SRBs MAC SDU(s) is included in MAC PDU, UE applies rule, i.e. UE selects the lowest CAPC index (i.e. highest priority) of LCHs/MAC CEs multiplexed in MAC PDU. In other words, if any of SRBs MAC SDU(s) is included in MAC PDU, UE selects the CAPC index of SRB (or lowest of CAPC indexes of SRBs whose MAC SDU(s) are included in MAC PDU), as the CAPC index of SRBs is the lowest.

In another embodiment, the certain LCH(s) are the LCHs for the signaling radio bearers SRB 0, SRB1 and SRB 3. If any of SRB 0, SRB1 and SRB3 MAC SDU(s) is included in MAC PDU, UE selects the lowest CAPC index (i.e. highest priority) of LCHs/MAC CEs multiplexed in MAC PDU.

In another embodiment, the certain LCH(s) are the one or more LCHs for the signaling radio bearers. The one or more signaling radio bearers for which UE selects the lowest CAPC index (i.e. highest priority) of LCHs/MAC CEs multiplexed in MAC PDU can be pre-defined.

In another embodiment, the certain LCH(s) are one or more LCHs signaled by gNB.

In another embodiment, certain LCHs are the MAC CE(s) other than padding BSR. If any MAC CE (other than padding BSR) is included in MAC PDU, UE applies the rule.

In another embodiment, the certain LCH(s) are the one or more MAC CEs. The one or more MAC CEs for which rule is applied can be pre-defined.

Method 2

In NR, a MAC PDU consists of one or more MAC subPDUs. Each MAC subPDU consists of one of the following: a MAC subheader only (including padding); a MAC subheader and a MAC SDU; a MAC subheader and a MAC CE; or a MAC subheader and padding. The MAC SDUs are of variable sizes. Each MAC subheader corresponds to either a MAC SDU, a MAC CE, or padding. A MAC subheader except for fixed sized MAC CE, padding, and a MAC SDU containing UL CCCH consists of the four header fields R/F/LCID/L. A MAC subheader for fixed sized MAC CE, padding, and a MAC SDU containing UL CCCH consists of the two header fields R/LCID.

Figure 19:
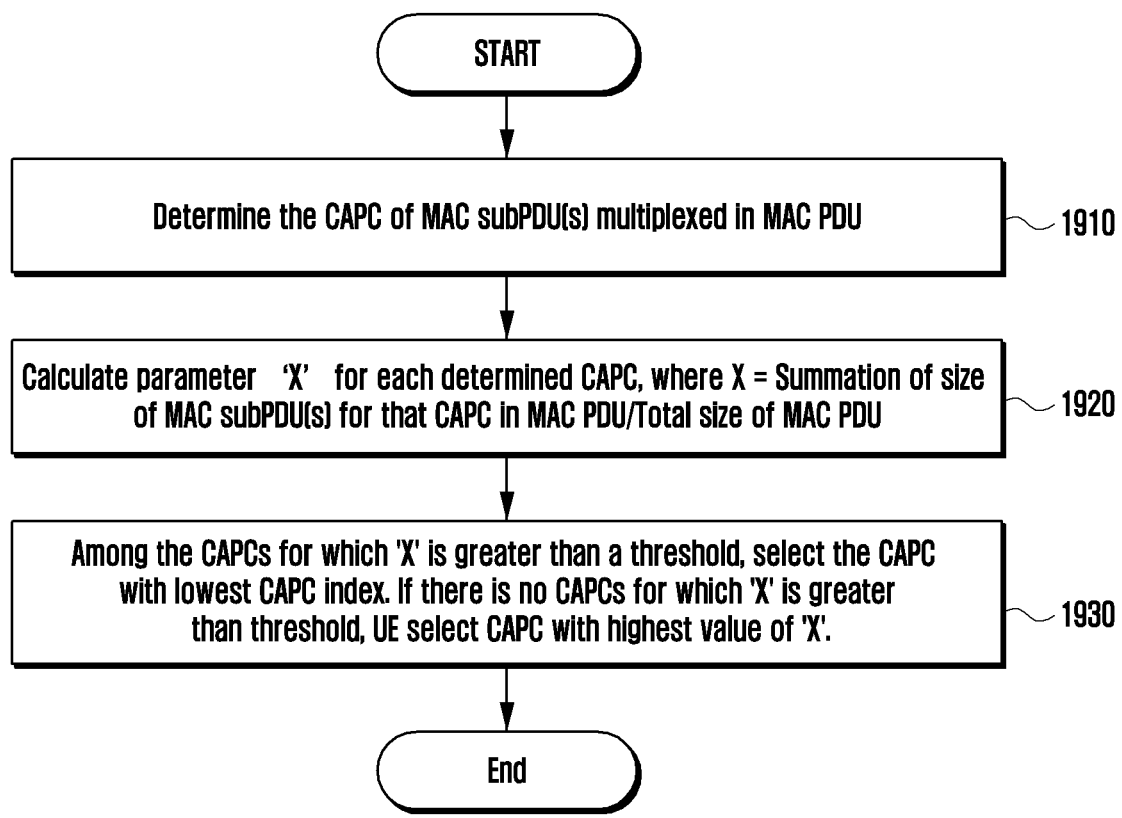
FIG. 19 shows selection of CAPC for UL transmission according to an embodiment of the disclosure.

FIG. 19 shows selection of CAPC for UL transmission according to an embodiment of the disclosure. In an embodiment, this method is applied for UL transmission in configured grant.

Operation 1910: Referring to FIG. 19, in order to determine the CAPC to be used for UL transmission of a MAC PDU, UE first determines the CAPC of MAC subPDU(s) multiplexed in MAC PDU at operation 1910. Alternately, in another embodiment, UE first determines the CAPC of MAC subPDU(s) multiplexed in MAC PDU, except the MAC subPDU carrying padding. Alternately in another embodiment, UE first determines the CAPC of MAC subPDU(s) multiplexed in MAC PDU, except the MAC subPDU carrying padding and MAC subPDU carrying padding BSR and MAC subPDU carrying recommended bit rate.

For a MAC subPDU including MAC SDU, CAPC is the CAPC of LCH of MAC SDU included in the MAC subPDU. gNB signals the CAPC for each LCH of DRBs. For LCHs corresponding to signaling radio bearers SRB0, SRB1, and SRB3 use the highest priority CAPC (i.e. lowest CAPC index) while the CAPC for SRB2 is configured by gNB in RRC message. Padding uses the lowest priority CAPC (i.e. highest CAPC index).

For a MAC subPDU including MAC CE, CAPC is the CAPC of MAC CE included in that MAC subPDU. The MAC CEs except padding BSR use the highest priority CAPC (i.e. lowest CAPC index). Padding BSR and recommended bit rate uses the lowest priority CAPC (i.e. highest CAPC index).

Operation 1920: UE then calculates parameter 'X' for each determined CAPC where 'X' is equal to total size of MAC subPDUs for that CAPC/Total size of MAC PDU at operation 1920. The size can be in number of bytes or bits. In an embodiment, size of MAC subPDU may not include the size of MAC subheader.

Operation 1930: Among the CAPCs for which 'X' is greater than threshold, UE selects the CAPC with lowest CAPC index (i.e. highest priority) at operation 1930. If there is no CAPCs for which 'X' is greater than threshold, UE selects CAPC with highest value of 'X'. UE applies the parameters corresponding to selected CAPC for accessing the channel for UL transmission.

gNB signals the threshold to UE. The threshold can be common for all UL configured grants or it can be separately configured for each UL configured grant. If threshold is not configured, UE selects CAPC with highest value of 'X'. Alternately, if threshold is not configured, UE selects CAPC with highest CAPC index (i.e. lowest priority), no need to perform operation 1920. Alternately, if threshold is not configured, UE selects CAPC with lowest CAPC index (i.e. highest priority), no need to perform operation 1920.

FIG. 20 is an example illustration of MAC PDU to be transmitted in UL grant using LBT Type 1 channel access according to an embodiment of the disclosure.

Referring to FIG. 20, the calculated value of 'X' according to the method explained above is 0.2, 0.5 and 0.3 for CAPC 2, 4 and CAPC 3 respectively. If the threshold is 0.25, UE selects CAPC from CAPC 3 and CAPC 4. The lowest CAPC index among CAPC3 and CAPC 4 is 3, so UE selects CAPC 3.

Figure 21:
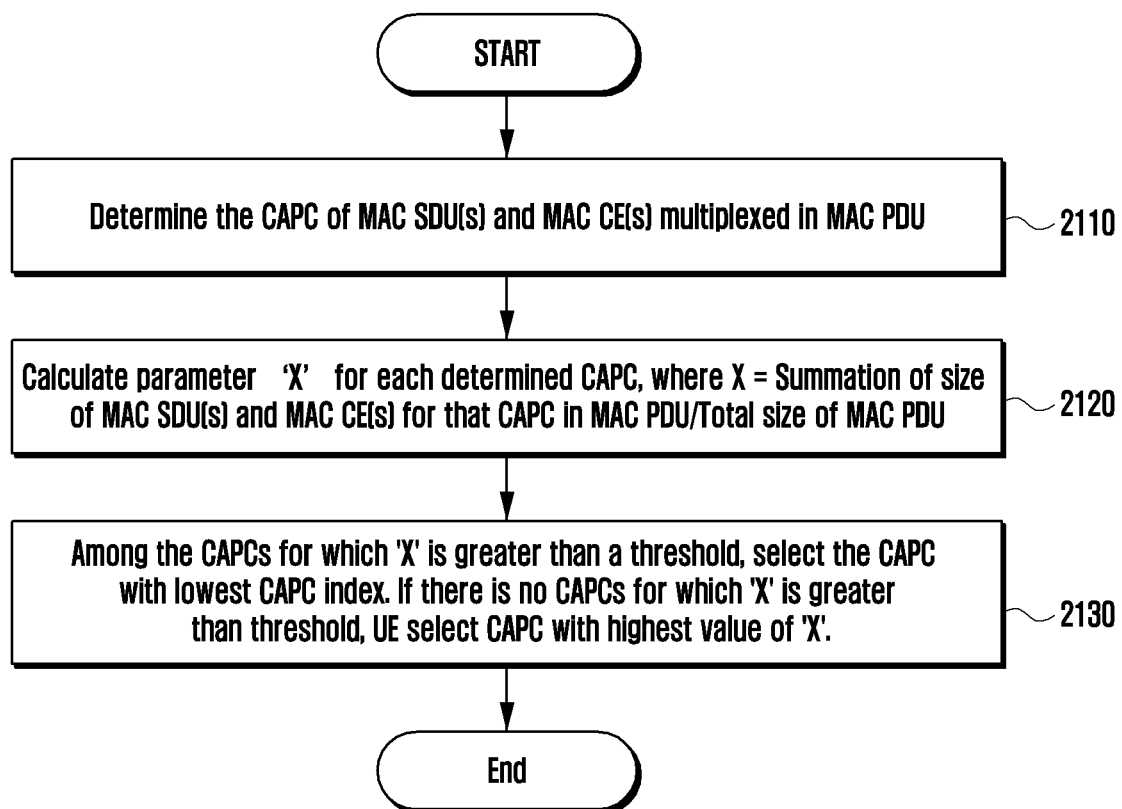
FIG. 21 shows selection of CAPC for UL transmission according to an embodiment of the disclosure.

FIG. 21 shows selection of CAPC for UL transmission according to an embodiment of the disclosure. In an embodiment, this method is applied for UL transmission in configured grant.

Operation 2110: Referring to FIG. 21, in order to determine the CAPC to be used for UL transmission of a MAC PDU, UE first determines the CAPC of MAC SDU(s) and MAC CE(s) multiplexed in MAC PDU at operation 2110. Alternately in another embodiment, UE first determines the CAPC of MAC SDU(s) and MAC CE(s) multiplexed in MAC PDU, except padding BSR MAC CE and recommended bit rate MAC CE.

For a MAC SDU, CAPC is the CAPC of LCH of MAC SDU. gNB signals the CAPC for each LCH of DRBs. For LCHs corresponding to signaling radio bearers SRB0, SRB1, and SRB3 use the highest priority CAPC while the CAPC for SRB2 is configured by gNB in RRC message.

For a MAC CE, CAPC is the CAPC of MAC CE. The MAC CEs except padding BSR and recommended bit rate use the highest priority CAPC (i.e. lowest CAPC index). Padding BSR uses the lowest priority CAPC (i.e. highest CAPC index).

Operation 2120: UE then calculates parameter 'X' for each determined CAPC where 'X' is equal to [total size of MAC SDU(s) and MAC CE(s) for that CAPC]/Total size of MAC PDU. The size can be in number of bytes or bits at operation 2120.

Operation 2130: Among the CAPCs for which 'X' is greater than threshold, UE selects the CAPC with lowest CAPC index (i.e. highest priority) at operation 2130. If there is no CAPCs for which 'X' is greater than threshold, UE selects CAPC with highest value of 'X'. UE applies the parameters corresponding to selected CAPC for accessing the channel for UL transmission.

gNB signals the threshold to UE. The threshold can be common for all UL configured grants or it can be separately configured for each UL configured grant. If threshold is not configured, UE selects CAPC with highest value of 'X'. Alternately, if threshold is not configured, UE selects CAPC with highest CAPC index (i.e. lowest priority), no need to perform operation 2120. Alternately, if threshold is not configured, UE selects CAPC with lowest CAPC index (i.e. highest priority), no need to perform operation 2120.

The advantage of this method is that among the CAPCs which occupies portion of UL grant beyond a threshold, highest priority CAPC dominates the channel access even if it does not occupy the maximum portion of UL grant.

In another embodiment, methods explained above are applied if certain LCH(s) are not multiplexed in MAC PDU. If certain LCH(s) are multiplexed in MAC PDU, UE applies rule, i.e. UE selects the lowest CAPC index (i.e. highest priority) of LCHs/MAC CEs multiplexed in MAC PDU.

In an embodiment the certain LCH(s) are the LCHs for the signaling radio bearers. If any of SRBs MAC SDU(s) is included in MAC PDU, UE applies rule, i.e. UE selects the lowest CAPC index (i.e. highest priority) of LCHs/MAC CEs multiplexed in MAC PDU. In other words, if any of SRBs MAC SDU(s) is included in MAC PDU, UE selects the CAPC index of SRB (or lowest of CAPC indexes of SRBs whose MAC SDU(s) are included in MAC PDU), as the CAPC index of SRBs is the lowest.

In another embodiment, the certain LCH(s) are the LCHs for the signaling radio bearers SRB 0, SRB1 and SRB 3. If any of SRB 0, SRB1 and SRB3 MAC SDU(s) is included in MAC PDU, UE selects the lowest CAPC index (i.e. highest priority) of LCHs/MAC CEs multiplexed in MAC PDU.

In another embodiment, the certain LCH(s) are the one or more LCHs for the signaling radio bearers. The one or more signaling radio bearers for which UE selects the lowest CAPC index (i.e. highest priority) of LCHs/MAC CEs multiplexed in MAC PDU can be pre-defined.

In another embodiment, the certain LCH(s) are one or more LCHs signaled by gNB.

In another embodiment, certain LCHs are the MAC CE(s) other than padding BSR. If any MAC CE (other than padding BSR) is included in MAC PDU, UE applies the rule.

In another embodiment, the certain LCH(s) are the one or more MAC CEs. The one or more MAC CEs for which rule is applied can be pre-defined.

Method 3

In NR, A MAC PDU consists of one or more MAC subPDUs. Each MAC subPDU consists of one of the following: a MAC subheader only (including padding); a MAC subheader and a MAC SDU; a MAC subheader and a MAC CE; or a MAC subheader and padding. The MAC SDUs are of variable sizes. Each MAC subheader corresponds to either a MAC SDU, a MAC CE, or padding. A MAC subheader except for fixed sized MAC CE, padding, and a MAC SDU containing UL CCCH consists of the four header fields R/F/LCID/L. A MAC subheader for fixed sized MAC CE, padding, and a MAC SDU containing UL CCCH consists of the two header fields R/LCID.

Figure 22:
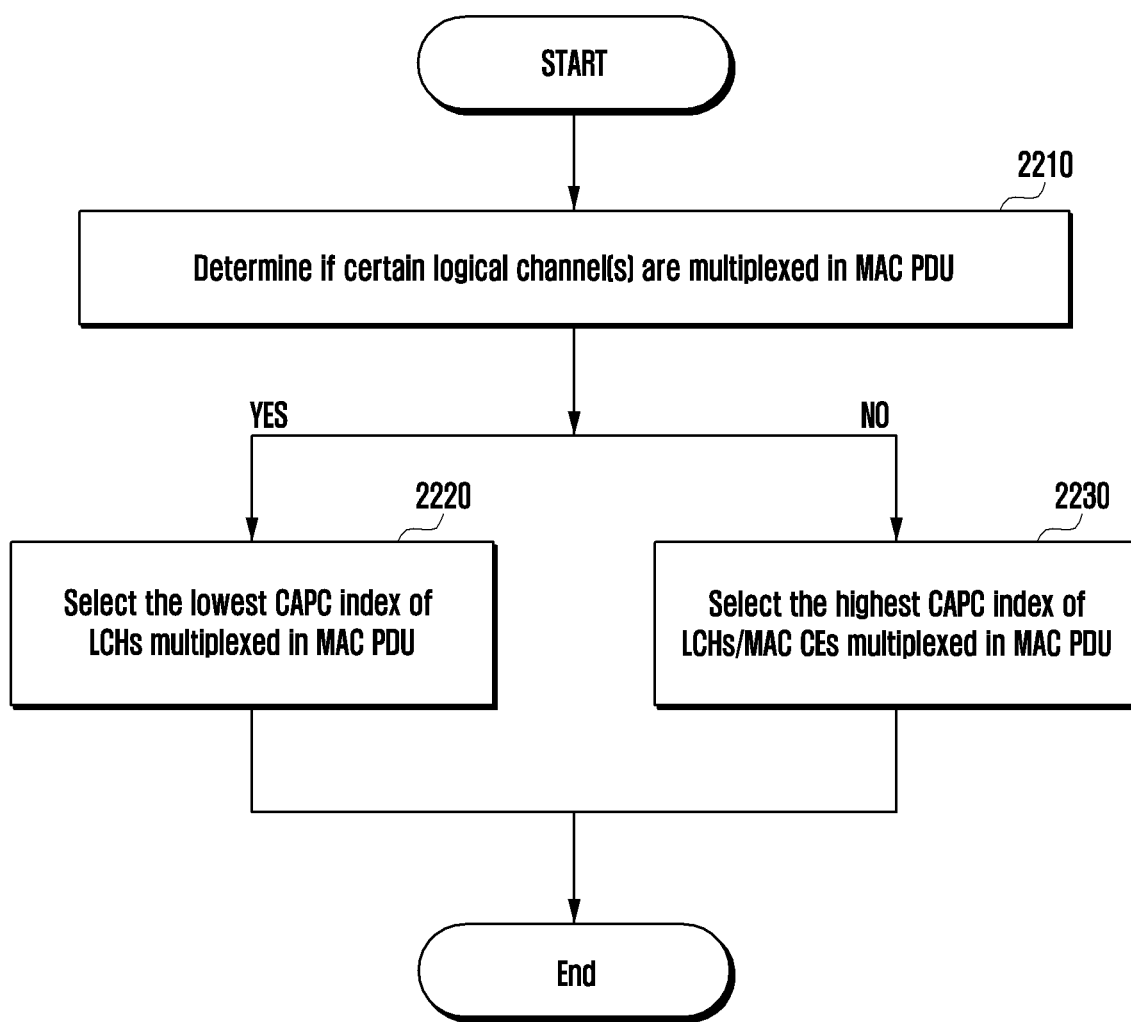
FIG. 22 shows selection of CAPC for UL transmission according to an embodiment of the disclosure.

FIG. 22 shows selection of CAPC for UL transmission according to an embodiment of the disclosure. In an embodiment, this method is applied for UL transmission in configured grant.

Referring to FIG. 22, UE determines if certain LCH(s) are multiplexed in MAC PDU at operation 2210. If yes, UE applies the first rule, i.e. UE selects the lowest CAPC index (i.e. highest priority) of LCHs/MAC CEs multiplexed in MAC PDU at operation 2220. Otherwise, UE applies the second rule, i.e. UE selects the highest CAPC index (i.e. lowest priority) of LCHs/MAC CEs multiplexed in MAC PDU at operation 2230.

In an embodiment, the certain LCH(s) are the LCHs for the signaling radio bearers. If any of SRBs MAC SDU(s) is included in MAC PDU, UE applies the first rule. In other words, if any of SRBs MAC SDU(s) is included in MAC PDU, UE selects the CAPC index of SRB (or lowest of CAPC indexes of SRBs whose MAC SDU(s) are included in MAC PDU), as the CAPC index of SRBs is the lowest.

In another embodiment, the certain LCH(s) are the LCHs for the signaling radio bearers SRB 0, SRB1 and SRB 3. If any of SRB 0, SRB1 and SRB3 MAC SDU(s) is included in MAC PDU, UE applies the first rule.

In another embodiment, the certain LCH(s) are the one or more LCHs for the signaling radio bearers. The one or more signaling radio bearers for which the first rule is applied can be pre-defined.

In another embodiment, the certain LCH(s) are one or more LCHs signaled by gNB. Let's say gNB signals LCH X and LCH Y for which UE needs to apply the first rule. If any of LCH X, LCH Y MAC SDU(s) is included in MAC PDU, UE applies the first rule.

In another embodiment, certain LCHs are the MAC CE(s) other than padding BSR. If any MAC CE (other than padding BSR) is included in MAC PDU, UE applies the first rule.

In another embodiment, the certain LCH(s) are the one or more MAC CEs. The one or more MAC CEs for which the first rule is applied can be pre-defined.

One or more of the above embodiment can be used to determine application of first and second rule.

Method 4

In this method of disclosure, enhanced multiplexing operation for UL transmission is proposed. In an embodiment, this method is applied for UL transmission in configured grant.

Operation 1: UE includes the MAC SDU(s) from highest priority LCH(s) among the LCHs having data available for transmission and which are allowed to use this UL Grant.

Operation 2: UE includes MAC SDU(s) from any other LCH(s) with lower priority then the highest priority LCH among the LCH having data available for transmission and which are allowed to use this UL Grant in MAC PDU only if the remaining available space in MAC PDU is greater than a threshold. Threshold can be pre-defined or signaled by gNB.

Example UL Grant size is 1000 bytes

LCH1, LCH 2 and LCH 3 are allowed to use this UL grant, and have data available for transmission. If LCH 1 is highest priority, UE includes LCH 1 data in MAC PDU. If amount of data available after including the highest priority LCH is 200 bytes, and 200 bytes is >threshold, UE multiplexes LCH 2 and/or LCH 3 in MAC PDU as per LCH prioritization (LCP). Otherwise just include padding and/or padding BSR.

Method 5:

Embodiment 1

In this method of disclosure, enhanced multiplexing operation for UL transmission is proposed. In an embodiment, this method is applied for UL transmission in configured grant.

Operation 1: UE includes the MAC SDU(s) from highest priority LCH(s) among the LCHs having data available for transmission and which are allowed to use this UL Grant.

Operation 2: UE includes MAC SDU(s) from any other LCH(s) with lower priority then the highest priority LCH among the LCH having data available for transmission and which are allowed to use this UL Grant in MAC PDU only if they have the same CAPC as the highest priority LCH.

Example UL Grant size is 1000 bytes

LCH1, LCH 2 and LCH 3 are allowed to use this UL grant, and have data available for transmission. If LCH 1 is highest priority (P1), LCH 2 has priority (P2), and LCH 3 has priority (P4), and CAPC for LCH 1 is CAPC 1, CAPC for LCH 2 is CAPC 1, and CAPC for LCH 3 is CAPC 3, MAC SDU for LCH 1 is included first in MAC PDU as it has highest priority. If UL Grant is not yet exhausted after adding MAC SDU of LCH 1, MAC SDU for LCH 2 is included as it has the same CAPC as LCH 1. Although UL Grant is not yet exhausted after adding MAC SDU of LCH 2, MAC SDU for LCH 3 is not included as it does not have same CAPC as LCH 1 and LCH 2. Data, if available, from LCH 1 and LCH2 can be included in decreasing priority order.

Embodiment 2

UE applies first and second selection criteria for selecting LCHs that can be multiplexed in MAC PDU.

The MAC entity shall, when a new transmission is performed:

$1^{st}$ Selection Criteria

1> select the LCHs (or LCHs having data available for transmission) for each UL grant that satisfy all the following conditions:
2> the set of allowed Subcarrier Spacing (SCS) index values in allowedSCS-List, if configured, includes the SCS index associated to the UL grant; and
2> maxPUSCH-Duration, if configured, is larger than or equal to the physical UL shared channel (PUSCH) transmission duration associated to the UL grant; and
2> configuredGrantType1Allowed, if configured, is set to true in case the UL grant is a Configured Grant Type 1; and
2> allowedServingCells, if configured, includes the Cell information associated to the UL grant. Does not apply to LCHs associated with a DRB configured with packet data convergence protocol (PDCP) duplication within the same MAC entity (i.e. CA duplication) for which PDCP duplication is deactivated.

allowedSCS-List, maxPUSCH-Duration, ConfiguredGrantType1Allowed and allowedServingCells are configured optionally by gNB in LCH configuration.

allowedSCS-List: If present in LCH configuration received from gNB, UL MAC SDUs from this LCH can only be mapped to the indicated numerology. Otherwise, UL MAC SDUs from this LCH can be mapped to any configured numerology.

allowedServingCells: If present in LCH configuration received from gNB, UL MAC SDUs from this LCH can only be mapped to the serving cells indicated in this list. Otherwise, UL MAC SDUs from this LCH can be mapped to any configured serving cell of the cell group of the LCH.

configuredGrantType1Allowed: If present, UL MAC SDUs from this LCH can be transmitted on a configured grant type 1.

maxPUSCH-Duration: If present in LCH configuration received from gNB, UL MAC SDUs from this LCH can only be transmitted using UL grants that result in a PUSCH duration shorter than or equal to the duration indicated by this field. Otherwise, UL MAC SDUs from this LCH can be transmitted using a UL grant resulting in any PUSCH duration.

$2^{nd}$ Selection Criteria

1> if the new transmission is performed for the configured UL grant on unlicensed carrier:
2> select the LCHs which have the same CAPC as the CAPC of the highest priority LCH among the LCHs selected above (according to first selection criteria).

Alternate

1> if the new transmission is performed for the configured UL grant on unlicensed carrier and highest priority LCH among the LCHs selected above belongs to SRB (or a specific SRB(s), specific SRB(s) can be pre-defined)
2> select the LCHs which have the same CAPC as the CAPC of the highest priority LCH among the LCHs selected above (according to first selection criteria).

Alternate

1> if the new transmission is performed on unlicensed carrier:
2> select the LCHs which have the same CAPC as the CAPC of the highest priority LCH among the LCHs selected above (according to first selection criteria).

Alternate

1> if the new transmission is performed on unlicensed carrier and highest priority LCH among the LCHs selected above belongs to SRB (or a specific SRB(s), specific SRB(s) can be pre-defined)
2> select the LCHs which have the same CAPC as the CAPC of the highest priority LCH among the LCHs selected above (according to first selection criteria).

Allocation of Resources:

The MAC entity shall, when a new transmission is performed:
1> allocate resources to the LCHs as follows:
2> LCHs selected (according to selection criteria explained above) for the UL grant with Bj>0 are allocated resources in a decreasing priority order. If the prioritized bit rate (PBR) of a LCH is set to infinity, the MAC entity shall allocate resources for all the data that is available for transmission on the LCH before meeting the PBR of the lower priority LCH(s);
2> decrement Bj by the total size of MAC SDUs served to LCH j above;
2> if any resources remain, all the LCHs selected (according to selection criteria explained above) are served in a strict decreasing priority order (regardless of the value of Bj) until either the data for that LCH or the UL grant is exhausted, whichever comes first. LCHs configured with equal priority should be served equally.

The MAC entity shall initialize Bj of the LCH to zero when the LCH is established.

For each LCH j, the MAC entity shall:
1> increment Bj by the product PBR×T before every instance of the LCP procedure, where T is the time elapsed since Bj was last incremented;
1> if the value of Bj is greater than the bucket size (i.e. PBR×bucket size duration (BSD)):
2> set Bj to the bucket size.

PBR and BSD is configured for each logical by gNB.

Method 6

In the current design, UE selects the LCHs for multiplexing as follows:
1> select the LCHs (or LCHs having data available for transmission) for each UL grant that satisfy all the following conditions:

2> the set of allowed SCS index values in allowedSCS-List, if configured, includes the SCS index associated to the UL grant; and
2> maxPUSCH-Duration, if configured, is larger than or equal to the PUSCH transmission duration associated to the UL grant; and
2> configuredGrantType1Allowed, if configured, is set to true in case the UL grant is a Configured Grant Type 1; and
2> allowedServingCells, if configured, includes the Cell information associated to the UL grant. Does not apply to LCHs associated with a DRB configured with PDCP duplication within the same MAC entity (i.e. CA duplication) for which PDCP duplication is deactivated.

allowedSCS-List, maxPUSCH-Duration, ConfiguredGrantType1Allowed and allowedServingCells are configured optionally by gNB in LCH configuration.

allowedSCS-List: If present in LCH configuration received from gNB, UL MAC SDUs from this LCH can only be mapped to the indicated numerology. Otherwise, UL MAC SDUs from this LCH can be mapped to any configured numerology.

allowedServingCells: If present in LCH configuration received from gNB, UL MAC SDUs from this LCH can only be mapped to the serving cells indicated in this list. Otherwise, UL MAC SDUs from this LCH can be mapped to any configured serving cell of the cell group of the LCH.

configuredGrantType1Allowed: If present, UL MAC SDUs from this LCH can be transmitted on a configured grant type 1.

maxPUSCH-Duration: If present in LCH configuration received from gNB, UL MAC SDUs from this LCH can only be transmitted using UL grants that result in a PUSCH duration shorter than or equal to the duration indicated by this field. Otherwise, UL MAC SDUs from this LCH can be transmitted using a UL grant resulting in any PUSCH duration.

Allocation of Resources:

The MAC entity shall, when a new transmission is performed:
1> allocate resources to the LCHs as follows:
2> LCHs selected (according to selection criteria explained above) for the UL grant with Bj>0 are allocated resources in a decreasing priority order wherein resources are allocated to LCH j, if one of the following conditions is met:
3> Condition 1: CAPC index of LCH j<=Z
3> Condition 2: if CAPC index of LCH j>Z and amount of data that can be included from LCH j in remaining UL grant is greater than amount of UL grant already allocated If none of LCH is allocated resources yet, Z=highest CAPC index. Otherwise Z=MAX (CAPC indexes of all LCHs which have already been allocated resources of UL Grant).

If the PBR of a LCH is set to infinity, the MAC entity shall allocate resources for all the data that is available for transmission on the LCH before meeting the PBR of the lower priority LCH(s);
2> decrement Bj by the total size of MAC SDUs served to LCH j above;
2> if any resources remain, all the LCHs selected (according to selection criteria explained above) are served in a strict decreasing priority order (regardless of the value of Bj) until either the data for that LCH or the UL grant is exhausted, whichever comes first, wherein resources are allocated to LCH j, if one of the following conditions is met:

3> Condition 1: CAPC index of LCH j<=Z
3> Condition 2: if CAPC index of LCH j> Z and amount of data that can be included from LCH j in remaining UL grant is greater than amount of UL grant already allocated If none of LCH is allocate resources yet, Z=highest CAPC index. Otherwise Z=MAX (CAPC indexes of all LCHs which have already been allocated resources of UL Grant).

Figure 23:
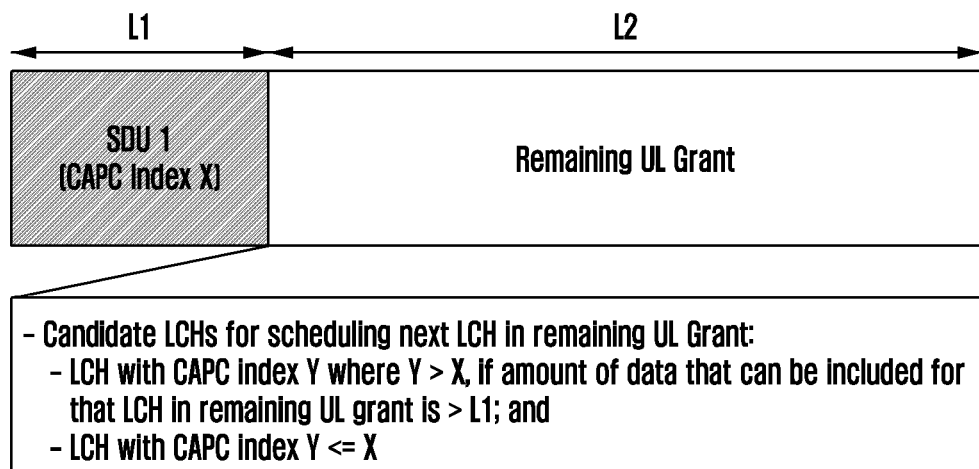
FIG. 23 is an example illustration according to an embodiment of the disclosure.

FIG. 23 is an example illustration according to an embodiment of the disclosure.

Referring to FIG. 23, SDU 1 corresponding to a LCH is already allocated resources in UL grant. For scheduling next LCH, the candidate LCHs among the 'LCHs having data available for transmission and which are allowed to use this UL grant' should meet one of the following conditions:

LCH has CAPC index Y where Y>X, if amount of data that can be included for that LCH in remaining UL grant is >L 1; OR
LCH has CAPC index Y<=X FIG. 24 is another example illustration according to an embodiment of the disclosure.

Figure 24:
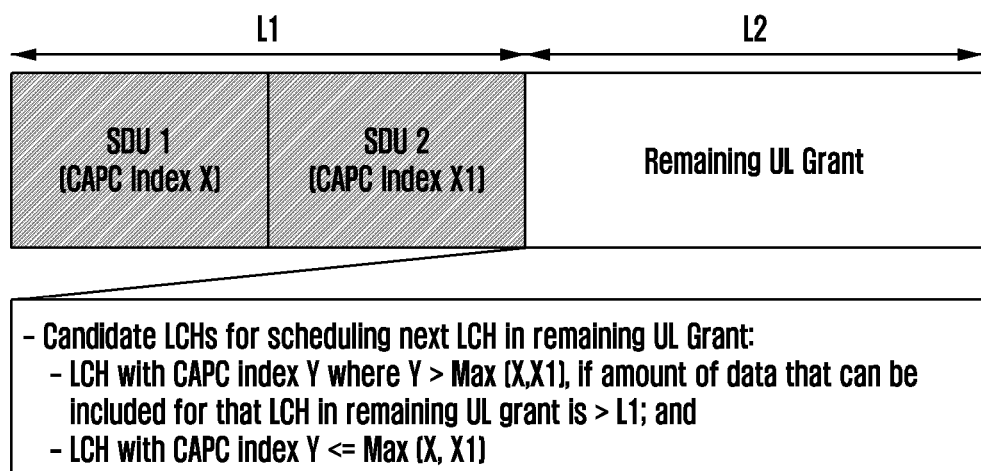
FIG. 24 is another example illustration according to an embodiment of the disclosure.

Referring to FIG. 24, SDU 1 and SDU 2 corresponding to a LCH(s) is already allocated resources in UL grant. For scheduling next LCH, the candidate LCHs among the 'LCHs having data available for transmission and which are allowed to use this UL grant' should meet one of the following conditions:

LCH has CAPC index Y where Y>Max (X, X1), if amount of data that can be included for that LCH in remaining UL grant is >L1; OR
LCH has CAPC index Y<=MAX (X, X1)

Method of RA Procedure for Supporting Large RAR Window Size

In the 5G wireless communication system operating in higher frequency (mmWave) bands, UE and gNB communicate with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit (TX) beam patterns of different directions. Each of these TX beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these RX beam patterns can be also referred as RX beam.

The 5G wireless communication system supports stand-alone mode of operation as well dual connectivity (DC). In DC, a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-radio access technology (RAT) DC (MR-DC) operation whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC, there is only one serving cell comprising of the primary cell (PCell). For a UE in RRC_CONNECTED configured with CA/DC, the term 'serving cells' is used to denote the set of cells comprising of the Special Cell(s) (SpCell(s)) and all secondary cells (SCells). In NR, the term Master Cell Group (MCG) refers to a group of serving cells associated with the MN, comprising of the PCell and optionally one or more SCells. In NR, the term Secondary Cell Group (SCG) refers to a group of serving cells associated with the SN, comprising of the primary SCell (PSCell) and optionally one or more SCells. In NR, PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of SpCell. PSCell refers to a serving cell in SCG in which the UE performs RA when performing the Reconfiguration with Synchronization procedure. For DC operation, the term SpCell refers to the PCell of the MCG or the PSCell of the SCG, otherwise (e.g., when DC is not configured) the term SpCell refers to the PCell.

In the 5G wireless communication system, gNB or BS in cell broadcasts Synchronization Signal and physical broadcast channel (PBCH) block (SSB) consists of primary synchronization signal (PSS), secondary synchronization signal (SSS) and SI. SI includes common parameters needed to communicate in cell. In the 5G wireless communication system, SI is divided into the master information block (MIB) and a number of SI blocks (SIBs).

The MIB is always transmitted on the PBCH with a periodicity of 80 ms and repetitions made within 80 ms, and it includes parameters that are needed to acquire SIB1 from the cell.

The SIB1 is transmitted on the DL-shared channel (SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB.

SIBs other than SIB1 are carried in SystemInformation messages, which are transmitted on the DL-SCH. Only SIBs having the same periodicity can be mapped to the same SI message.

In the 5G wireless communication system, PDCCH is used to schedule DL transmissions on physical DL shared channel (PDSCH) and UL transmissions on PUSCH, where the DL Control Information (DCI) on PDCCH includes: DL assignments containing at least modulation and coding format, resource allocation, and hybrid-automatic repeat request (HARQ) information related to DL-SCH; or UL scheduling grants containing at least modulation and coding format, resource allocation, and HARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of TX power control (TPC) commands for physical UL control channel (PUCCH) and PUSCH; Transmission of one or more TPC commands for semi-persistent scheduling (SRS) transmissions by one or more UEs; Switching a UE's active bandwidth part (BWP); or Initiating an RA procedure. A UE monitors a set of PDCCH candidates in the configured monitoring occasions in one or more configured COntrol REsource SETs (CORESETs) according to the corresponding search space configurations. A CORESET consists of a set of PRBs with time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each REG carrying PDCCH carries its own demodulation reference signal (DMRS). Quadrature phase shift keying (QPSK) modulation is used for PDCCH.

In 5G wireless communication system, a list of search space configurations is signaled by gNB for each configured BWP wherein each search configuration is uniquely identified by an identifier. Identifier of search space configuration to be used for specific purpose such as paging reception, SI reception, and RAR reception is explicitly signaled by gNB. In NR, search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot})\mod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. Search space configuration includes the identifier of CORESET configuration associated with it. A list of CORESET configurations is signaled by gNB for each configured BWP wherein each CORESET configuration is uniquely identified by an identifier. Each radio frame is of 10 ms duration. Radio frame is identified by a radio frame number or SFN. Each radio frame comprises of several slots wherein the number of slots in a radio frame and duration of slots depend on SCS. The number of slots in a radio frame and duration of slots depending on radio frame for each supported SCS are pre-defined in NR. Each CORESET configuration is associated with a list of transmission configuration indicator (TCI) states. One DL reference signal (RS) ID (SSB or channel state information (CSI) RS) is configured per TCI state. The list of TCI states corresponding to a CORESET configuration is signaled by gNB via radio resource control (RRC) signaling. One of the TCI states in TCI state list is activated and indicated to UE by gNB. TCI state indicates the DL TX beam (DL TX beam is quasi co-located (QCLed) with SSB/CSI RS of TCI state) used by gNB for transmission of PDCCH in the PDCCH monitoring occasions of a search space.

In 5G wireless communication system, bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the SCS can be ordered to change (e.g. to allow different services). A subset of the total cell bandwidth of a cell is referred to as a BWP. BA is achieved by configuring RRC connected UE with BWP(s) and telling the UE which of the configured BWPs is currently the active one. When BA is configured, the UE only has to monitor PDCCH on the one active BWP, i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a DL assignment or a UL grant, by the bwp-InactivityTimer, by RRC signaling, or by the MAC entity itself upon initiation of RA procedure. Upon addition of SpCell or activation of an SCell, the DL BWP and UL BWP indicated by firstActiveDownlinkBWP-Id and firstActiveUplinkBWP-Id respectively are active without receiving PDCCH indicating a DL assignment or a UL grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer, UE switches the active DL BWP to the default DL BWP or initial DL BWP (if default DL BWP is not configured).

In the 5G wireless communication system, RA is supported. RA is used to achieve UL time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of RA procedures are supported.

Contention based RA (CBRA): This is also referred as 4 step CBRA. In this type of RA, UE first transmits RA preamble (also referred as message 1 (Msg1)) and then waits for RAR in the RAR window. RAR is also referred as message 2 (Msg2). gNB transmits the RAR on PDSCH. PDCCH scheduling the PDSCH carrying RAR is addressed to RA-radio network temporary identifier (RA-RNTI). RA-RNTI identifies the time-frequency resource (also referred as PRACH occasion or PRACH TX occasion or RA channel (RACH) occasion (RO)) in which RA preamble was detected by gNB. The RA-RNTI is calculated as follows: RA-RNTI=1+s_id+14*t_id+14*80*f_id+14*80*8*ul_carrier_id, where s_id is the index of the first OFDM symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various RA preambles detected by gNB can be multiplexed in the same RAR MAC PDU by gNB. An RAR in MAC PDU corresponds to UE's RA preamble transmission if the RAR includes an RAPID of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step, i.e. selects RA resource (preamble/RO) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. C-RNTI or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC CE including the UE's contention resolution identity (first X bits of CCCH SDU transmitted in Msg3), contention resolution is considered successful, contention resolution timer is stopped and RA procedure is completed. If the contention resolution timer expires and UE has not yet transmitted the RA preamble for a configurable number of times, UE goes back to the first step, i.e. selects RA resource (preamble/RO) and transmits the RA preamble. A backoff may be applied before going back to the first step.

Contention free RA (CFRA): This is also referred as legacy CFRA or 4 step CFRA. CFRA procedure is used for scenarios such as handover where low latency is required, timing advance (TA) establishment for SCell, etc. eNB (or gNB) assigns to UE dedicated RA preamble. UE transmits the dedicated RA preamble. eNB (or gNB) transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery, if dedicated preamble(s) are assigned to UE, during first step of RA, i.e. during RA resource selection for Msg1 transmission UE determines whether to transmit dedicated preamble or non-dedicated preamble. Dedicated preambles are typically provided for a subset of SSBs/CSI RSs. If there is no SSB/CSI RS having DL reference signal received power (RSRP) above a threshold among the SSBs/CSI RSs for which CFRA resources (i.e. dedicated preambles/ROs) are provided by gNB, UE selects non dedicated preamble. Otherwise UE selects dedicated preamble. So during the RA procedure, one RA attempt can be CFRA while other RA attempt can be CBRA.

2 step CBRA: In the first step, UE transmits RA preamble on PRACH and a payload on PUSCH. The RA preamble and payload transmission is also referred as message A (MsgA). In the second step, after MsgA transmission, the UE monitors for a response from the network (i.e. gNB) within a configured window. The response is also referred as message B (MsgB). If CCCH SDU was transmitted in MsgA payload, UE performs contention resolution using the contention resolution information in MsgB. If C-RNTI was transmitted in MsgA payload, the contention resolution is successful if UE receives PDCCH addressed to C-RNTI. If contention resolution is successful, RA procedure is considered successfully completed. Instead of contention resolution information corresponding to the transmitted MsgA, MsgB may include fallback information corresponding to the RA preamble transmitted in MsgA. If the fallback information is received, UE transmits Msg3 and performs contention resolution using Msg4 as in CBRA procedure. If contention resolution is successful, RA procedure is considered successfully completed. If contention resolution fails upon fallback (i.e. upon transmitting Msg3), UE retransmits MsgA. If configured window in which UE monitors network response after transmitting MsgA expires and UE has not received MsgB including contention resolution information or fallback information as explained above, UE retransmits MsgA. If the RA procedure is not successfully completed even after transmitting the MsgA configurable number of times, UE fallbacks to 4 step RA procedure, i.e. UE only transmits the RA preamble.

MsgA payload may include one or more of CCCH SDU, dedicated control channel (DCCH) SDU, dedicated traffic channel (DTCH) SDU, BSR MAC CE, power headroom report (PHR) MAC CE, SSB information, C-RNTI MAC CE, or padding. MsgA may include UE ID (e.g. random ID, S-TMSI, C-RNTI, resume ID, etc.) along with preamble in the first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, international mobile subscriber identity (IMSI), idle mode ID, inactive mode ID, etc. The UE ID can be different in different scenarios in which UE performs the RA procedure. When UE performs RA after power on (before it is attached to the network), then UE ID is the random ID. When UE performs RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition control information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/transmit-receive point (TRP) switching indication, connection re-establishment indication, reconfiguration complete or handover complete message, etc.

2 operation CFRA: In this case, gNB assigns to UE dedicated RA preamble(s) and PUSCH resource(s) for MsgA transmission. RO(s) to be used for preamble transmission may also be indicated. In the first step, UE transmits RA preamble on PRACH and a payload on PUSCH using the contention free RA resources (i.e. dedicated preamble/PUSCH resource/RO). In the second step, after MsgA transmission, the UE monitors for a response from the network (i.e. gNB) within a configured window. If UE receives PDCCH addressed to C-RNTI, RA procedure is considered successfully completed.

Issue: After transmitting first step of 4 step CBRA or CFRA, i.e. RA preamble, UE monitors RAR in a configured RAR window. For an RAR window of up to 10 ms, RAR is considered successful, if UE receives PDCCH addressed to RA-RNTI and successfully decoded TB scheduled by this PDCCH includes RAPID that matches the RA preamble index of transmitted RA preamble.

The cell on which UE transmits RA Preamble can be a licensed carrier or unlicensed carrier. In case carrier used for UL transmission is unlicensed carrier, UE needs to perform channel sensing (i.e. listen-before-talk (LBT)) to determine whether channel is free or not before transmitting Msg1 and Msg3 in the UL. Similarly, if the carrier used for DL transmission is unlicensed carrier, gNB needs to perform channel sensing (i.e. LBT) to determine whether the channel is free or not before transmitting Msg2 and Msg4 in the DL. It is possible that gNB has received RA preamble but is not able to transmit RAR in RAR window as channel is not free. UE will retransmit PRACH upon RAR window expiry. The retransmitted RA preamble may not be received by gNB because of collision or UE may fail to retransmit RA preamble or retransmission may be delayed due to channel being not free in the UL. This problem can be avoided by having larger RAR window size. However large RAR window of size greater than 10 ms leads to RA-RNTI ambiguity as shown in FIG. 1. If PRACH is transmitted using same RA preamble in PRACH Occasion X and PRACH Occasion Y by UE 1 and UE 2 respectively, RAR received in common slots between RAR window X and RAR window Y cannot be distinguished as RA-RNTI is same for PRACH Occasion X and PRACH Occasion Y.

The abovementioned problem of RA-RNTI ambiguity can be resolved by including in the information about the radio frame in which PRACH occasion starts in the DCI. For an extended RAR window (>10 ms), RAR is considered successful if UE receives PDCCH addressed to RA-RNTI and frame information in DCI of received PDCCH matches frame information corresponding to the SFN in which RA preamble is transmitted and successfully decoded TB scheduled by this PDCCH includes RAPID that matches the RA preamble index of transmitted RA preamble. Frame information is 'X' least significant bits (LSBs) of SFN. For a RAR window size of 40 ms, X is 2.

In NR, if the UE receives RRCReconfiguration message wherein CellGroupConfig information element (IE) in RRCReconfiguration message contains the spCellConfig with reconfigurationWithSync, UE performs Reconfiguration with synchronization procedure. During this procedure, UE synchronizes to the DL of the target SpCell and then initiate the RA towards the target SpCell. UE is not required to always decode PBCH. For example, if frequency band of target SpCell<3 GHz and PRACH association period is not greater than one radio frame, UE is not required to decode PBCH before performing RA.

For extended RAR window, one or more LSBs of SFN can be included in DCI. So during reconfiguration with synchronization procedure, UE needs to first acquire SFN of target SpCell and then initiates the RA towards the target SpCell. Since the 6 most significant bits (MSBs) of SFN are included in MIB and 4 bits are included in PBCH payload, UE needs to decode PBCH of target SpCell which may delay reconfiguration with synchronization procedure. So method is needed to reduce this delay.

Criteria for Successful RAR Reception for 4 step CBRA and CFRA when RAR window size>10 ms

Method 1

Figure 25:
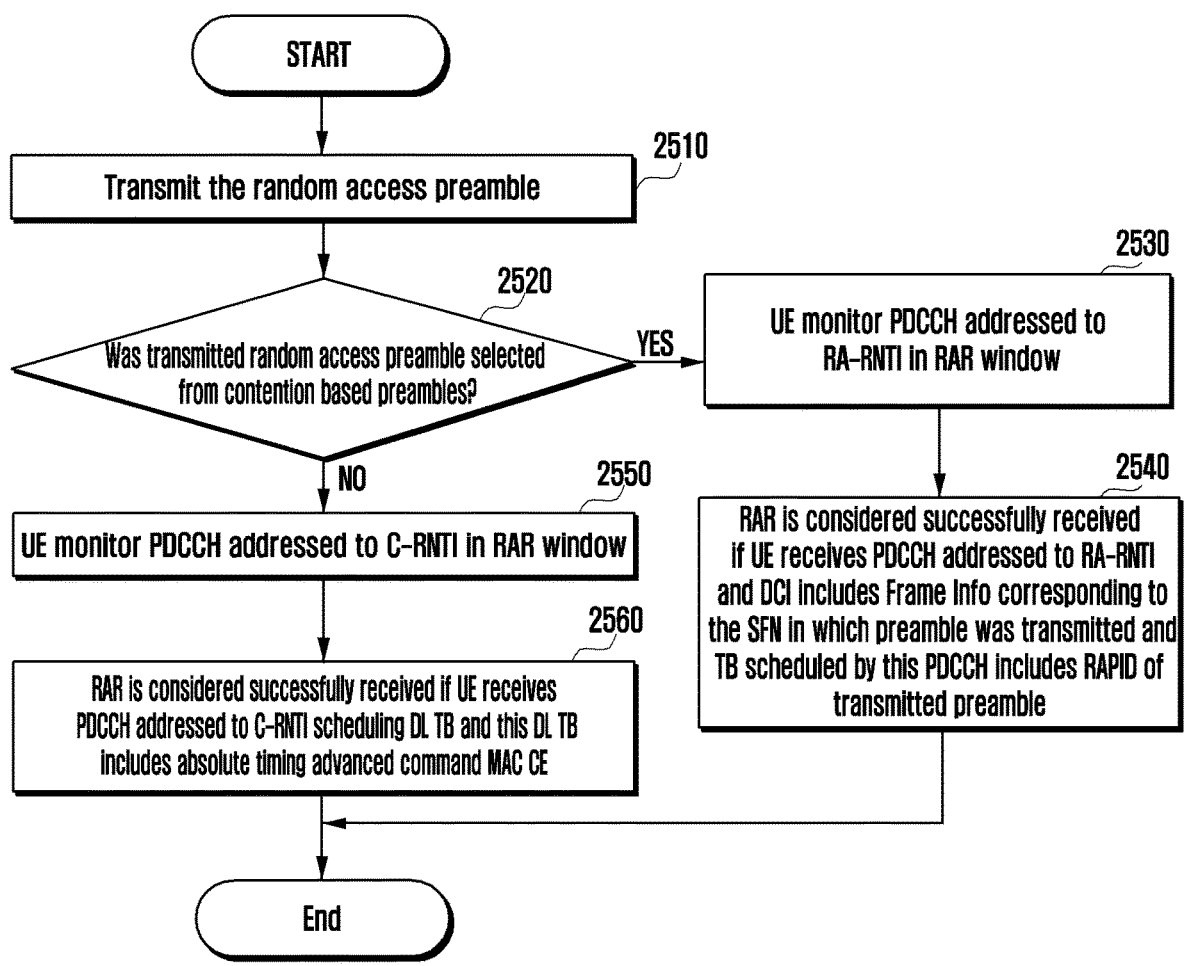
FIG. 25 shows a method of the UE for performing the RA procedure according to an embodiment of the disclosure.

FIG. 25 shows a method of the UE for performing the RA procedure according to an embodiment of the disclosure.

Referring to FIG. 25, UE transmits RA preamble (also referred as Msg1) and then waits for RAR in the RAR window at operation 2510. RAR is also referred as Msg2.

UE then checks whether the transmitted RA preamble was selected from CBRA preambles or not at operation 2520.

If the transmitted RA preamble was selected from CBRA preambles, UE monitors PDCCH addressed to RA-RNTI in RAR window at operation 2530.

RAR is considered successfully received if UE receives PDCCH addressed to RA-RNTI and frame information in DCI of received PDCCH matches frame information corresponding to the SFN in which RA preamble is transmitted and successfully decoded TB scheduled by this PDCCH includes RAPID that matches the RA preamble index of transmitted RA preamble at operation 2540.

Upon receiving a CBRA preamble, gNB transmits the RAR on PDSCH. PDCCH scheduling the PDSCH carrying RAR is addressed to RA-RNTI. RA-RNTI identifies the time-frequency resource (also referred as PRACH occasion or PRACH TX occasion or RO) in which RA preamble was detected by gNB. The RA-RNTI is calculated as follows: RA-RNTI=1+s_id+14*t_id+14*80*f_id+14*80*8*ul_carrier_id, where s_id is the index of the first OFDM symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for NUL carrier and 1 for SUL carrier). Frame information corresponding to the SFN in which RA preamble is received is included in DCI of PDCCH addressed to RA-RNTI. Frame information is 'X' LSBs of SFN. X can be pre-defined or determined based on RAR window size. For example, X can be 2 bits for RAR window size of 40 ms.

TA command in RAR: During the RA procedure, UE receives TA command ($T_A$) in RAR. RAR is included in DL TB scheduled by PDCCH addressed to RA-RNTI. The length of TA command received in RAR is 12 bits. The TA command corresponds to TA group (TAG) of serving cell on which RA preamble is transmitted. The $T_A$ received in RAR is used to determine $N_{TA}$, where $N_{TA}=T_A \cdot 16 \cdot 64/2^\mu$. $2^\mu \cdot 15$ kHz is the SCS of the first UL transmission from the UE after the reception of the RA response.

If the transmitted RA preamble was not selected from CBRA preambles (i.e. it was a CFRA preamble), UE monitors PDCCH addressed to C-RNTI in RAR window at operation 2550. Contention free preamble(s) are dedicatedly assigned to UE using RRC signaling message.

RAR is considered successfully received if UE receives PDCCH addressed to C-RNTI scheduling a DL TB and this DL TB includes absolute TA command at operation 2560. The absolute TA command can be included in a MAC CE.

Upon receiving a CFRA preamble, gNB transmits the response on PDSCH. PDCCH scheduling the PDSCH is addressed to C-RNTI. Since CFRA preamble is assigned to UE by gNB, gNB can identify the UE upon receiving CFRA preamble and hence the C-RNTI assigned to UE. gNB includes the absolute TA command in DL TB transmitted on PDSCH.

Figure 26:
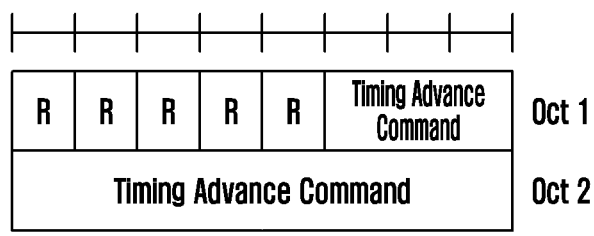
FIG. 26 shows an absolute timing advance (TA) command MAC control element (CE) according to an embodiment of the disclosure.

Absolute TA command in TA MAC CE: FIG. 26 shows an absolute TA command MAC CE according to an embodiment of the disclosure. The length of TA command received is 12 bits. The TA command corresponds to TAG of serving cell on which RA is transmitted. The T received in RAR is used to determine $N_{TA}$, where $N_{TA}=T_A \cdot 16 \cdot 64/2^\mu$. $2^\mu \cdot 15$ kHz is the SCS UL BWP.

Figure 27:
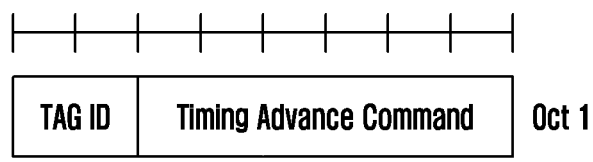
FIG. 27 shows TA command MAC CE according to an embodiment of the disclosure.

TA command in TA MAC CE: FIG. 27 shows TA command MAC CE according to an embodiment of the disclosure. TA command ($T_A$) for specific TAG can also be received via TA Command MAC CE. The length of TA command received in TA Command MAC CE is 6 bits. $T_A$ received in TA MAC CE indicates adjustment of a current $N_{TA}$ value, $N_{TA\_old}$, to the new $N_{TA}$ value, $N_{TA\_new}$, by index values of T=0, 1, 2, . . . , 63, where for a SCS of $2^\mu \cdot 15$ kHz, $N_{TA\_new}=N_{TA\_old}+(T_A-31) \cdot 16 \cdot 64/2^\mu$. $2^\mu \cdot 15$ kHz is the SCS UL BWP.

Different LCID is used in MAC subheader of MAC CE for TA command MAC CEs in FIGS. 26 and 27.

In an embodiment, the above method is applicable only if RAR window size is greater than 10 ms. In another embodiment, the above method is applicable for RAR window size of any size.

Method 2

Figure 28:
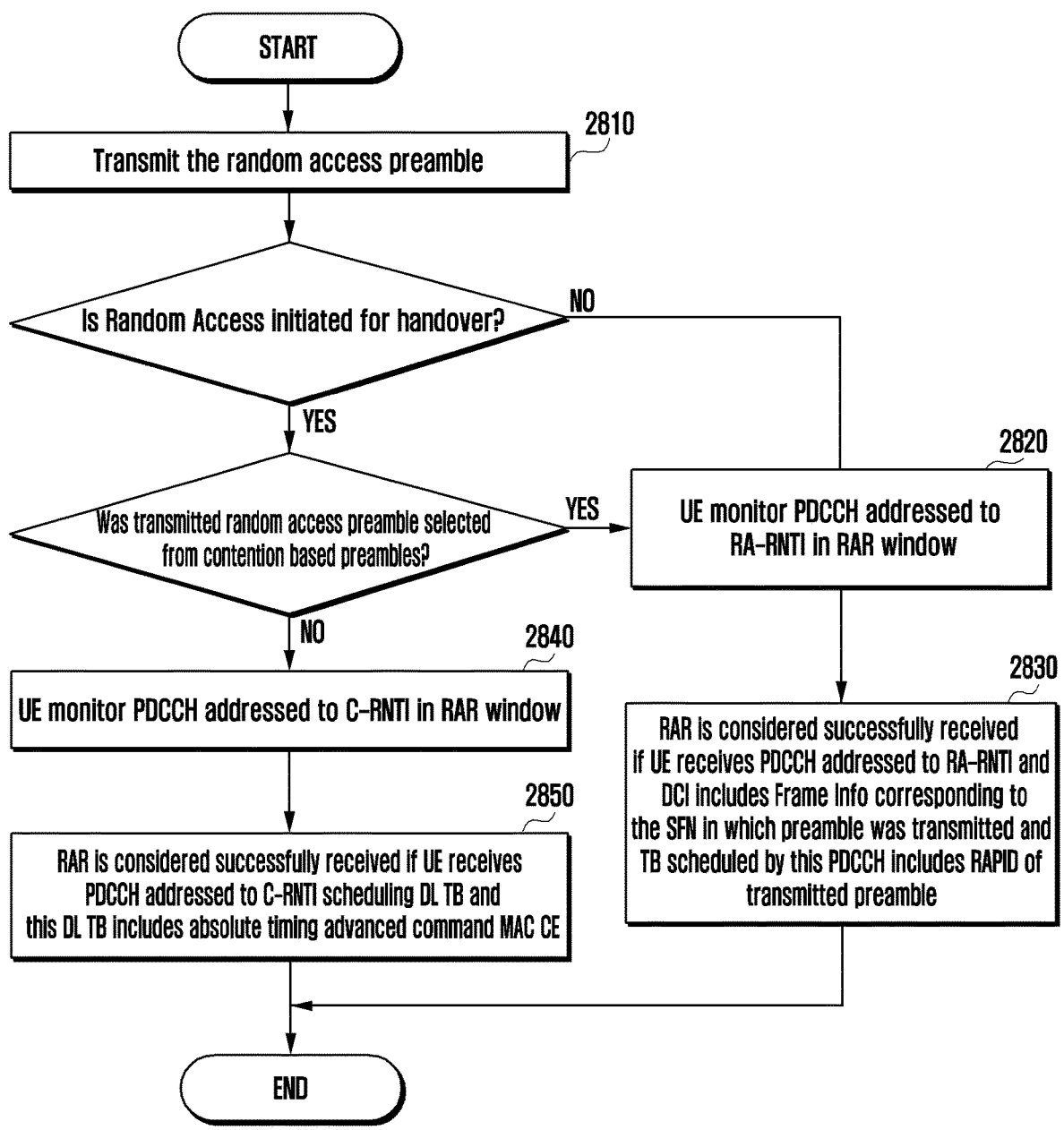
FIG. 28 shows another method of the UE for performing the RA procedure according to an embodiment of the disclosure.

FIG. 28 shows another method of the UE for performing the RA procedure according to an embodiment of the disclosure.

Referring to FIG. 28, UE transmits RA preamble (also referred as Msg1) and then waits for RAR in the RAR window at operation 2810. RAR is also referred as Msg2.

If the transmitted RA preamble was selected from CBRA preambles or if this RA procedure was not initiated for reconfiguration with synchronization (e.g. handover), UE monitors PDCCH addressed to RA-RNTI in RAR window at operation 2820.

RAR is considered successfully received if UE receives PDCCH addressed to RA-RNTI and frame information in DCI of received PDCCH matches frame information corresponding to the SFN in which RA preamble is transmitted and successfully decoded TB scheduled by this PDCCH includes RAPID that matches the RA preamble index of transmitted RA preamble at operation 2830.

Upon receiving a CBRA preamble, gNB transmits the RAR on PDSCH. PDCCH scheduling the PDSCH carrying RAR is addressed to RA-RNTI. RA-RNTI identifies the time-frequency resource (also referred as PRACH occasion or PRACH TX occasion or RO) in which RA preamble was detected by gNB. The RA-RNTI is calculated as follows: RA-RNTI=1+s_id+14*t_id+14*80*f_id+14*80*8*ul_carrier_id, where s_id is the index of the first OFDM symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for NUL carrier and 1 for SUL carrier). Frame information corresponding to the SFN in which RA preamble is received is included in DCI of PDCCH addressed to RA-RNTI. Frame information is 'X' LSBs of SFN. X can be pre-defined or determined based on RAR window size. For example, X can be 2 bits for RAR window size of 40 ms.

TA command in RAR: During the RA procedure, UE receives TA command ($T_A$) in RAR. RAR is included in DL TB scheduled by PDCCH addressed to RA-RNTI. The length of TA command received in RAR is 12 bits. The TA command corresponds to TAG of serving cell on which RA preamble is transmitted. The T received in RAR is used to determine $N_{TA}$, where $N_{TA}=T_A \cdot 16 \cdot 64/2^\mu$. $2^\mu \cdot 15$ kHz is the SCS of the first UL transmission from the UE after the reception of the RAR.

If the transmitted RA preamble was not selected from CBRA preambles (i.e. it was a CRFA preamble) and this RA procedure was initiated for reconfiguration with synchronization procedure, UE monitors PDCCH addressed to C-RNTI in RAR window at operation 2840. Contention free preamble(s) are dedicatedly assigned to UE using RRC signaling message.

RAR is considered successfully received if UE receives PDCCH addressed to C-RNTI scheduling a DL TB and this DL TB includes absolute TA command at operation 2850. The absolute TA command can be included in a MAC CE.

Upon receiving a CFRA preamble, gNB transmits the response on PDSCH. PDCCH scheduling the PDSCH is addressed to C-RNTI. Since CFRA preamble is assigned to UE by gNB, gNB can identify the UE upon receiving CFRA preamble and hence the C-RNTI assigned to UE. gNB includes the absolute TA command in DL TB transmitted on PDSCH.

Absolute TA command in TA MAC CE (see FIG. 26): The length of TA command received is 12 bits. The TA command corresponds to TAG of serving cell on which RA preamble is transmitted. The TA received in RAR is used to determine $N_{TA}$, where $N_{TA}=T_A \cdot 16 \cdot 64/2^\mu$. $2^\mu \cdot 15$ kHz is the SCS UL BWP.

TA command in TA MAC CE (see FIG. 27): TA command ($T_A$) for specific TAG can also be received via TA Command MAC CE. The length of TA command received in TA Command MAC CE is 6 bits. T received in TA MAC CE indicates adjustment of a current $N_{TA}$ value, $N_{TA\_old}$, to the new $N_{TA}$ value, $N_{TA\_new}$, by index values of $T_A$= 0, 1, 2, . . . , 63, where for a SCS of $2^\mu \cdot 15$ kHz, $N_{TA\_new}=N_{TA\_old}+(T_A-31) \cdot 16 \cdot 64/2^\mu$. $2^\mu \cdot 15$ kHz is the SCS UL BWP.

In an embodiment, the above method is applicable only if RAR window size is greater than 10 ms. In another embodiment, the above method is applicable for RAR window size of any size.

Method 3

Figure 29:
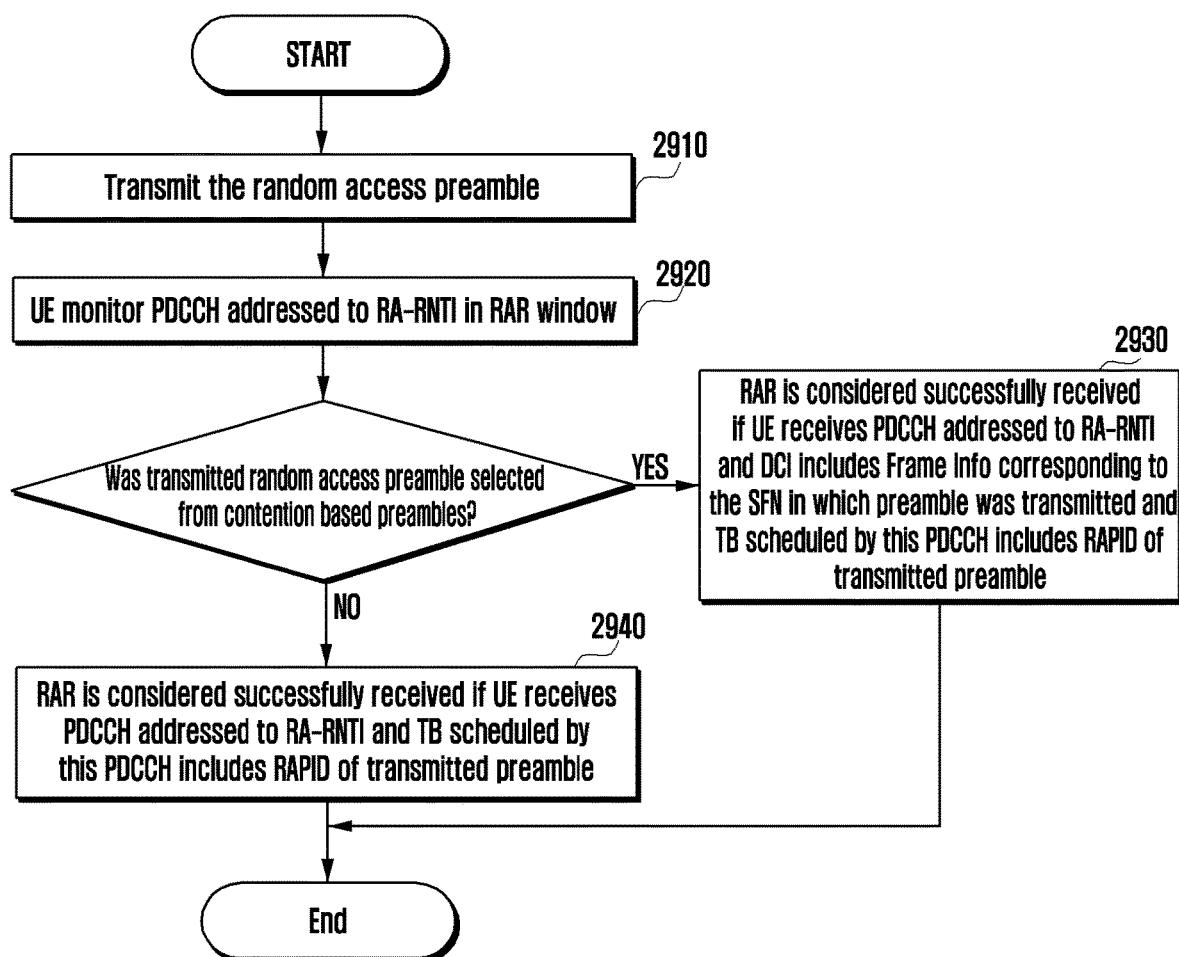
FIG. 29 shows another method of the UE for performing the RA procedure according to an embodiment of the disclosure.

FIG. 29 shows another method of the UE for performing the RA procedure according to an embodiment of the disclosure.

Referring to FIG. 29, UE transmits RA preamble (also referred as Msg1) and then waits for RAR in the RAR window at operation 2910. RAR is also referred as Msg2.

UE monitors PDCCH addressed to RA-RNTI in RAR window at operation 2920.

If the transmitted RA preamble was selected from CBRA preambles:

RAR is considered successfully received if UE receives PDCCH addressed to RA-RNTI and frame information in DCI of received PDCCH matches frame information corresponding to the SFN in which RA preamble is transmitted and successfully decoded TB scheduled by this PDCCH includes RAPID that matches the RA preamble index of transmitted RA preamble at operation 2930.

Upon receiving a CBRA preamble, gNB transmits the RAR on PDSCH. PDCCH scheduling the PDSCH carrying RAR is addressed to RA-RNTI. RA-RNTI identifies the time-frequency resource (also referred as PRACH occasion or PRACH TX occasion or RO) in which RA preamble was detected by gNB. The RA-RNTI is calculated as follows: RA-RNTI=1+$s\_id$+14*$t\_id$+14*80*$f\_id$+14*80*8*$ul\_carrier\_id$, where $s\_id$ is the index of the first OFDM symbol of the PRACH occasion where UE has transmitted Msg1, i.e. RA preamble; $0 \leq s\_id < 14$; $t\_id$ is the index of the first slot of the PRACH occasion ($0 \leq t\_id < 80$); $f\_id$ is the index of the PRACH occasion within the slot in the frequency domain ($0 \leq f\_id < 8$), and $ul\_carrier\_id$ is the UL carrier used for Msg1 transmission (0 for NUL carrier and 1 for SUL carrier). Frame information corresponding to the SFN in which RA preamble is received is included in DCI of PDCCH addressed to RA-RNTI. Frame information is "X" LSBs of SFN. X can be pre-defined or determined based on RAR window size. For example, X can be 2 bits for RAR window size of 40 ms.

If the transmitted RA preamble was not selected from CBRA preambles (i.e. it was a CFRA preamble):

RAR is considered successfully received if UE receives PDCCH addressed to RA-RNTI and successfully decoded TB scheduled by this PDCCH includes RAPID that matches the RA preamble index of transmitted RA preamble at operation 2940.

In an embodiment, the above method is applicable only if RAR window size is greater than 10 ms. In another embodiment, the above method is applicable for RAR window size of any size.

Method 4

Figure 30:
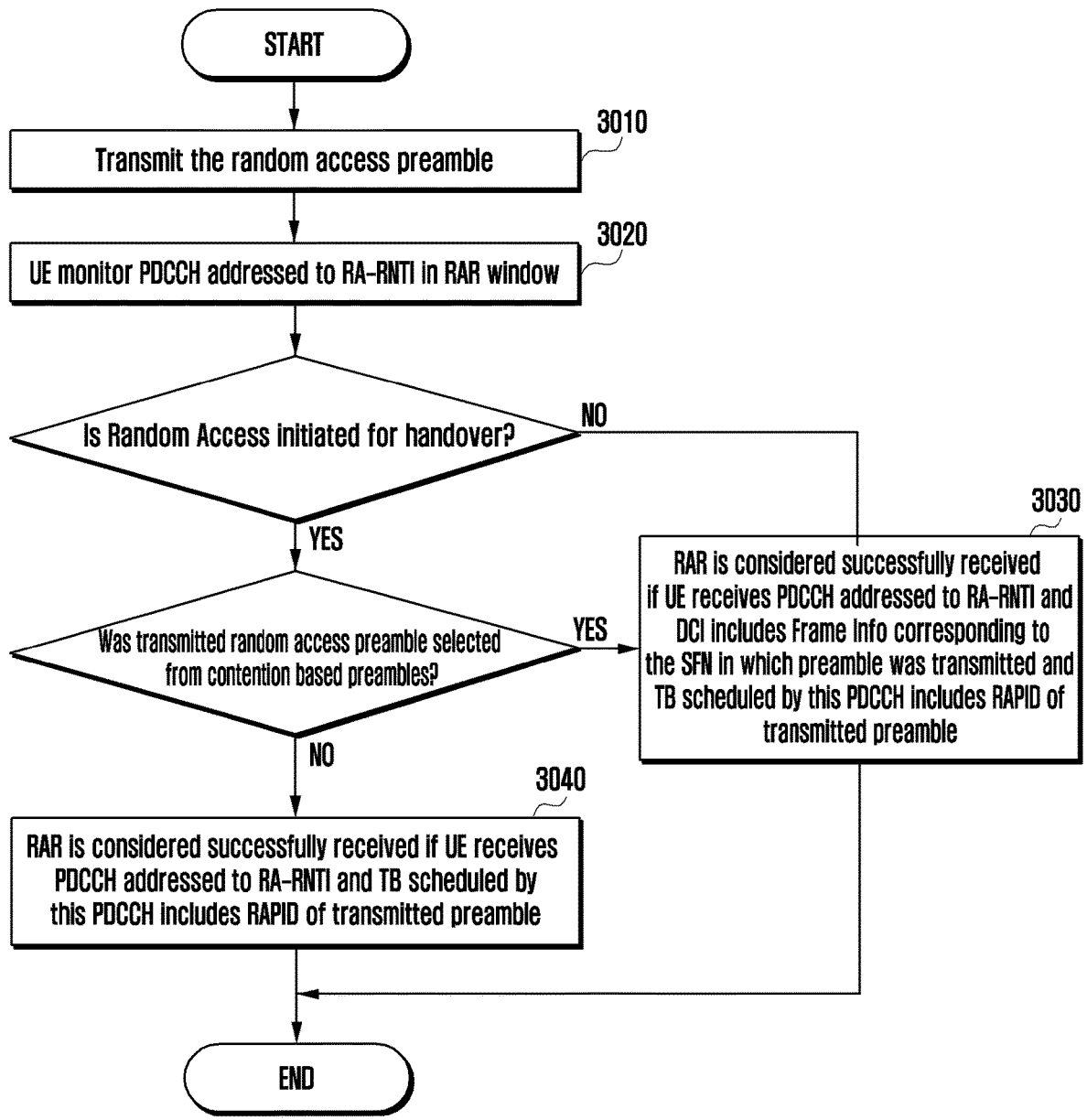
FIG. 30 shows another method of the UE for performing the RA procedure according to an embodiment of the disclosure.

FIG. 30 shows another method of the UE for performing the RA procedure according to an embodiment of the disclosure.

Referring to FIG. 30, UE transmits RA preamble (also referred as Msg1) and then waits for RAR in the RAR window at operation 3010. RAR is also referred as Msg2.

UE monitors PDCCH addressed to RA-RNTI in RAR window at operation 3020.

If the transmitted RA preamble was selected from CBRA preambles or this RA procedure was not initiated for reconfiguration with synchronization (e.g. handover):

RAR is considered successfully received if UE receives PDCCH addressed to RA-RNTI and frame information in DCI of received PDCCH matches frame information corresponding to the SFN in which RA preamble is transmitted and successfully decoded TB scheduled by this PDCCH includes RAPID that matches the RA preamble index of transmitted RA preamble at operation 3030.

Upon receiving a CBRA preamble, gNB transmits the RAR on PDSCH. PDCCH scheduling the PDSCH carrying RAR is addressed to RA-RNTI. RA-RNTI identifies the time-frequency resource (also referred as PRACH occasion or PRACH TX occasion or RO) in which RA preamble was detected by gNB. The RA-RNTI is calculated as follows: RA-RNTI=1+$s\_id$+14*$t\_id$+14*80*$f\_id$+14*80*8*$ul\_carrier\_id$, where $s\_id$ is the index of the first OFDM symbol of the PRACH occasion where UE has transmitted Msg1, i.e. RA preamble; $0 \leq s\_id < 14$; $t\_id$ is the index of the first slot of the PRACH occasion ($0 \leq t\_id < 80$); $f\_id$ is the index of the PRACH occasion within the slot in the frequency domain ($0 \leq f\_id < 8$), and $ul\_carrier\_id$ is the UL carrier used for Msg1 transmission (0 for NUL carrier and 1 for SUL carrier). Frame information corresponding to the SFN in which RA preamble is received is included in DCI of PDCCH addressed to RA-RNTI. Frame information is 'X' LSBs of SFN. X can be pre-defined or determined based on RAR window size. For example, X can be 2 bits for RAR window size of 40 ms.

If the transmitted RA preamble was not selected from CBRA preambles (i.e. it was a CFRA preamble) and this RA procedure was initiated for reconfiguration with synchronization:

RAR is considered successfully received if UE receives PDCCH addressed to RA-RNTI and successfully decoded TB scheduled by this PDCCH includes RAPID that matches the RA preamble index of transmitted RA preamble at operation 3040.

In an embodiment, the above method is applicable only if RAR window size is greater than 10 ms. In another embodiment, the above method is applicable for RAR window size of any size.

Method 5

In one method of the disclosure, the UE performs the RA procedure as follows:

Network (i.e. gnB) indicates whether UE should perform Operation 1 or Operation 2.

Operation 1: Before initiating RA in target SpCell, UE decodes PBCH of SpCell to derive 2 LSBs. After transmitting RA preamble, UE monitors PDCCH addressed to RA-RNTI. RAR is considered successfully received if UE receives PDCCH addressed to RA-RNTI and DCI includes Frame Information corresponding to the SFN in which preamble was transmitted and TB scheduled by this PDCCH includes RAPID of transmitted preamble.

Operation 2: In one embodiment of this disclosure, this operation is same as defined in Method 1. In alternate embodiment of this disclosure, this operation is same as defined in Method 2. In alternate embodiment of this disclosure, this operation is same as defined in Method 3. In alternate embodiment of this disclosure, this operation is same as defined in Method 4.

RRCReconfiguration message for reconfiguration with synchronization can include an indication to perform Operation 2. In absence of this indication in RRCReconfiguration message, UE performs Operation 1.

Method 6

In one method of the disclosure, the UE performs the RA procedure as follows:

During reconfiguration with sync, if UE decodes PBCH before accessing target cell or if UE already has timing information of target cell, UE performs Operation 1. Otherwise it performs Operation 2. If UE does not have timing of target cell in advance, UE may decode PBCH for half frame timing (half frame timing is in PBCH for >3 GHz); and UE may decode PBCH for SFN timing if RA association period>10 ms.

Operation 1: Before initiating RA in target SpCell, UE decodes PBCH of SpCell to derive 2 LSBs. After transmitting RA preamble, UE monitors PDCCH addressed to RA-RNTI. RAR is considered successfully received if UE receives PDCCH addressed to RA-RNTI and DCI includes Frame Information corresponding to the SFN in which preamble was transmitted and TB scheduled by this PDCCH includes RAPID of transmitted preamble.

Operation 2: In one embodiment of this disclosure, this operation is same as defined in Method 1. In alternate embodiment of this disclosure, this operation is same as defined in Method 2. In alternate embodiment of this disclosure, this operation is same as defined in Method 3. In alternate embodiment of this disclosure, this operation is same as defined in Method 4.

Method 7

In one method of this disclosure, UE receives RRC Reconfiguration message with Reconfiguration with synchronization IE. In the received reconfiguration message, UE receives a first and a second RAR window size configuration for the first active UL BWP. The first RAR window size is <=10 ms. The second RAR window size can <=10 ms or >10 ms. The first RAR window size is configured in RACHConfigCommon IE and second RAR window size is configured in RACHConfigDedicated IE. For RA towards the target SpCell upon receiving Reconfiguration with Synchronization, UE uses the RAR window size configured in RACHConfigDedicated IE. UE does not monitor LSBs of SFN in DCI of PDCCH addressed to RA-RNTI/MSGB-RNTI in case of 4 step RA/2 step RA respectively. Upon completion of RA procedure, for the subsequent RA procedure initiated on target SpCell, UE uses the RAR window size configured in RACHConfigCommon. The advantage of this operation is that during handover, UE is not required to acquire SFN for RAR reception.

CAPC and Configured Grant Handling

LBT procedure is vital for fair and friendly coexistence of devices and technologies operating in unlicensed spectrum. LBT procedures on a node attempting to transmit on a carrier in unlicensed spectrum require the node to perform a clear channel assessment to determine if the channel is free for use. The various types or categories of LBT procedures used for transmission are as follows:

Category 1: No LBT

No LBT procedure is performed by the transmitting entity.

Category 2: LBT without Random Back-Off

The duration of time that the channel is sensed to be idle before the transmitting entity transmits is deterministic. In an example, sensing interval can be 25 us, i.e. UE can transmit, after sensing the channel to be idle for at least a sensing interval Td=25 us. For UL transmission, category 3 is also referred as Type 2 channel access procedure.

Category 3: LBT with Random Back-Off with a Contention Window of Fixed Size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel. The detailed category 3 LBT procedure is as follows:

UE transmits after sensing the channel to be idle during the slot durations of a defer duration (Td); and after the counter is zero in step 4. The detailed procedure is as follows:

Step 1: set $N=N_{init}$, where $N_{init}$ is a random number uniformly distributed between 0 and CWp. CWp is the contention window for a given channel access priority class 'p'. The various LBT parameters for different CAPC are listed in Table 1.

Step 2: if N>0, and the UE chooses to decrement the counter, set N=N−1.

Step 3: Sense the channel for an additional slot duration (Ts). If the additional slot duration is idle, go to step 4; else, go to step 5.

Step 4: if N=0, perform transmission. Else, go to step 2.

Step 5: sense the channel during the slot durations of an additional defer duration Td. Defer duration (Td) is equal to $T_f+m_p \times Ts$, where $T_f$ is equal to 16 us and Ts is equal to 9 us.

Step 6: If the channel is sensed to be idle during Td, go to step 2. Else, go to step 5.

Category 4: LBT with Random Back-Off with a Contention Window of Variable Size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. The detailed procedure is same as category 3. Only difference is that in category 3 size of contention window is fixed whereas in category 4 the transmitting entity can vary the size of the contention window when drawing the random number N. For UL transmission category 4 is also referred as Type 1 channel access procedure.

In NR system design, in the UL, the gNB can dynamically allocate resources to UEs via the C-RNTI on PDCCH(s). A UE always monitors the PDCCH(s) in order to find possible grants for UL transmission when its DL reception is enabled (activity governed by DRX when configured). When CA is configured, the same C-RNTI applies to all serving cells. In addition, with Configured Grants, the gNB can allocate periodic UL resources for UL transmissions to UEs. Two types of configured UL grants are defined:

With Type 1, RRC directly provides the configured UL grant (including the periodicity).

With Type 2, RRC defines the periodicity of the configured UL grant while PDCCH addressed to CS-RNTI can either signal and activate the configured UL grant, or deactivate it; i.e. a PDCCH addressed to CS-RNTI indicates that the UL grant can be implicitly reused according to the periodicity defined by RRC, until deactivated.

In case of dynamic grant, gNB indicates the LBT type/category to be used for channel access is signaled by gNB in PDCCH. The CAPC value to be used is also signaled by gNB in PDCCH.

For UL channel access using CAPC based LBT procedure example LBT Type 1 (i.e. Category 4 LBT) for configured grants or for MsgA payload transmission on PUSCH in case of 2 step RACH or for any UL transmission for which DCI does not include CAPC, UE need to determine the CAPC. For this, gNB signals the CAPC for each LCH of DRBs. The MAC CEs except padding BSR and recommended bit rate use the highest priority CAPC (i.e. lowest CAPC index). Padding BSR and recommended bit rate MAC CEs use the lowest priority CAPC (i.e. highest CAPC index). SRB0, SRB1, and SRB3 use the highest priority CAPC (i.e. lowest CAPC index in table 1) while the CAPC for SRB2 is configurable. UE selects the highest CAPC index (i.e. lowest priority CAPC) of the LCH(s) with MAC SDU multiplexed in a MAC PDU.

One issue with this design of selecting CAPC for UL configured grants is that SRB data corresponding to lowest CAPC (i.e. highest priority) is deprioritized if multiplexed with other LCH MAC SDUs in MAC PDU. So some methods to enhance the current design are needed.

Method 1

For the configured UL grant or for MsgA payload transmission on PUSCH in case of 2 step RACH or for any UL transmission for which DCI does not include CAPC, on unlicensed carrier (i.e. serving cell operating on unlicensed spectrum or frequency band), if the MAC SDU of DCCH LCH is included in MAC PDU and CAPC based LBT procedure (e.g. LBT based on category 3 or 4) is performed for channel access, UE shall not include any other MAC SDU(s) of LCH(s) having CAPC index higher than the CAPC index of DCCH (i.e. CAPC of DCCH LCH whose MAC SDU is included in MAC PDU). In case multiple MAC SDU(s) of DCCH belonging to SRBs with different CAPC indexes is included in MAC PDU, CAPC index of DCCH is the highest index amongst the CAPC indexes of DCCH(s) included in MAC PDU.

In an alternate embodiment, for the configured UL grant or for MsgA payload transmission on PUSCH in case of 2 step RACH or for any UL transmission for which DCI does not include CAPC, on unlicensed carrier (i.e. serving cell operating on unlicensed spectrum or frequency band), if a MAC SDU of DCCH LCH is included in MAC PDU and CAPC based LBT procedure (e.g. LBT based on category 3 or 4) is performed for channel access, UE shall not include any other MAC SDU(s) of LCH(s) having CAPC index higher than the CAPC index of DCCH (i.e. CAPC of DCCH LCH whose MAC SDU is included in MAC PDU), and UE shall not include any MAC CE(s) having CAPC index higher than the CAPC index of DCCH (i.e. CAPC of DCCH LCH whose MAC SDU is included in MAC PDU). In case multiple MAC SDU(s) of DCCH belonging to SRBs with different CAPC indexes is included in MAC PDU, CAPC index of DCCH is the highest index among the CAPC indexes of DCCH(s) included in MAC PDU. For example, let's assume SRB1 and SRB2 have CAPC index 1 and CAPC index 3 respectively, if MAC SDU of both SRB1 and SRB2 is included in MAC PDU, UE shall not include any other MAC SDU(s) of LCH(s) having CAPC index higher than 3 and UE shall not include any MAC CE(s) having CAPC index higher than 3.

In an alternate embodiment, for the configured UL grant or for MsgA payload transmission on PUSCH in case of 2 step RACH or for any UL transmission for which DCI does not include CAPC, on unlicensed carrier (i.e. serving cell operating on unlicensed spectrum or frequency band), if a MAC SDU of DCCH LCH is included in MAC PDU and CAPC based LBT procedure (e.g. LBT based on category 3 or 4) is performed for channel access, UE shall not include any other MAC SDU(s) of 'LCH(s) other than DCCH' having CAPC index higher than the CAPC index of DCCH (i.e. CAPC of DCCH LCH whose MAC SDU is included in MAC PDU). In case multiple MAC SDU(s) of DCCH belonging to SRBs with different CAPC indexes is included in MAC PDU, CAPC index of DCCH is the highest index among the CAPC indexes of DCCH(s) included in MAC PDU. For example, let's assume SRB1 and SRB2 have CAPC index 1 and CAPC index 3 respectively, if MAC SDU of both SRB1 and SRB2 is included in MAC PDU, UE shall not include any other MAC SDU(s) of LCH(s) having CAPC index higher than 3.

In an alternate embodiment, for the configured UL grant or for MsgA payload transmission on PUSCH in case of 2 step RACH or for any UL transmission for which DCI does not include CAPC, on unlicensed carrier (i.e. serving cell operating on unlicensed spectrum or frequency band), if a MAC SDU of DCCH LCH is included in MAC PDU and CAPC based LBT procedure (e.g. LBT based on category 3 or 4) is performed for channel access, UE shall not include any other MAC SDU(s) of 'LCH(s) other than DCCH' having CAPC index higher than the CAPC index of DCCH (i.e. CAPC of DCCH LCH whose MAC SDU is included in MAC PDU), and UE shall not include any MAC CE(s) having CAPC index higher than the CAPC index of DCCH (i.e. CAPC of DCCH LCH whose MAC SDU is included in MAC PDU). In case multiple MAC SDU(s) of DCCH belonging to SRBs with different CAPC indexes is included in MAC PDU, CAPC index of DCCH is the highest index among the CAPC indexes of DCCH(s) included in MAC PDU. For example, let's assume SRB1 and SRB2 have CAPC index 1 and CAPC index 3 respectively, if MAC SDU of both SRB1 and SRB2 is included in MAC PDU, UE shall not include any other MAC SDU(s) of LCH(s) having CAPC index higher than 3 and UE shall not include any MAC CE(s) having CAPC index higher than 3.

Just because configured UL grant is for unlicensed carrier does not mean that CAPC based LBT is performed accessing channel for transmission on this UL grant. So it is important that UE checks whether CAPC based LBT procedure (e.g. LBT category 3/4) is applied or not. The various cases in which CAPC based LBT procedure (e.g. LBT category 3 or 4) is applied are detailed in TS 38.889 and TS 38.213.

Method 2

For the configured UL grant or for MsgA payload transmission on PUSCH in case of 2 step RACH or for any UL transmission for which DCI does not include CAPC, on unlicensed carrier (i.e. serving cell operating on unlicensed spectrum or frequency band), CAPC based LBT procedure (e.g. if LBT based on category 3 or 4) is performed for channel access, if MAC SDU of DCCH LCH is included in MAC PDU, UE selects the CAPC index of DCCH. MAC SDUs of SRB1, SRB2 and SRB3 are mapped to DCCH. In case multiple MAC SDUs belonging to different DCCHs (or DCCH LCHs) is included in MAC PDU, UE select the lowest CAPC index (i.e. highest priority) of DCCHs whose MAC SDUs are multiplexed in MAC PDU. For example, let's assume SRB1 and SRB2 have CAPC index 1 and CAPC index 3 respectively. MAC SDUs of SRB1 and SRB3 are included in MAC PDU. So CAPC index 1 is selected as it is the lowest of CAPC index 1 and CAPC index 3. If MAC SDU(s) of LCH(s) other than DCCH is included in MAC PDU, UE selects the highest CAPC index (lowest priority) of LCHs multiplexed in MAC PDU (or alternately UE selects the highest CAPC index (lowest priority) of LCHs/MAC CEs multiplexed in MAC PDU). If only MAC CE(s) are included in MAC PDU, UE select the lowest CAPC index (i.e. highest priority) of MAC CE(s) included in MAC PDU.

Just because configured UL grant is for unlicensed carrier does not mean that CAPC based LBT is performed accessing channel for transmission on this UL grant. So it is important that UE checks whether CAPC based LBT procedure (e.g. LBT category 3/4) is applied or not. The various cases in which CAPC based LBT procedure (e.g. LBT category 3 or 4) is applied are detailed in TS 38.889 and TS 38.213.

LBT Failure Handling

For LBT failure handling gNB signals lbt-FailureRecoveryConfig IE in RRCReconfiguration message. The RRCReconfiguration message is sent to UE in RRC CONNECTED. lbt-FailureRecoveryConfig IE is separately configured for serving cell. The lbt-FailureRecoveryConfig IE incudes parameters lbt-FailureInstanceMaxCount and lbt-FailureDetectionTimer for the consistent LBT failure detection. The RRCReconfiguration message from gNB is processed by RRC layer in UE. If lbt-FailureRecoveryConfig is received from gNB for a serving cell, the MAC entity of that serving cell performs consistent LBT failure recovery procedure using the parameter configured in lbt-FailureRecoveryConfig IE of that serving cell.

Consistent LBT failure is detected per UL BWP by counting LBT failure indications, for all UL transmissions, from the lower layers (i.e. physical layer) to the MAC entity.

The UE variable LBT_COUNTER, i.e. counter for LBT failure indication which is initially set to 0 is used for the consistent LBT failure detection procedure and is maintained separately for each activated Serving Cell configured with lbt-FailureRecoveryConfig.

For each activated Serving Cell configured with lbt-FailureRecoveryConfig, the MAC entity shall:
1> if LBT failure indication has been received from lower layers:
2> start or restart the lbt-FailureDetectionTimer;
2> increment LBT_COUNTER by 1;
2> if LBT_COUNTER>=lbt-FailureInstanceMaxCount:
3> if this Serving Cell is an SCell:
4> declare consistent LBT failure for the active UL BWP;
4> indicate to the Multiplexing and assembly entity to include an LBT failure MAC CE in the subsequent UL transmission.
3> else (i.e. SpCell):
4> declare consistent LBT failure for the active UL BWP;
4> if consistent LBT failure has been declared in all UL BWPs configured with PRACH occasions in this Serving Cell:
5> indicate consistent LBT failure to upper layers.
4> else:
5> switch the active UL BWP to an UL BWP, in this Serving Cell, configured with PRACH occasion and for which consistent LBT failure has not been declared;
5> perform the BWP operation as specified in clause 5.15 in TS 38.321;
5> initiate a RA Procedure.
1> if the lbt-FailureDetectionTimer expires; or
1> if lbt-FailureDetectionTimer or lbt-FailureInstanceMaxCount is reconfigured by upper layers:
2> set LBT_COUNTER to 0.

In the above procedure, upon LBT failure for the active UL BWP of SpCell, UE switches to UL BWP configured with PRACH occasion and for which consistent LBT failure has not been declared. However in the UL, there can be two carrier SUL and NUL. If active UL BWP is on SUL and UE switches to UL BWP on NUL, there can be problem as UE may not be in UL coverage of NUL and UL transmission will fail. If active UL BWP is on NUL and UE switches to UL BWP on SUL, there can be problem as UE may not be in UL coverage of SUL and UL transmission will fail.

Additionally, there can be multiple UL BWPs on both NUL and SUL. Declaring LBT failure to upper layers upon LBT failure on all UL BWPs with PRACH occasions will delay radio link failure (RLF).

Method 1

In a method of this disclosure, LBT failure handling for SpCell is described. For LBT failure handling gNB signals lbt-FailureRecoveryConfig IE in RRCReconfiguration message. The RRCReconfiguration message is sent to UE in RRC CONNECTED. lbt-FailureRecoveryConfig IE is configured for SpCell. The lbt-FailureRecoveryConfig IE incudes parameters lbt-FailureInstanceMaxCount and lbt-FailureDetectionTimer for the consistent LBT failure detection. The RRCReconfiguration message from gNB is processed by RRC layer in UE. If lbt-FailureRecoveryConfig is received from gNB for SpCell, the MAC entity of SpCell performs consistent LBT failure recovery procedure using the parameter configured in lbt-FailureRecoveryConfig IE of SpCell.

Consistent LBT failure is detected per UL BWP by counting LBT failure indications, for all UL transmissions, from the lower layers (i.e. physical layer) to the MAC entity. The UE variable LBT_COUNTER, i.e. counter for LBT failure indication which is initially set to 0 is used for the consistent LBT failure detection procedure. For SpCell's LBT failure handling UE operation is as follows:
1> Upon receiving LBT failure indication from lower layers (here LBT failure indication from lower layers is for failure to transmit in UL of SpCell due to LBT failure, i.e. based on LBT procedure for UL channel access it is determined that UL transmission cannot be performed):
2> start or restart the lbt-FailureDetectionTimer;
2> increment LBT_COUNTER by 1;
2> if LBT_COUNTER>=lbt-FailureInstanceMaxCount:
3> declare consistent LBT failure for the active UL BWP;
3> if consistent LBT failure has been declared in all UL BWPs configured with PRACH occasions in NUL of this Serving Cell; or
3> if consistent LBT failure has been declared in all UL BWPs configured with PRACH occasions in SUL of this Serving Cell;
4> indicate consistent LBT failure to upper layers (upper layer, i.e. RRC will declare RLF upon receiving this indication)

3> else:
4> switch the active UL BWP to an UL BWP of same carrier as active UL BWP, in this Serving Cell, configured with PRACH occasion and for which consistent LBT failure has not been declared;
4> initiate a RA Procedure.

Upon initiation of RA procedure, UE will select between SUL and NUL based on RSRP threshold.

If SUL is configured and if the RSRP of the DL pathloss reference is less than rsrp-ThresholdSSB-SUL, UE selects the SUL carrier for performing RA procedure. Else UE selects the NUL carrier for performing RA procedure.

It is possible that carrier selected is different from carrier used before initiating RA procedure. To ensure that active UL BWP after carrier switching also has RACH occasions, it is proposed that for serving cell configured with SUL and NUL, if UL BWP with BWP ID 'X' in NUL has RACH occasions, UL BWP with same BWP ID 'X' in SUL should also be configured with RACH occasions. The above proposal can be applicable of cell operating on unlicensed carrier in an embodiment.

Method 2

In a method of this disclosure, LBT failure handling for SpCell is described. For LBT failure handling gNB signals lbt-FailureRecoveryConfig IE in RRCReconfiguration message. The RRCReconfiguration message is sent to UE in RRC CONNECTED. lbt-FailureRecoveryConfig IE is configured for SpCell. The lbt-FailureRecoveryConfig IE incudes parameters lbt-FailureInstanceMaxCount and lbt-FailureDetectionTimer for the consistent LBT failure detection. The RRCReconfiguration message from gNB is processed by RRC layer in UE. If lbt-FailureRecoveryConfig is received from gNB for SpCell, the MAC entity of SpCell performs consistent LBT failure recovery procedure using the parameter configured in lbt-FailureRecoveryConfig IE of SpCell.

Consistent LBT failure is detected per UL BWP by counting LBT failure indications, for all UL transmissions, from the lower layers (i.e. physical layer) to the MAC entity. The UE variable LBT_COUNTER, i.e. counter for LBT failure indication which is initially set to 0 is used for the consistent LBT failure detection procedure. For SpCell's LBT failure handling UE operation is as follows:

1> Upon receiving LBT failure indication from lower layers (here LBT failure indication from lower layers is for failure to transmit in UL of SpCell due to LBT failure, i.e. based on LBT procedure for UL channel access it is determined that UL transmission cannot be performed):
2> start or restart the lbt-FailureDetectionTimer;
2> increment LBT_COUNTER by 1;
2> if LBT_COUNTER>=lbt-FailureInstanceMaxCount:
3> declare consistent LBT failure for the active UL BWP;
3> if consistent LBT failure has been declared in all UL BWPs configured with PRACH occasions on the carrier of active UL BWP in this Serving Cell;
4> indicate consistent LBT failure to upper layers (upper layer, i.e. RRC will declare RLF upon receiving this indication)
3> else:
4> switch the active UL BWP to an UL BWP of same carrier as active UL BWP, in this Serving Cell, configured with PRACH occasion and for which consistent LBT failure has not been declared;
4> initiate a RA Procedure on same carrier as active UL BWP. (in this case UE will not select between SUL and NUL based on RSRP threshold upon initiation of random access procedure)

Carrier selection of RA:
1> If RA procedure is initiated for LBT failure recovery:
2> select the carrier for current active UL BWP for performing RA procedure;
2> set the PCMAX to $P_{CMAX,f,c}$ of the selected carrier.
1> else if the carrier to use for the RA procedure is explicitly signaled (by gNB):
2> select the signaled carrier for performing RA procedure;
2> set the PCMAX to $P_{CMAX,f,c}$ of the signaled carrier.
1> else if the carrier to use for the RA procedure is not explicitly signaled; and
1> if the Serving Cell for the RA procedure is configured with supplementary uplink as specified in TS 38.331; and
1> if the RSRP of the downlink pathloss reference is less than rsrp-ThresholdSSB-SUL:
2> select the SUL carrier for performing RA procedure;
2> set the PCMAX to $P_{CMAX,f,c}$ of the SUL carrier.
1> else:
2> select the NUL carrier for performing RA procedure;
2> set the PCMAX to $P_{CMAX,f,c}$ of the NUL carrier.

Figure 31:
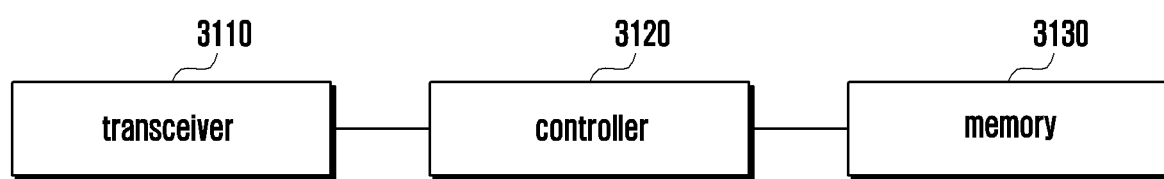
FIG. 31 is a block diagram of a terminal according to an embodiment of the disclosure.

FIG. 31 is a block diagram of a terminal according to an embodiment of the disclosure.

Referring to FIG. 31, a terminal includes a transceiver 3110, a controller 3120 and a memory 3130. The controller 3120 may refer to a circuitry, an ASIC, an FPGA, or at least one processor. The transceiver 3110, the controller 3120 and the memory 3130 are configured to perform the operations of the UE illustrated in the figures, e.g., FIGS. 4, 7, 10, 13, 16, 18, 19, 21, 22, 25, 28, 29 and 30, or as otherwise described above. Although the transceiver 3110, the controller 3120 and the memory 3130 are shown as separate entities, they may be integrated onto a single chip. The transceiver 3110, the controller 3120 and the memory 3130 may also be electrically connected to or coupled with each other.

The transceiver 3110 may transmit and receive signals to and from other network entities, e.g., a base station.

The controller 3120 may control the UE to perform functions according to the embodiments described above. In an embodiment of the disclosure, for UL transmission on configured grants, the controller 3120 is configured to select the CAPC of DCCH if DCCH SDU is transmitted and otherwise the lowest priority CAPC (i.e. highest number CAPC index) of the LCH(s) with MAC SDU and of the MAC CE(s) multiplexed in the MAC PDU. In another embodiment of the disclosure, the controller 3120 is configured to trigger consistent LBT failure for active UL BWP in a serving cell. If LBT failure indication has been identified from low layers, the controller 3120 may be configured to increment LBT counter (i.e. LBT_COUNTER). If the LBT counter is greater than a preconfigured threshold (i.e. FailureInstanceMaxCount), the consistent LBT failure for the active UL BWP in the serving cell is triggered. If consistent LBT failure has been triggered in all UL BWPs configured with PRACH occasions on same carrier in a serving cell, the controller 3120 is configured to determine that RLF is detected for the serving cell. Else, the controller 3120 is configured to switch the active UL BWP to an UL BWP, on same carrier the serving cell, configured with PRACH occasion and for which consistent LBT failure has not been triggered, and initiate an RA procedure triggered by the consistent UL LBT failure on the switched UL BWP.

In an embodiment, the operations of the terminal may be implemented using the memory 3130 storing corresponding program codes. Specifically, the terminal may be equipped with the memory 3130 to store program codes implementing desired operations. To perform the desired operations, the controller 3120 may read and execute the program codes stored in the memory 3130 by using a processor or a central processing unit (CPU).

Figure 32:
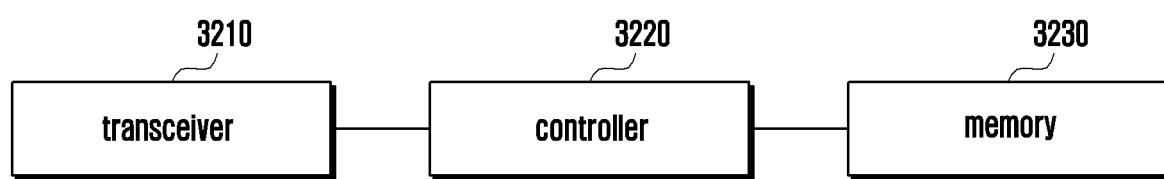
FIG. 32 is a block diagram of a base station according to an embodiment of the disclosure.

FIG. 32 is a block diagram of a base station according to an embodiment of the disclosure.

Referring to FIG. 32, a base station includes a transceiver 3210, a controller 3220 and a memory 3230. The controller 3220 may refer to a circuitry, an ASIC, an FPGA, or at least one processor. The transceiver 3210, the controller 3220 and the memory 3230 are configured to perform the operations of the gNB illustrated in the figures, e.g. FIGS. 5, 8, 11 and 14, or as otherwise described above. Although the transceiver 3210, the controller 3220 and the memory 3230 are shown as separate entities, they may be integrated onto a single chip. The transceiver 3210, the controller 3220 and the memory 3230 may also be electrically connected to or coupled with each other.

The transceiver 3210 may transmit and receive signals to and from other network entities, e.g., a terminal.

The controller 3220 may control the gNB to perform functions according to the embodiments of the disclosure.

In an embodiment, the operations of the base station may be implemented using the memory 3230 storing corresponding program codes. Specifically, the base station may be equipped with the memory 3230 to store program codes implementing desired operations. To perform the desired operations, the controller 3220 may read and execute the program codes stored in the memory 3230 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    identifying a medium access control (MAC) protocol data unit (PDU) to be transmitted on a serving cell, the serving cell operating on an unlicensed band;
    identifying whether the MAC PDU includes dedicated control channel (DCCH) service data unit (SDU);
    in case that the MAC PDU includes the DCCH SDU, selecting a channel access priority class (CAPC) index for the MAC PDU as a CAPC of a DCCH;
    in case that the MAC PDU does not include the DCCH SDU, selecting the CAPC index for the MAC PDU as a lowest priority CAPC of a logical channel among at least one logical channel with a MAC SDU multiplexed in the MAC PDU; and
    transmitting, to a base station, uplink data including the MAC PDU on the serving cell, using a channel access procedure based on the selected CAPC index.

2. The method of claim 1,
    wherein a lower CAPC value has a higher priority, and
    wherein the uplink data including the MAC PDU is transmitted on the serving cell, in case that a channel for the serving cell is identified to be idle.

3. The method of claim 1, further comprising:
    identifying a contention window corresponding to the selected CAPC index; and
    determining whether a channel is to be idle based on the identified contention window.

4. The method of claim 1, wherein the MAC PDU is for a configured grant.

5. The method of claim 1, wherein, in case that the MAC PDU is for a dynamic grant, the CAPC index is selected for the MAC PDU based on CAPC being not indicated in downlink control information (DCI).

6. A terminal in a wireless communication system, the terminal comprising:
    a transceiver; and
    a controller configured to:
        identify a medium access control (MAC) protocol data unit (PDU) to be transmitted on a serving cell, the serving cell operating on an unlicensed band,
        identify whether the MAC PDU includes dedicated control channel (DCCH) service data unit (SDU),
        in case that the MAC PDU includes the DCCH SDU, select a channel access priority class (CAPC) index for the MAC PDU as a CAPC of a DCCH,
        in case that the MAC PDU does not include the DCCH SDU, select the CAPC index for the MAC PDU as a lowest priority CAPC of a logical channel among at least one logical channel with a MAC SDU multiplexed in the MAC PDU,
        and
        control the transceiver to transmit, to a base station, the-uplink data including the MAC PDU on the serving cell, using a channel access procedure based on the selected CAPC index.

7. The terminal of claim 6,
    wherein a lower CAPC value has a higher priority, and
    wherein the uplink data including the MAC PDU is transmitted on the serving cell, in case that a channel for the serving cell is identified to be idle.

8. The terminal of claim 6, wherein the controller is further configured to:
    identify a contention window corresponding to the selected CAPC index, and
    determine whether a channel is to be idle based on the identified contention window.

9. The terminal of claim 6, wherein the MAC PDU is for a configured grant.

10. The terminal of claim 6, wherein, in case that the MAC PDU is for a dynamic grant, the CAPC index is selected for the MAC PDU based on CAPC being not indicated in downlink control information (DCI).

* * * * *